(12) United States Patent
Yu et al.

(10) Patent No.: US 12,538,376 B2
(45) Date of Patent: Jan. 27, 2026

(54) COMMUNICATION METHOD AND APPARATUS

(71) Applicant: HUAWEI TECHNOLOGIES CO., LTD., Shenzhen (CN)

(72) Inventors: Haifeng Yu, Beijing (CN); Bingzhao Li, Beijing (CN); Lei Chen, Beijing (CN); Tingyu Xin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 18/180,308

(22) Filed: Mar. 8, 2023

(65) Prior Publication Data

US 2023/0224936 A1   Jul. 13, 2023

Related U.S. Application Data

(63) Continuation of application No. PCT/CN2021/116209, filed on Sep. 2, 2021.

(30) Foreign Application Priority Data

Sep. 10, 2020   (CN) .......................... 202010949394.0

(51) Int. Cl.
*H04W 76/27* (2018.01)
*H04W 68/02* (2009.01)
(Continued)

(52) U.S. Cl.
CPC ........... *H04W 76/27* (2018.02); *H04W 68/02* (2013.01); *H04W 72/0457* (2023.01); *H04W 72/51* (2023.01); *H04W 76/20* (2018.02)

(58) Field of Classification Search
None
See application file for complete search history.

(56) References Cited

U.S. PATENT DOCUMENTS

2020/0045767 A1*  2/2020  Velev ....................... H04W 8/22
2021/0329444 A1* 10/2021  Wiemann ................ H04W 8/24
(Continued)

FOREIGN PATENT DOCUMENTS

CN   109391935 A    2/2019
CN   110611957 A   12/2019
(Continued)

OTHER PUBLICATIONS

3GPP TS 36.304 V16.1.0 (Jul. 2020), 3rd Generation Partnership Project; Technical Specification Group Radio Access Network; Evolved Universal Terrestrial Radio Access (E-UTRA); User Equipment (UE) procedures in idle mode (Release 16), 63 pages.
(Continued)

*Primary Examiner* — Anh Vu H Ly
(74) *Attorney, Agent, or Firm* — HAUPTMAN HAM, LLP

(57) ABSTRACT

Embodiments of the present invention provide a communication method and apparatus. A network device determines, based on first capability information, a bandwidth part supported by a first terminal device, and sends a first paging message on a target bandwidth part, where the bandwidth part is used to carry paging or another message. The target bandwidth part matches the bandwidth part supported by the first terminal device. Therefore, compared with attempting to send the first paging message by the network device on a plurality of bandwidth parts, sending the first paging message on the target bandwidth part can effectively reduce a quantity of times of unnecessary paging sending by the network device, so as to reduce a quantity of wasted paging resources. This can effectively reduce a quantity of times of unnecessary listening of the first terminal device, reduce energy consumption of the terminal device, and improve paging efficiency.

20 Claims, 20 Drawing Sheets

(51) Int. Cl.
　　*H04W 72/0457* (2023.01)
　　*H04W 72/51* (2023.01)
　　*H04W 76/20* (2018.01)

(56) References Cited

U.S. PATENT DOCUMENTS

| | | | | |
|---|---|---|---|---|
| 2021/0392466 | A1* | 12/2021 | Liu | H04W 24/10 |
| 2022/0287138 | A1* | 9/2022 | Koskela | H04W 52/0212 |
| 2023/0247584 | A1* | 8/2023 | Mu | H04W 68/005 |
| | | | | 455/458 |

FOREIGN PATENT DOCUMENTS

| | | |
|---|---|---|
| CN | 110831184 A | 2/2020 |
| CN | 111345001 A | 6/2020 |
| WO | 2019095656 A1 | 5/2019 |

OTHER PUBLICATIONS

3GPP TS 36.331 V16.1.1 (Jul. 2020), 3rd Generation Partnership Project; Technical Specification Group Radio Access Network; Evolved Universal Terrestrial Radio Access (E-UTRA); Radio Resource Control (RRC); Protocol specification (Release 16), 1078 pages.

3GPP TS 23.401 V16.7.0 (Jul. 2020), 3rd Generation Partnership Project; Technical Specification Group Services and System Aspects; General Packet Radio Service (GPRS) enhancements for Evolved Universal Terrestrial Radio Access Network (E-UTRAN) access(Release 16), 440 pages.

3GPP TS 38.213 V16.2.0 (Jun. 2020), 3rd Generation Partnership Project; Technical Specification Group Radio Access Network; NR; Physical layer procedures for control(Release 16), 176 pages.

3GPP TS 38.304 V16.1.0 (Jul. 2020), 3rd Generation Partnership Project; Technical Specification Group Radio Access Network; NR; User Equipment (UE) procedures in Idle mode and RRC Inactive state(Release 16), 39 pages.

3GPP TS 38.321 V16.1.0 (Jul. 2020), 3rd Generation Partnership Project; Technical Specification Group Radio Access Network; NR; Medium Access Control (MAC) protocol specification(Release 16), 151 pages.

3GPP TS 38.331 V16.1.0 (Jul. 2020), 3rd Generation Partnership Project; Technical Specification Group Radio Access Network; NR; Radio Resource Control (RRC) protocol specification(Release 16), 906 pages.

\* cited by examiner

| Terminal device | First capability information |
|---|---|
| A | Support a first bandwidth part |
| B | Support a second bandwidth part |
| C | Support a first bandwidth part and a second bandwidth part |
| ... | ... |

COMMUNICATION METHOD AND APPARATUS

CROSS-REFERENCE TO RELATED APPLICATIONS

This application is a continuation of International Application No. PCT/CN2021/116209, filed on Sep. 2, 2021, which claims priority to Chinese Patent Application No. 202010949394.0, filed on Sep. 10, 2020. The disclosures of the aforementioned applications are hereby incorporated by reference in their entireties.

TECHNICAL FIELD

This application relates to the field of communication technologies, and in particular, to a communication method and apparatus.

BACKGROUND

In a 5th generation mobile communication system (5th generation wireless systems, 5G), user equipment (User Equipment, UE) may be in one of three working modes: an RRC connected (connected) mode, an RRC idle (idle) mode, and an RRC inactive (inactive) mode. A network device may send a paging (paging) message to the UE in the connected mode, the inactive mode, or the idle mode, to implement communication between the network device and the UE.

A bandwidth part (Bandwidth part, BWP) is a new concept proposed in a 5G new radio (New Radio, NR) standard, and is a segment of continuous bandwidth resources configured by a network side for the UE. The BWP may be used to implement flexible bandwidth transmission on the network side and a UE side. BWPs may be roughly classified into two types: an initial BWP (Initial BWP) and a dedicated BWP (Dedicated BWP), which are used by the UE in different working modes. In the conventional technology, a base station may configure, on the initial BWP or the dedicated BWP, configuration information used for paging, and the UE receives the configuration information to learn of a physical downlink control channel (Physical Downlink Control Channel, PDCCH) for sending paging, and further obtains a position for listening to paging, to receive the paging message.

However, due to differences between UEs, different UEs may support different BWPs. To enable the UE to receive the paging message, the network device simultaneously performs paging at a plurality of BWPs. Consequently, paging resources are wasted and paging efficiency is affected.

SUMMARY

This application aims to provide a communication method and apparatus, so as to resolve a problem that paging resources are wasted and paging efficiency is affected.

According to a first aspect, this application provides a communication method, applied to a network device, and including: receiving first capability information, where the first capability information is used to indicate a bandwidth part supported by a first terminal device; and sending a first paging message on a target bandwidth part based on the first capability information.

Based on the foregoing technical content, the network device receives the first capability information, to determine the bandwidth part supported by the first terminal device, and sends the first paging message on the target bandwidth part, where the bandwidth part is used to carry paging or another message. Because the target bandwidth part matches the bandwidth part supported by the first terminal device, the first paging message is sent on the target bandwidth part, so that a quantity of paging messages received by the first terminal device on other bandwidth parts can be reduced, thereby reducing resource overheads and improving paging efficiency.

In a possible implementation, the first capability information may be from the first terminal device. The first terminal device reports information about the bandwidth part supported by the first terminal device to the network device as the first capability information. Optionally, the first capability information may be carried in a UE capability request information (UECapabilityInformation) message or another radio resource control (Radio Resource Control, RRC) message, and is sent by the first terminal device to the network device. The network device may connect the terminal device to a radio access network (radio access network, RAN) node (or a device) of a radio network, which may also be referred to as a base station.

In a possible implementation, the first capability information may be from a core network device. Optionally, the core network device may obtain the first capability information from an application server (APP server). An obtaining manner includes: obtaining the first capability information of the first terminal device or obtaining first capability information of a plurality of terminal devices, where the plurality of terminal devices include the first terminal device. The core network device sends the first capability information to the network device. The core network device may be a session management function (Session Management Function, SMF) network element or an access and mobility management function (Access and Mobility Management Function, AMF) network element.

Optionally, after receiving the first capability information from the first terminal device, the network device forwards the first capability information to the core network device. For example, a gNB forwards the first capability information to the AMF network element. The gNB may forward the first capability information to the AMF network element by using an N2 message or an NG2 message. N2 is an interface between a RAN and a core network device in long term evolution (Long Term Evolution, LTE), and NG2 is an interface between a RAN device and a core network device in NR.

In this application, the network device receives the first capability information from the first terminal device or the core network device, to determine the bandwidth part supported by the first terminal device, and sends the first paging message on the target bandwidth part. In different application scenarios, the first capability information of the terminal device may be stored on a terminal device side and updated by the terminal device, or may be stored on a core network device side and updated by the core network device. Because the network device in this application may obtain the first capability information by using different information sources, an application scenario of the solution in this embodiment of this application can be further expanded, and an application scope of the method can be widened.

In a possible implementation, the method further includes: receiving a second paging message from a core network device, where the second paging message includes identification information of the first terminal device, and there is a mapping relationship between the identification information of the first terminal device and the first capability information.

Optionally, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an SAE-temporary mobile subscriber identity (SAE-temporary mobile subscriber identity, S-TMSI). In another possible implementation, the terminal identifier is stored in a SIM card, for example, an international mobile subscriber identity (international mobile subscriber identity, IMSI). In still another possible implementation, the terminal identifier is an identifier configured by the network device for the terminal device. In some embodiments, the terminal identifier is, for example, an inactive radio network temporary identifier (Inactive Radio Network Temporary Identifier, I-RNTI). Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In this application, the network device receives the second paging message from the core network device, obtains the identification information of the first terminal device from the second paging message, and determines, based on the pre-obtained mapping relationship between the identification information of the first terminal device and the first capability information, the first capability information corresponding to the first terminal device. When paging is performed on the target bandwidth based on the first capability information, the first terminal device may be paged. In addition, the terminal identifier may indicate one terminal device, or may indicate one group of terminal devices, so that the network device can page one group of terminals or a plurality of terminal devices in a same service group by using one terminal identifier, thereby reducing signaling overheads of paging the first terminal device by the network device, and improving efficiency of paging the first terminal device by the network device.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

In a possible implementation, the method further includes: when the first terminal device supports a first bandwidth part, determining that the target bandwidth part is the first bandwidth part; or when the first terminal device does not support the first bandwidth part, and the first terminal device is in an RRC idle mode or an RRC inactive mode, determining that the target bandwidth part is an initial bandwidth part (Initial BWP); or when the first terminal device does not support the first bandwidth part, and the first terminal device is in an RRC connected mode, determining that the target bandwidth part is an active bandwidth part (Active BWP).

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast bandwidth part (independent multicast BWP) or an extended initial bandwidth part (extended Initial BWP). The extended initial bandwidth part is a multicast BWP formed by extending the initial BWP in frequency domain, and the multicast BWP overlaps the extended initial BWP in frequency domain. The independent multicast bandwidth part is an independent multicast BWP, and the multicast BWP does not overlap the initial BWP in frequency domain.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the network device sends the first paging message on the target bandwidth part, so that the first terminal device can be accurately paged without performing a plurality of times of paging on a plurality of bandwidth parts, thereby improving paging efficiency.

In a possible implementation, the method further includes: determining the target bandwidth part based on the first capability information; and sending a first indication to the first terminal device, where the first indication indicates information about the target bandwidth part.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

In a possible implementation, before the receiving first capability information, the method further includes: sending a capability request message to the first terminal device, where the capability request message is used to request the first terminal device to report the supported bandwidth part.

Optionally, the capability request message may be a UE capability request (UE Capability Enquiry) message or another RRC message. Before the first capability information is received, the capability request message is sent to the first terminal device, to request the first terminal device to report the first capability information to the network device, so that the first capability information is synchronized between the first terminal device and the network device, thereby implementing synchronization of the target bandwidth part. In this way, a paging message can be received and sent between the network device and the first terminal device on the target bandwidth part.

In a possible implementation, the second paging message includes at least one of the following: a paging discontinuous reception (Discontinuous Reception, DRX) configuration, a message type indication, a paging priority, a tracking area identity list (Tracking Area Identity list, TAI list) used for paging, and paging attempt quantity information.

In a possible implementation, the method further includes: when a preset state condition is met, performing at least one of the following: sending the capability request message to the first terminal device, where the capability request message is used to request the first terminal device to report the supported bandwidth part; and sending the first paging message on at least one available bandwidth part, where the available bandwidth part is a bandwidth part for which a paging resource is configured.

Optionally, the sending the first paging message on at least one available bandwidth part includes: sending the first paging message on all bandwidth parts for which a paging resource is configured and that can be used to send paging; or randomly selecting one bandwidth part from one or more bandwidth parts for which a paging resource is configured and that can be used to send paging, to send the first paging message; or selecting, from one or more bandwidth parts for which a paging resource is configured and that can be used to send paging, a bandwidth part corresponding to a time domain position at which a paging message can be sent most recently, to send the first paging message.

Optionally, the preset state condition includes at least one of the following: a quantity of times of sending the first paging message is greater than a first threshold; the first paging message fails to be sent; and no response information is received from the first terminal device within first duration after the first paging message is sent. Optionally, the first threshold is determined based on the paging attempt quantity information from the core network device.

In this application, when a preset condition is met, the network device sends the capability request message to the first terminal device, and/or sends the first paging message on the at least one available bandwidth part. When the network device performs paging communication with the first terminal device, a problem such as a paging failure or a paging timeout may occur, and consequently normal communication between the network device and the first terminal device is affected. The problem may be caused because an incorrect target bandwidth part is used, or channel quality is poor. Therefore, when a problem occurs when the network device performs paging on the target bandwidth part, the network device re-sends the capability request information and/or the first paging message to the first terminal device, to obtain the bandwidth part supported by the first terminal device, so as to re-determine the target bandwidth part, and/or attempt to perform paging on at least one another available bandwidth part, so as to correct a problem that occurs in a paging process. This improves quality of paging between the network device and the first terminal device.

According to a second aspect, this application provides a communication method, applied to a first terminal device, and including: determining first capability information, where the first capability information is used to indicate a bandwidth part supported by the first terminal device; and receiving a first paging message on a target bandwidth part based on the first capability information.

In this application, the first terminal device determines the first capability information, to determine the bandwidth part supported by the first terminal device, and receives the first paging message on the target bandwidth part. Because the target bandwidth part is determined by using the capability information of the first terminal device, the target bandwidth part matches the bandwidth part supported by the first terminal device. The first terminal device may receive the first paging message on the target bandwidth part, and a network device that uses the first capability information can page the first terminal device only by sending paging on the target bandwidth part, without attempting to send another paging message on another bandwidth part. This resolves a problem of a paging resource waste, and improves paging efficiency.

In a possible implementation, the method further includes: sending the first capability information to a network device. The first terminal device reports information about the bandwidth part supported by the first terminal device to the network device as the first capability information, so that the network device can determine the corresponding target bandwidth part by using the first capability information. Optionally, the first capability information may be carried in a terminal device capability information (for example, UECapabilityInformation) message or another RRC message, and is sent by the first terminal device to the network device. The network device may connect the terminal device to a RAN node or a device, which may also be referred to as a base station.

In a possible implementation, the method further includes: sending the first capability information to a core network device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a non-access stratum (non-access stratus, NAS) message, and sends the first capability information to the AMF, to report the first capability information.

In this application, the first terminal device sends the first capability information to the network device or the core network device, so that the network device or the core network device can determine the target bandwidth part or the paging policy based on the first capability information, thereby paging the first terminal device on the target bandwidth part. In this application, the first terminal device may report the first capability information in different manners, so that the network device or the core network device obtains the first capability information. Therefore, an application scenario of the solution in this embodiment of this application can be further expanded, and an application scope of the method can be widened.

In a possible implementation, the method further includes: receiving a capability request message, where the capability request message is used to request to report the supported bandwidth part.

Optionally, the capability request message may be sent by the network device, the core network device, or another terminal device, and the capability request message may be a terminal device capability request (UECapabilityEnquiry) message or another RRC message. The first terminal device receives the capability request message, and reports the first capability information of the first terminal device to the network device, the core network device, or the another terminal device in response to the capability request message, so that the first capability information can be synchronized between the first terminal device and another device (the network device, the core network device, or the another terminal device), thereby implementing synchronization of the target bandwidth part. In this way, the first terminal device can receive a paging message on the target bandwidth part.

In a possible implementation, the method further includes: when the first terminal device supports a first bandwidth part, determining that the target bandwidth part is the first bandwidth part; or when the first terminal device does not support the first bandwidth part, and the first terminal device is in an RRC idle mode or an RRC inactive mode, determining that the target bandwidth part is an initial BWP; or when the first terminal device does not support the first bandwidth part, and the first terminal device is in an RRC connected mode, determining that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast bandwidth part or an extended initial bandwidth part.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the first terminal device receives the first paging message on the target bandwidth part, so that a paging message sent by the network device can be accurately received, and the network device does not need to perform a plurality of times of paging on a plurality of bandwidth parts, thereby improving paging efficiency.

According to a third aspect, this application provides a communication method, applied to a core network device, and including: receiving first capability information, where the first capability information is used to indicate a bandwidth part supported by a first terminal device; and sending the first capability information to a network device.

In this application, the core network device receives the first capability information, and sends the first capability information to the network device by using a specific paging policy, so that the network device can determine a target bandwidth part based on the first capability information corresponding to the first terminal device, and receive a message of the first terminal device by using the target bandwidth part. Because the target bandwidth part matches the bandwidth part supported by the first terminal device, the network device that receives the first capability information sends a first paging message to the target bandwidth part. This can reduce a quantity of paging messages received by the first terminal device on another bandwidth part, reduce resource overheads, and improve paging efficiency.

In a possible implementation, the first capability information may be from the first terminal device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the gang first capability information to the AMF, so that the core network device receives the first capability information.

In a possible implementation, the first capability information may be from an APP server, and the core network device obtains, by using the APP server, the first capability information of the first terminal device or first capability information of a plurality of terminal devices that include the first terminal device. The core network device may be an SMF network element or an AMF network element.

In a possible implementation, the first capability information may be from the network device, and after receiving the first capability information from the first terminal device, the network device forwards the first capability information to the core network device, so that the core network device obtains the first capability information of the first terminal device. For example, a gNB sends the first capability information to the AMF network element by using a forwarding message. The forwarding message may be an N2 message or an NG2 message. N2 is an interface between a RAN device and a core network device in an LTE system, and NG2 is an interface between a RAN device and a core network device in an NR system.

In a possible implementation, the method further includes: sending a second paging message to the network device, where the second paging message includes identification information of the first terminal device, the identification information of the first terminal device is used to indicate a paged terminal device, and there is a mapping relationship between the identification information of the first terminal device and the first capability information.

In this application, the core network device sends the second paging message to the network device, so that the network device obtains the identification information of the first terminal device from the second paging message. In this way, the network device can determine, based on the pre-obtained mapping relationship between the identification information of the first terminal device and the first capability information, the first capability information corresponding to the first terminal device, and the network device can further page the first terminal device when paging the target bandwidth corresponding to the first capability information. In addition, the terminal identifier may indicate one terminal device, or may indicate one group of terminal devices. The core network device sends the second paging message to the network device, so that the network device can page one group of terminals or a plurality of terminal devices in a same service group by using one terminal identifier, thereby reducing signaling overheads of paging the first terminal device by the network device, and improving efficiency of paging the first terminal device by the network device.

For example, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

According to a fourth aspect, this application provides a communication apparatus, applied to a network device, and including: a transceiver module, configured to receive first capability information, where the first capability information is used to indicate a bandwidth part supported by a first terminal device; and a processing module, configured to control, based on the first capability information, the transceiver module to send a first paging message on a target bandwidth part.

In this application, the network device receives the first capability information, to determine the bandwidth part supported by the first terminal device, and sends the first paging message on the target bandwidth part, where the bandwidth part is used to carry paging or another message. Because the target bandwidth part matches the bandwidth part supported by the first terminal device, the first paging message is sent on the target bandwidth part, so that a quantity of paging messages received by the first terminal device on other bandwidth parts can be reduced, thereby reducing resource overheads and improving paging efficiency.

In a possible implementation, the first capability information may be from the first terminal device. The first terminal device reports information about the bandwidth part supported by the first terminal device to the network device as the first capability information. Optionally, the first capability information may be carried in a UECapabilityInformation message or another radio resource control RRC message, and is sent by the first terminal device to the network device. The network device may connect the terminal device to a RAN node or a device, which may also be referred to as a base station.

In a possible implementation, the first capability information may be from a core network device. Optionally, the core network device may obtain the first capability information from an APP server. An obtaining manner includes: obtaining the first capability information of the first terminal device or obtaining first capability information of a plurality of terminal devices, where the plurality of terminal devices include the first terminal device. The core network device sends the first capability information to the network device. The core network device may be an SMF network element or an AMF network element.

Optionally, after receiving the first capability information from the first terminal device, the transceiver module forwards the first capability information to the core network device. For example, a gNB forwards the first capability information to the AMF network element. The gNB may forward the first capability information to the AMF network element by using an N2 message or an NG2 message. N2 is an interface between a RAN and a core network device in LTE, and NG2 is an interface between a RAN device and a core network device in NR.

In this application, the network device receives the first capability information from the first terminal device or the core network device, to determine the bandwidth part supported by the first terminal device, and sends the first paging message on the target bandwidth part. In different application scenarios, the first capability information of the terminal device may be stored on a terminal device side and updated by the terminal device, or may be stored on a core network device side and updated by the core network device. Because the network device in this application may obtain the first capability information by using different information sources, an application scenario of the solution in this embodiment of this application can be further expanded, and an application scope of the method can be widened.

In a possible implementation, the transceiver module is configured to receive a second paging message from a core network device, where the second paging message includes identification information of the first terminal device, and there is a mapping relationship between the identification information of the first terminal device and the first capability information.

For example, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In this application, the network device receives the second paging message from the core network device, obtains the identification information of the first terminal device from the second paging message, and determines, based on the pre-obtained mapping relationship between the identification information of the first terminal device and the first capability information, the first capability information corresponding to the first terminal device. When paging is performed on the target bandwidth based on the first capability information, the first terminal device may be paged. In addition, the terminal identifier may indicate one terminal device, or may indicate one group of terminal devices, so that the network device can page one group of terminals or a plurality of terminal devices in a same service group by using one terminal identifier, thereby reducing signaling overheads of paging the first terminal device by the network device, and improving efficiency of paging the first terminal device by the network device.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

In a possible implementation, the processing module is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast BWP or an extended initial BWP. For the extended initial BWP, the initial BWP is extended in frequency domain based on the original initial BWP, to form the extended initial BWP, and an extended frequency band is used as a multicast BWP, where the multicast BWP overlaps the extended initial BWP. A manner of implementing the multicast BWP by using the independent multicast BWP is different from a manner of implementing the multicast BWP by using the extended initial BWP. The independent multicast BWP does not overlap the initial BWP in frequency domain, and the multicast BWP is implemented by introducing an independent BWP.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the network device sends the first paging message on the target bandwidth part, so that the first terminal device can be accurately paged without performing a plurality of times of paging on a plurality of bandwidth parts, thereby improving paging efficiency.

In a possible implementation, the processing module is configured to determine the target bandwidth part based on the first capability information; and send a first indication to the first terminal device, where the first indication indicates information about the target bandwidth part.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

In a possible implementation, before receiving the first capability information, the transceiver module is further configured to send a capability request message to the first terminal device, where the capability request message is used to request the first terminal device to report the supported bandwidth part.

Optionally, the capability request message may be a UECapabilityEnquiry message or another RRC message. Before the first capability information is received, the capability request message is sent to the first terminal device, to request the first terminal device to report the first capability information to the network device, so that the first capability information is synchronized between the first terminal device and the network device, thereby implementing synchronization of the target bandwidth part. In this way, a paging message can be received and sent between the network device and the first terminal device on the target bandwidth part.

In a possible implementation, the second paging message includes at least one of the following: a DRX configuration, a message type indication, a paging priority, a TAI list, and paging attempt quantity information.

In a possible implementation, the processing module is further configured to: when a preset state condition is met, perform at least one of the following: sending the capability request message to the first terminal device, where the capability request message is used to request the first terminal device to report the supported bandwidth part; and sending the first paging message on at least one available bandwidth part, where the available bandwidth part is a bandwidth part for which a paging resource is configured.

Optionally, when sending the first paging message on the at least one available bandwidth part, the processing module is specifically configured to: send the first paging message on all bandwidth parts for which a paging resource is configured and that can be used to send paging; or randomly select one bandwidth part from one or more bandwidth parts for which a paging resource is configured and that can be used to send paging, to send the first paging message; or select, from one or more bandwidth parts for which a paging resource is configured and that can be used to send paging, a bandwidth part corresponding to a time domain position at which a paging message can be sent most recently, to send the first paging message.

Optionally, the preset state condition includes at least one of the following: a quantity of times of sending the first paging message is greater than a first threshold; the first paging message fails to be sent; and no response information is received from the first terminal device within first duration after the first paging message is sent. Optionally, the first threshold is determined based on the paging attempt quantity information from the core network device.

In this application, when a preset condition is met, the network device sends the capability request message to the first terminal device, and/or sends the first paging message on the at least one available bandwidth part. When the network device performs paging communication with the first terminal device, a problem such as a paging failure or a paging timeout may occur, and consequently normal communication between the network device and the first terminal device is affected. A cause of the problem may be that an incorrect target bandwidth part is used, or channel quality is poor. Therefore, when a problem occurs when the network device performs paging on the target bandwidth part, the network device re-sends the capability request information and/or the first paging message to the first terminal device, to obtain the bandwidth part supported by the first terminal device, so as to re-determine the target bandwidth part, and/or attempt to perform paging on at least one another available bandwidth part, so as to correct a problem that occurs in a paging process. This improves quality of paging between the network device and the first terminal device.

According to a fifth aspect, this application provides a communication apparatus, applied to a first terminal device, and including: a processing module, configured to determine first capability information, where the first capability information is used to indicate a bandwidth part supported by the first terminal device; and a transceiver module, configured to receive a first paging message on a target bandwidth part based on the first capability information.

In this application, the first terminal device determines the first capability information, to determine the bandwidth part supported by the first terminal device, and receives the first paging message on the target bandwidth part. Because the target bandwidth part is determined by using the capability information of the first terminal device, the target bandwidth part matches the bandwidth part supported by the first terminal device. The first terminal device may receive the first paging message on the target bandwidth part, and a network device that uses the first capability information can page the first terminal device only by sending paging on the target bandwidth part, without attempting to send another paging message on another bandwidth part. This resolves a problem of a paging resource waste, and improves paging efficiency.

In a possible implementation, the transceiver module is configured to send the first capability information to a network device. The first terminal device reports information about the bandwidth part supported by the first terminal device to the network device as the first capability information, so that the network device can determine the corresponding target bandwidth part by using the first capability information. Optionally, the first capability information may be carried in a UECapabilityInformation message or another RRC message, and is sent by the first terminal device to the network device. The network device may connect the terminal device to a RAN node or a device, which may also be referred to as a base station.

In a possible implementation, the transceiver module is configured to send the first capability information to a core network device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the first capability information to the AMF, to report the first capability information.

In this application, the first terminal device sends the first capability information to the network device or the core network device, so that the network device or the core network device can determine the target bandwidth part or the paging policy based on the first capability information, thereby paging the first terminal device on the target bandwidth part. In this application, the first terminal device may report the first capability information in different manners, so that the network device or the core network device obtains the first capability information. Therefore, an application scenario of the solution in this embodiment of this application can be further expanded, and an application scope of the method can be widened.

In a possible implementation, the transceiver module is further configured to receive a capability request message, where the capability request message is used to request to report the supported bandwidth part.

Optionally, the capability request message may be sent by the network device, the core network device, or another terminal device, and the capability request message may be a UECapabilityEnquiry message or another RRC message. The first terminal device receives the capability request message, and reports the first capability information of the first terminal device to the network device, the core network device, or the another terminal device in response to the capability request message, so that the first capability information can be synchronized between the first terminal device and another device, thereby implementing synchronization of the target bandwidth part. In this way, the first terminal device can receive a paging message on the target bandwidth part.

In a possible implementation, the processing module is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast bandwidth part or an extended initial bandwidth part.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the first terminal device receives the first paging message on the target bandwidth part, so that a paging message sent by the network device can be accurately received, and the network device does not need to perform a plurality of times of paging on a plurality of bandwidth parts, thereby improving paging efficiency.

According to a sixth aspect, this application provides a communication apparatus, applied to a core network device, and including: a transceiver module, configured to receive first capability information, where the first capability information is used to indicate a bandwidth part supported by a first terminal device; and a processing module, configured to control the transceiver module to send the first capability information to a network device.

In this application, the core network device receives the first capability information, and sends the first capability information to the network device by using a specific paging policy, so that the network device can determine a target bandwidth part based on the first capability information corresponding to the first terminal device, and receive a message of the first terminal device by using the target bandwidth part. Because the target bandwidth part matches the bandwidth part supported by the first terminal device, the network device that receives the first capability information sends a first paging message to the target bandwidth part. This can reduce a quantity of paging messages received by the first terminal device on another bandwidth part, reduce resource overheads, and improve paging efficiency.

In a possible implementation, the first capability information may be from the first terminal device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the another first capability information to the AMF, so that the core network device receives the first capability information.

In a possible implementation, the first capability information may be from an APP server, and the core network device obtains, by using the APP server, the first capability information of the first terminal device or first capability information of a plurality of terminal devices that include the first terminal device. The core network device may be an SMF network element or an AMF network element.

Optionally, after receiving the first capability information from the first terminal device, the transceiver module forwards the first capability information to the core network device, and the core network device receives the first capability information forwarded by the network device. For example, a gNB forwards the first capability information to the AMF network element. The forwarding message may be an N2 message or an NG2 message. N2 is an interface between an access network device and a core network device in LTE, and NG2 is an interface between an access network device and a core network device in NR.

In a possible implementation, the transceiver module is configured to send a second paging message to the network device, where the second paging message includes identification information of the first terminal device, the identification information of the first terminal device is used to indicate a paged terminal device, and there is a mapping relationship between the identification information of the first terminal device and the first capability information.

In this application, the core network device sends the second paging message to the network device, so that the network device obtains the identification information of the first terminal device from the second paging message. In this way, the network device can determine, based on the pre-obtained mapping relationship between the identification information of the first terminal device and the first capability information, the first capability information corresponding to the first terminal device, and the network device can further page the first terminal device when paging the target bandwidth corresponding to the first capability information. In addition, the terminal identifier may indicate one terminal device, or may indicate one group of terminal devices. The core network device sends the second paging message to the network device, so that the network device can page one group of terminals or a plurality of terminal devices in a same service group by using one terminal identifier, thereby reducing signaling overheads of paging the first terminal device by the network device, and improving efficiency of paging the first terminal device by the network device.

For example, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

According to a seventh aspect, this application provides a communication apparatus, including: a transceiver, configured to receive first capability information, where the first capability information is used to indicate a bandwidth part supported by a first terminal device; and a processor, configured to control, based on the first capability information, the transceiver to send a first paging message on a target bandwidth part.

In this application, the network device receives the first capability information, to determine the bandwidth part supported by the first terminal device, and sends the first paging message on the target bandwidth part, where the bandwidth part is used to carry paging or another message. Because the target bandwidth part matches the bandwidth part supported by the first terminal device, the first paging message is sent on the target bandwidth part, so that a quantity of paging messages received by the first terminal device on other bandwidth parts can be reduced, thereby reducing resource overheads and improving paging efficiency.

In a possible implementation, the first capability information may be from the first terminal device. The first terminal device reports information about the bandwidth part supported by the first terminal device to the network device as the first capability information. Optionally, the first capability information may be carried in a UECapabilityInformation message or another radio resource control RRC message, and is sent by the first terminal device to the network device. The network device may connect the terminal device to a RAN node or a device, which may also be referred to as a base station.

In a possible implementation, the first capability information may be from a core network device. Optionally, the core network device may obtain the first capability information from an APP server. An obtaining manner includes: obtaining the first capability information of the first terminal device or obtaining first capability information of a plurality of terminal devices, where the plurality of terminal devices include the first terminal device. The core network device sends the first capability information to the network device. The core network device may be an SMF network element or an AMF network element.

Optionally, after receiving the first capability information from the first terminal device, the transceiver forwards the first capability information to the core network device. For example, a gNB forwards the first capability information to the AMF network element. The gNB may forward the first capability information to the AMF network element by using an N2 message or an NG2 message. N2 is an interface between a RAN and a core network device in LTE, and NG2 is an interface between a RAN device and a core network device in NR.

In this application, the network device receives the first capability information from the first terminal device or the core network device, to determine the bandwidth part supported by the first terminal device, and sends the first paging message on the target bandwidth part. In different application scenarios, the first capability information of the terminal device may be stored on a terminal device side and updated by the terminal device, or may be stored on a core network device side and updated by the core network device. Because the network device in this application may obtain the first capability information by using different information sources, an application scenario of the solution in this embodiment of this application can be further expanded, and an application scope of the method can be widened.

In a possible implementation, the transceiver is configured to receive a second paging message from a core network device, where the second paging message includes identification information of the first terminal device, and there is a mapping relationship between the identification information of the first terminal device and the first capability information.

For example, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In this application, the network device receives the second paging message from the core network device, obtains the identification information of the first terminal device from the second paging message, and determines, based on the pre-obtained mapping relationship between the identification information of the first terminal device and the first capability information, the first capability information corresponding to the first terminal device. When paging is performed on the target bandwidth based on the first capability information, the first terminal device may be paged. In addition, the terminal identifier may indicate one terminal device, or may indicate one group of terminal devices, so that the network device can page one group of terminals or a plurality of terminal devices in a same service group by using one terminal identifier, thereby reducing signaling overheads of paging the first terminal device by the network device, and improving efficiency of paging the first terminal device by the network device.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

In a possible implementation, the processor is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast BWP or an extended initial BWP. For the extended initial BWP, the initial BWP is extended in frequency domain based on the original initial BWP, to form the extended initial BWP, and an extended frequency band is used as a multicast BWP, where the multicast BWP overlaps the extended initial BWP. A manner of implementing the multicast BWP by using the independent multicast BWP is different from a manner of implementing the multicast BWP by using the extended initial BWP. The independent multicast BWP does not overlap the initial BWP in frequency domain, and the multicast BWP is implemented by introducing an independent BWP.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the network device sends the first paging message on the target bandwidth part, so that the first terminal device can be accurately paged without performing a plurality of times of paging on a plurality of bandwidth parts, thereby improving paging efficiency.

In a possible implementation, the processor is configured to determine the target bandwidth part based on the first capability information; and send a first indication to the first terminal device, where the first indication indicates information about the target bandwidth part.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

In a possible implementation, before receiving the first capability information, the transceiver is further configured to send a capability request message to the first terminal device, where the capability request message is used to request the first terminal device to report the supported bandwidth part.

Optionally, the capability request message may be a UECapabilityEnquiry message or another RRC message. Before the first capability information is received, the capability request message is sent to the first terminal device, to request the first terminal device to report the first capability information to the network device, so that the first capability information is synchronized between the first terminal device and the network device, thereby implementing synchronization of the target bandwidth part. In this way, a paging message can be received and sent between the network device and the first terminal device on the target bandwidth part.

In a possible implementation, the second paging message includes at least one of the following: a DRX configuration, a message type indication, a paging priority, a TAI list, and paging attempt quantity information.

In a possible implementation, the processor is further configured to: when a preset state condition is met, perform at least one of the following: sending the capability request message to the first terminal device, where the capability request message is used to request the first terminal device to report the supported bandwidth part; and sending the first paging message on at least one available bandwidth part, where the available bandwidth part is a bandwidth part for which a paging resource is configured.

Optionally, when sending the first paging message on the at least one available bandwidth part, the processor is specifically configured to: send the first paging message on all bandwidth parts for which a paging resource is configured and that can be used to send paging; or randomly select one bandwidth part from one or more bandwidth parts for which a paging resource is configured and that can be used to send paging, to send the first paging message; or select, from one or more bandwidth parts for which a paging resource is configured and that can be used to send paging, a bandwidth part corresponding to a time domain position at which a paging message can be sent most recently, to send the first paging message.

Optionally, the preset state condition includes at least one of the following: a quantity of times of sending the first paging message is greater than a first threshold; the first paging message fails to be sent; and no response information is received from the first terminal device within first duration after the first paging message is sent. Optionally, the first threshold is determined based on the paging attempt quantity information from the core network device.

In this application, when a preset condition is met, the network device sends the capability request message to the first terminal device, and/or sends the first paging message on the at least one available bandwidth part. When the network device performs paging communication with the first terminal device, a problem such as a paging failure or a paging timeout may occur, and consequently normal communication between the network device and the first terminal device is affected. A cause of the problem may be that an incorrect target bandwidth part is used, or channel quality is poor. Therefore, when a problem occurs when the network device performs paging on the target bandwidth part, the network device re-sends the capability request information and/or the first paging message to the first terminal device, to obtain the bandwidth part supported by the first terminal device, so as to re-determine the target bandwidth part, and/or attempt to perform paging on at least one another available bandwidth part, so as to correct a problem that occurs in a paging process. This improves quality of paging between the network device and the first terminal device.

According to an eighth aspect, this application provides a communication apparatus, including: a processor, configured to determine first capability information, where the first capability information is used to indicate a bandwidth part supported by a first terminal device; and a transceiver, configured to receive a first paging message on a target bandwidth part based on the first capability information.

In this application, the first terminal device determines the first capability information, to determine the bandwidth part supported by the first terminal device, and receives the first paging message on the target bandwidth part. Because the target bandwidth part is determined by using the capability information of the first terminal device, the target bandwidth part matches the bandwidth part supported by the first terminal device. The first terminal device may receive the first paging message on the target bandwidth part, and a network device that uses the first capability information can page the first terminal device only by sending paging on the target bandwidth part, without attempting to send another paging message on another bandwidth part. This resolves a problem of a paging resource waste, and improves paging efficiency.

In a possible implementation, the transceiver is configured to send the first capability information to a network device. The first terminal device reports information about the bandwidth part supported by the first terminal device to the network device as the first capability information, so that the network device can determine the corresponding target bandwidth part by using the first capability information. Optionally, the first capability information may be carried in a UECapabilityInformation message or another RRC message, and is sent by the first terminal device to the network device. The network device may connect the terminal device to a RAN node or a device, which may also be referred to as a base station.

In a possible implementation, the transceiver is configured to send the first capability information to a core network device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the first capability information to the AMF, to report the first capability information.

In this application, the first terminal device sends the first capability information to the network device or the core network device, so that the network device or the core network device can determine the target bandwidth part or the paging policy based on the first capability information, thereby paging the first terminal device on the target bandwidth part. In this application, the first terminal device may report the first capability information in different manners, so that the network device or the core network device obtains the first capability information. Therefore, an application scenario of the solution in this embodiment of this application can be further expanded, and an application scope of the method can be widened.

In a possible implementation, the transceiver is further configured to receive a capability request message, where the capability request message is used to request to report the supported bandwidth part.

Optionally, the capability request message may be sent by the network device, the core network device, or another terminal device, and the capability request message may be a UECapabilityEnquiry message or another RRC message. The first terminal device receives the capability request message, and reports the first capability information of the first terminal device to the network device, the core network device, or the another terminal device in response to the capability request message, so that the first capability information can be synchronized between the first terminal device and another device, thereby implementing synchronization of the target bandwidth part. In this way, the first terminal device can receive a paging message on the target bandwidth part.

In a possible implementation, the processor is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast bandwidth part or an extended initial bandwidth part.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the first terminal device receives the first paging message on the target bandwidth part, so that a paging message sent by the network device can be accurately received, and the network device does not need to perform a plurality of times of paging on a plurality of bandwidth parts, thereby improving paging efficiency.

According to a ninth aspect, this application provides a communication apparatus, including: a transceiver, configured to receive first capability information, where the first capability information is used to indicate a bandwidth part supported by a first terminal device; and a processor, configured to control the transceiver to send the first capability information to a network device.

In this application, the core network device receives the first capability information, and sends the first capability information to the network device by using a specific paging policy, so that the network device can determine a target bandwidth part based on the first capability information corresponding to the first terminal device, and receive a message of the first terminal device by using the target bandwidth part. Because the target bandwidth part matches the bandwidth part supported by the first terminal device, the network device that receives the first capability information sends a first paging message to the target bandwidth part. This can reduce a quantity of paging messages received by the first terminal device on another bandwidth part, reduce resource overheads, and improve paging efficiency.

In a possible implementation, the first capability information may be from the first terminal device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the another first capability information to the AMF, so that the core network device receives the first capability information.

In a possible implementation, the first capability information may be from an APP server, and the core network device obtains, by using the APP server, the first capability information of the first terminal device or first capability information of a plurality of terminal devices that include the first terminal device. The core network device may be an SMF network element or an AMF network element.

Optionally, after receiving the first capability information from the first terminal device, the transceiver forwards the first capability information to the core network device, and the core network device receives the first capability information forwarded by the network device. For example, a gNB forwards the first capability information to the AMF network element. The forwarding message may be an N2 message or an NG2 message. N2 is an interface between an access network device and a core network device in LTE, and NG2 is an interface between an access network device and a core network device in NR.

In a possible implementation, the transceiver is configured to send a second paging message to the network device, where the second paging message includes identification information of the first terminal device, the identification information of the first terminal device is used to indicate a paged terminal device, and there is a mapping relationship between the identification information of the first terminal device and the first capability information.

In this application, the core network device sends the second paging message to the network device, so that the network device obtains the identification information of the first terminal device from the second paging message. In this way, the network device can determine, based on the pre-obtained mapping relationship between the identification information of the first terminal device and the first capability information, the first capability information corresponding to the first terminal device, and the network device can further page the first terminal device when paging the target bandwidth corresponding to the first capability information. In addition, the terminal identifier may indicate one terminal device, or may indicate one group of terminal devices. The core network device sends the second paging message to the network device, so that the network device can page one group of terminals or a plurality of terminal devices in a same service group by using one terminal identifier, thereby reducing signaling overheads of paging the first terminal device by the network device, and improving efficiency of paging the first terminal device by the network device.

For example, the identification information of the first terminal device includes at least one of the following: a terminal identifier, a group identifier corresponding to the terminal, and a service identifier corresponding to the terminal. The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device. The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier. The service identifier corresponding to the terminal is used to indicate a service identifier corresponding to a paged terminal device. Optionally, the service identifier may be a multicast service identifier. The multicast service identifier may be a TMGI or a G-RNTI.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

According to a tenth aspect, this application provides a network device, which may be configured to perform the method provided in any implementation of the first aspect, and may be further configured to perform actions or steps of the modules of the apparatus in the embodiment shown in the fourth aspect. The network device specifically includes a processor, a memory, a receiver, and a transmitter. The receiver and the transmitter may be connected to an antenna. The memory is configured to store a computer program. The processor is configured to execute the computer program stored in the memory, to implement the processing action of the network device in the method provided in any implementation of the first aspect, or the processing action of each module of the apparatus in the embodiment shown in the fourth aspect. The receiver is configured to perform the receiving action of the network device in the method provided in any implementation of the first aspect, or the receiving action of each module of the apparatus in the embodiment shown in the fourth aspect. The transmitter is configured to perform the sending action of the network device in the method provided in any implementation of the first aspect, or the sending action of each module of the apparatus in the embodiment shown in the fourth aspect.

In a possible implementation, the terminal device may further include a bus. The processor, the memory, the receiver, and the transmitter may be connected to each other by using the bus. The bus may be a peripheral component interconnect (peripheral component interconnect, PCI) bus, an extended industry standard architecture (extended industry standard architecture, EISA) bus, or the like. The bus may be classified into an address bus, a data bus, a control bus, and the like.

In a possible implementation, some or all of the foregoing modules may alternatively be embedded in a chip by using an integrated circuit. The foregoing modules may be separately implemented, or may be integrated together. That is, the foregoing modules may be configured as one or more integrated circuits for implementing the foregoing methods, for example, one or more application-specific integrated circuits (Application-Specific Integrated Circuit, ASIC), one or more digital signal processors (digital signal processor, DSP), or one or more field programmable gate arrays (Field Programmable Gate Array, FPGA).

According to an eleventh aspect, this application provides a terminal device, which may be configured to perform the method provided in any implementation of the second aspect, and may be further configured to perform actions or steps of the modules of the apparatus in the embodiment shown in the fifth aspect. The terminal device specifically includes a processor, a memory, a receiver, and a transmitter. The receiver and the transmitter may be connected to an antenna. The memory is configured to store a computer program. The processor is configured to execute the computer program stored in the memory, to implement the processing action of the terminal device in the method provided in any implementation of the second aspect, or the processing action of each module of the apparatus in the embodiment shown in the fifth aspect. The receiver is configured to perform the receiving action of the terminal device in the method provided in any implementation of the second aspect, or the receiving action of each module of the apparatus in the embodiment shown in the fifth aspect. The transmitter is configured to perform the sending action of the terminal device in the method provided in any implementation of the second aspect, or the sending action of each module of the apparatus in the embodiment shown in the fifth aspect.

In a possible implementation, the terminal device may further include a bus. The processor, the memory, the receiver, and the transmitter may be connected to each other by using the bus. The bus may be a PCI bus, an EISA bus, or the like. The bus may be classified into an address bus, a data bus, a control bus, and the like.

In a possible implementation, some or all of the foregoing modules may alternatively be embedded in a chip by using an integrated circuit. The foregoing modules may be separately implemented, or may be integrated together. The foregoing modules may be configured as one or more integrated circuits for implementing the foregoing methods, for example, one or more ASICs, one or more DSPs, or one or more FPGAs.

According to a twelfth aspect, this application provides a core network device, which may be configured to perform the method provided in any implementation of the third aspect, and may be further configured to perform actions or steps of the modules of the apparatus in the embodiment shown in the sixth aspect. The core network device specifically includes a processor, a memory, a receiver, and a transmitter. The receiver and the transmitter may be connected to an antenna. The memory is configured to store a computer program. The processor is configured to execute the computer program stored in the memory, to implement the processing action of the core network device in the method provided in any implementation of the third aspect, or the processing action of each module of the apparatus in the embodiment shown in the sixth aspect. The receiver is configured to perform the receiving action of the core network device in the method provided in any implementation of the third aspect, or the receiving action of each module of the apparatus in the embodiment shown in the sixth aspect. The transmitter is configured to perform the sending action of the core network device in the method provided in any implementation of the third aspect, or the sending action of each module of the apparatus in the embodiment shown in the sixth aspect.

In a possible implementation, the core network device may further include a bus. The processor, the memory, the receiver, and the transmitter may be connected to each other by using the bus. The bus may be a PCI bus, an EISA bus, or the like. The bus may be classified into an address bus, a data bus, a control bus, and the like.

In a possible implementation, some or all of the foregoing modules may alternatively be embedded in a chip by using an integrated circuit. The foregoing modules may be separately implemented, or may be integrated together. The foregoing modules may be configured as one or more integrated circuits for implementing the foregoing methods, for example, one or more ASICs, one or more DSPs, or one or more FPGAs.

According to a thirteenth aspect, this application provides a computer-readable storage medium, including computer code. When the computer code is run on a computer, the computer is enabled to perform the method in any implementation of the first aspect to the third aspect.

According to a fourteenth aspect, this application provides a computer program product, including program code. When a computer runs the computer program product, the program code performs the method in any implementation of the first aspect to the third aspect.

According to a fifteenth aspect, this application provides a chip, including a processor. The processor is configured to invoke and run a computer program stored in a memory, to perform a corresponding operation and/or procedure performed by a network device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

According to a sixteenth aspect, this application provides a chip, including a processor. The processor is configured to invoke and run a computer program stored in a memory, to perform a corresponding operation and/or procedure performed by a terminal device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

According to a seventeenth aspect, this application provides a chip, including a processor. The processor is configured to invoke and run a computer program stored in a memory, to perform a corresponding operation and/or procedure performed by a core network device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

According to an eighteenth aspect, this application provides a communication system. The communication system includes a network device, a terminal device, and a core network device. The network device is configured to perform the method provided in the first aspect of this application, the terminal device is configured to perform the method provided in some embodiments, and the core network device is configured to perform the method provided in some embodiments.

DESCRIPTION OF EMBODIMENTS

Embodiments of this application are applied to a 5th generation (5th-generation, 5G) mobile communication system or another system that may appear in the future, or may be applied to another communication system, for example, a wireless local area network (wireless local area network, WLAN) communication system, a global system for mobile communication (global system for mobile communication, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunication system (universal mobile telecommunication system, UMTS), or a worldwide interoperability for microwave access (worldwide interoperability for microwave access, WiMAX) communication system.

The following describes some terms in this application, so as to help a person skilled in the art have a better understanding. It should be noted that, when solutions in embodiments of this application are applied to the 5G system, an existing system, or another system that may appear in the future, names of a network device and a terminal device may change, but this does not affect implementation of the solutions in embodiments of this application.

(1) Radio resource control (Radio Resource Control, RRC) connected status: In a 5G system, the RRC connected status includes an RRC connected (connected) mode, an RRC idle (idle) mode, and an RRC inactive (inactive) mode. When UE is powered on and does not establish a connection to a wireless network, the UE is in an RRC idle mode, and the UE in the RRC idle mode does not have an RRC connection. In this case, the UE performs cell selection and reselection, listens to a paging channel, and updates a tracking area. When the UE is connected to the wireless network to receive or send data, the UE is in an RRC connected mode. The RRC inactive mode is an RRC mode newly added in 5G, and the UE in the RRC inactive mode may be quickly restored to the RRC connected mode.

Figure 1:
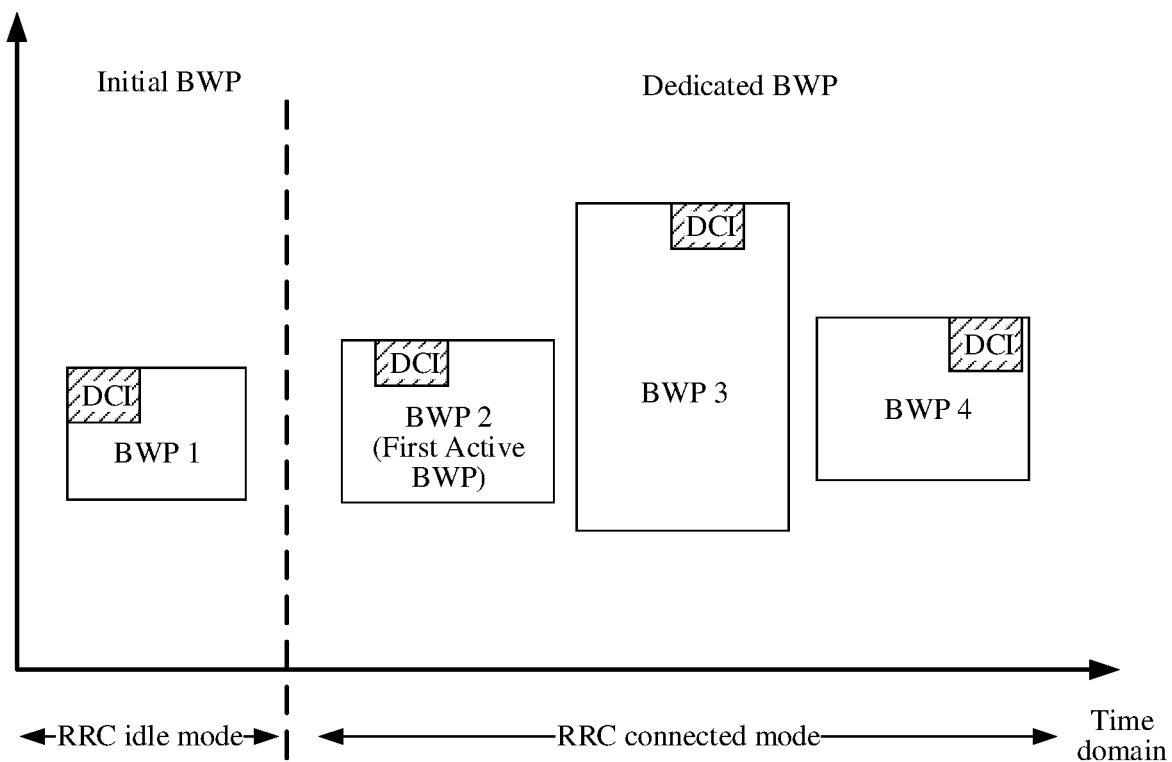
FIG. 1 is a schematic diagram of a bandwidth part BWP according to an embodiment of this application.

(2) Bandwidth part (Bandwidth part, BWP): The BWP is a new concept proposed in a 5G-NR standard, indicates a segment of continuous bandwidth resources configured by a network side for UE, and can implement flexible bandwidth transmission on the network side and the UE side. In a system operating bandwidth (Carrier bandwidth), a BWP is a subset of an operating bandwidth. As shown in FIG. 1, BWPs in NR may be roughly classified into two types: an initial BWP and a dedicated BWP. The initial BWP is a BWP used in an initial access phase when the UE is in an RRC idle mode. The dedicated BWP is a BWP configured after the UE enters an RRC connected mode. According to the protocol, a maximum of four dedicated BWPs can be configured for one UE by using RRC signaling, but only one dedicated BWP can be activated for one UE at a time. That is, one UE can activate and use only one BWP at a time. A first active BWP (First Active BWP) is indicated by RRC. Different types of BWPs are used to carry downlink control information (Downlink Control Information, DCI) used for paging in different connected statuses, to implement information transmission between the network side and the UE side.

(3) Terminal device: The terminal device may be a wireless terminal device that can receive scheduling and indication information from a network device. The wireless terminal device may be a device that provides a user with voice and/or data connectivity, a handheld device with a wireless connection function, or another processing device connected to a wireless modem. The terminal device may communicate with one or more core networks or the internet through a radio access network (radio access network, RAN). The terminal device may be a mobile terminal device, for example, a mobile phone (or referred to as a "cellular" phone or a mobile phone (mobile phone)), a computer, or a data card. For example, the terminal device may be a portable, pocket-sized, handheld, computer built-in, or vehicle-mounted mobile apparatus that exchanges voice and/or data with the radio access network. For example, the terminal device may be a device such as a personal communication service (personal communication service, PCS) phone, a cordless phone, a session initiation protocol (SIP) phone, a wireless local loop (wireless local loop, WLL) station, a personal digital assistant (personal digital assistant, PDA), a tablet computer (Pad), or a computer having a wireless transceiver function. The wireless terminal device may also be referred to as a system, a subscriber unit (subscriber unit), a subscriber station (subscriber station), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), or the like. The terminal device may alternatively be a wearable device, a terminal device in a next-generation communication system such as a 5G communication system, a terminal device in a future evolved public land mobile network (public land mobile network, PLMN), or the like.

(4) Network device: The network device may be a device in a wireless network. For example, the network device may be a radio access network (radio access network, RAN) node (or device), which may also be referred to as a base station, through which the terminal device accesses the wireless network. Currently, some examples of the RAN device are: a generation NodeB (generation NodeB, gNodeB) in a 5G communication system, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless fidelity (wireless fidelity, Wi-Fi) access point (access point, AP), or the like. In addition, in a network structure, the network device may include a central unit (centralized unit, CU) node, a distributed unit (distributed unit, DU) node, or a RAN device including a CU node and a DU node. In addition, in another possible case, the network device may be another apparatus that provides a wireless communication function for the terminal device. A specific technology and a specific device form that are used by the network device are not limited in embodiments of this application. For ease of description, in embodiments of this application, the apparatus that provides the wireless communication function for the terminal device is referred to as a network device.

(5) Core network device: The core network device may include a management device and a gateway device. The management device is mainly used for device registration, security authentication, mobility management, position management, and the like of the terminal device. The gateway device is mainly configured to establish a channel with the terminal device, and forward a data packet between the terminal device and an external data network on the channel. The data network may include devices such as a server or a router. The data network is mainly used to provide a plurality of data services for the terminal device.

(6) "A plurality of" means two or more, and another quantifier is similar. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

(7) "Correspondence" may be an association or a binding relationship, and that A corresponds to B means that there is an association or a binding relationship between A and B.

It should be noted that the nouns or terms used in embodiments of this application may be mutually referenced, and details are not described again.

Figure 2:
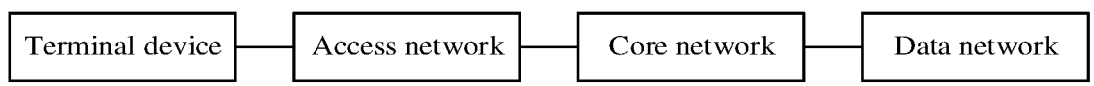
FIG. 2 is a schematic diagram of a network architecture to which an embodiment of this application is applicable.

FIG. 2 is a schematic diagram of a network architecture to which an embodiment of this application is applicable. As shown in FIG. 2, the network architecture includes a terminal device, an access network (Access Network, AN), a core network (Core Network, CN), and a data network (Data Network, DN). A network device is mainly used by the access network to implement functions such as a radio physical layer function, resource scheduling, radio resource management, radio access control, and mobility management. A core network device may include a management device and a gateway device. The management device is mainly used for device registration, security authentication, mobility management, position management, and the like of a terminal device. The gateway device is mainly configured to establish a channel with the terminal device, and forward a data packet between the terminal device and an external data network on the channel. The data network may include devices such as a server and a router. The data network is mainly used to provide a plurality of data services for the terminal device. It should be noted that FIG. 2 is merely a diagram of an example of the architecture. The network architecture may be a 5G network architecture. In addition to the functional units shown in FIG. 2, the network architecture may further include another functional unit. This is not limited in this embodiment. During actual application, a communication system may further include more terminal devices and more RAN devices, and may further include another device.

Figure 3:
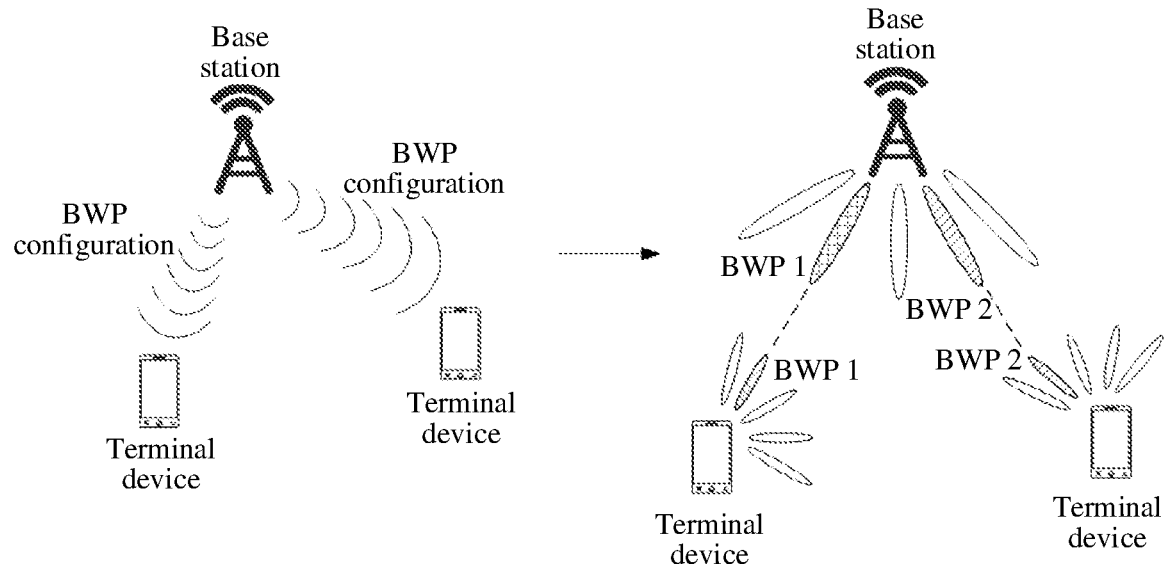
FIG. 3 is a diagram of an application scenario according to an embodiment of this application.

FIG. 3 is a diagram of an application scenario according to an embodiment of this application. As shown in FIG. 3, a network device is, for example, a base station. The base station sends a BWP configuration to a terminal device, so that data can be transmitted between the base station and the terminal device by using a BWP. In a currently reserved solution in 5G, the base station may configure, on an initial BWP and/or an active BWP, a control resource set (Control-resource set, CORESET) and search space (search space) used for paging. The terminal device learns of, by using the configuration, a time-frequency resource position (for example, a PDCCH) for sending a paging message, calculates a paging frame (Paging Frame, PF) and a paging occasion (Paging Occasion, PO) by using a pre-obtained parameter, and listens to the paging message at a position corresponding to the PF and the PO, to obtain the paging message sent by the base station.

Figure 3A:
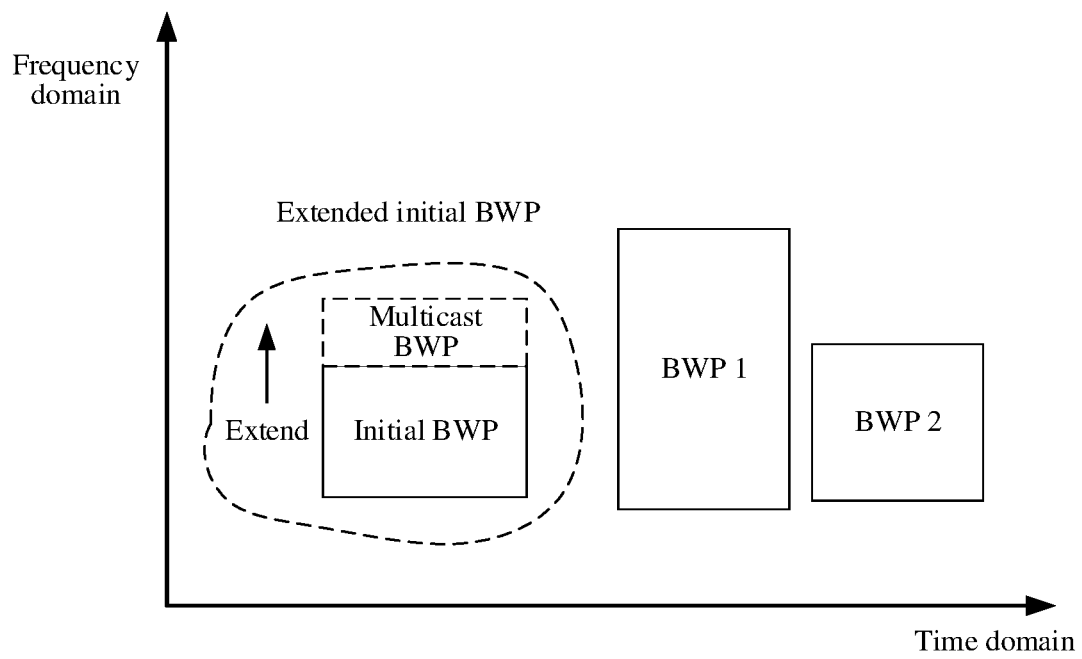
FIG. 3A is a schematic diagram of an extended initial BWP used for multicast paging according to an embodiment of this application.

After multicast (Multicast) transmission is introduced in a 5G-NR protocol, to page a terminal device interested in a multicast service or a terminal device in a multicast group (referred to as "multicast paging" below for short), the network device designs a multicast BWP. The multicast BWP is a BWP used to transmit the multicast service, and may be configured by the network device. In this application, the multicast BWP has the following two possible implementations. In a possible implementation, the multicast BWP includes an extended initial BWP or a part of the extended initial BWP. FIG. 3A is a schematic diagram of an extended initial BWP used for multicast paging according to an embodiment of this application. As shown in FIG. 3A, an initial BWP is extended in frequency domain based on an original initial BWP, to form the extended initial BWP, and an extended frequency band is used as the multicast BWP. There are a plurality of manners of extending the initial BWP in frequency domain. For example, a frequency band corresponding to the original initial BWP is a hertz (Hz) to b Hz, and the frequency band corresponding to the original initial BWP is extended to a Hz to c Hz, where c is greater than b. In this case, a BWP corresponding to a frequency band of b Hz to c Hz is a multicast BWP, and the multicast BWP overlaps the extended initial BWP. For another example, a frequency band corresponding to the original initial BWP is a Hz to b Hz, and the frequency band corresponding to the original initial BWP is extended to d Hz to b Hz, where d is less than a. For still another example, a frequency band corresponding to the original initial BWP is a Hz to b Hz, and the frequency band corresponding to the original initial BWP is extended to d Hz to c Hz, where c is greater than b, and d is less than a.

Figure 3B:
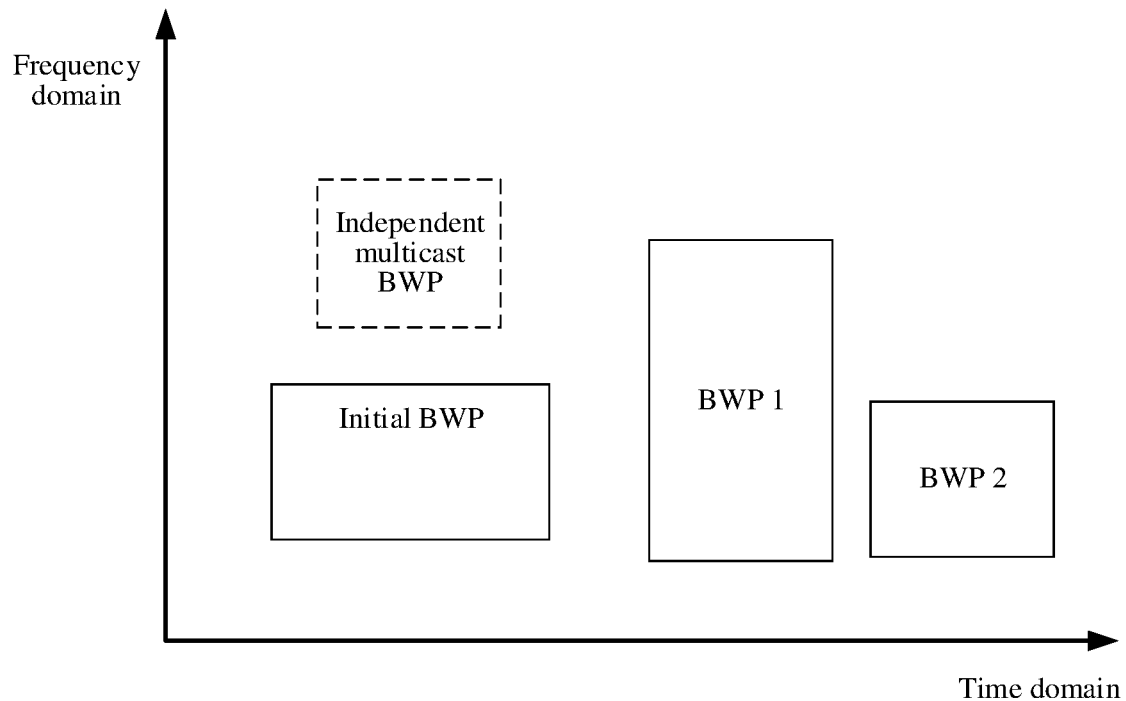
FIG. 3B is a schematic diagram of an independent multicast BWP used for multicast paging according to an embodiment of this application.

In another possible implementation, the multicast BWP is implemented by introducing an independent multicast BWP. FIG. 3B is a schematic diagram of an independent multicast BWP used for multicast paging according to an embodiment of this application. As shown in FIG. 3B, a manner of implementing the multicast BWP by using the independent multicast BWP is different from the manner of implementing the multicast BWP by using the extended initial BWP. The independent multicast BWP and the initial BWP do not overlap in frequency domain, and are independent of each other. For example, the frequency band corresponding to the initial BWP is a Hz to b Hz, and a frequency band corresponding to the independent multicast BWP is c Hz to d Hz, where a<b<c<d. In this case, a BWP corresponding to a frequency band of c Hz to d Hz is an independent multicast BWP, and the independent multicast BWP does not overlap the initial BWP corresponding to the frequency band of a Hz to b Hz. It should be noted that the independent multicast BWP is an abbreviation in this application for the purpose of distinguishing between the two types of BWPs. A concept of the independent multicast BWP is relative to that of the extended initial BWP, and it does not mean that the independent multicast BWP does not overlap another dedicated BWP.

However, because different terminal devices may support different BWPs, when the network device pages UE, the network device cannot determine whether a position at which the UE receives paging is an initial BWP or a multicast BWP. To page the UE, the network device may page the UE at paging positions of the two BWPs, and consequently a waste of paging resources is caused.

To resolve the foregoing problem, an embodiment of this application provides a communication method. A bandwidth part supported by a terminal device is determined by using first capability information of the terminal device, so that paging receiving and sending between the terminal device and a network on the target bandwidth part can be implemented, thereby improving paging efficiency, and avoiding a waste of paging resources.

Figure 4:
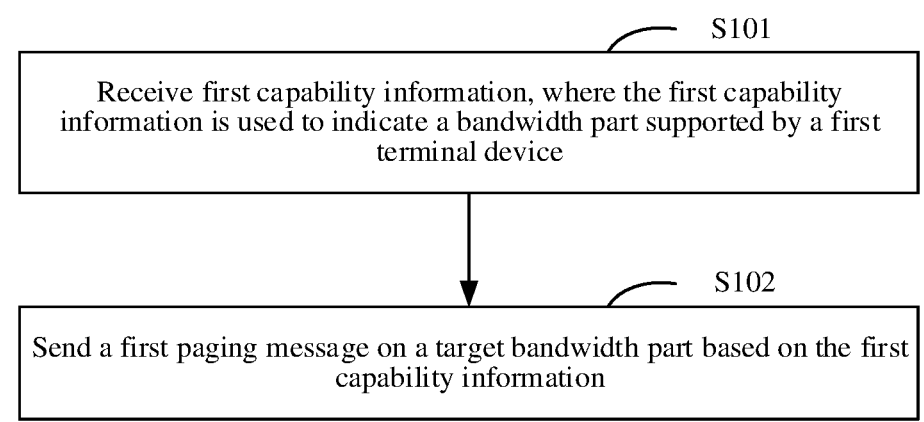
FIG. 4 is a schematic flowchart 1 of a communication method according to an embodiment of this application.

FIG. 4 is a schematic flowchart 1 of a communication method according to an embodiment of this application. The method is applied to a network device. As shown in FIG. 4, the method includes the following steps.

S101: Receive first capability information, where the first capability information is used to indicate a bandwidth part supported by a first terminal device.

For example, the first capability information indicates the bandwidth part supported by the first terminal device. In some embodiments, the first capability information indicates a type of the bandwidth part supported by the first terminal device. For example, the first capability information indicates whether the first terminal supports receiving of a paging message on an independent multicast BWP or receiving of a paging message on an extended initial BWP, to implement a multicast paging service. Optionally, the first capability information may use one bit (bit) or one field to indicate the bandwidth part supported by the terminal device. For example, when one bit is used for indication, a value "1" of the bit indicates that receiving of a paging message on the independent multicast BWP is supported; or otherwise, it indicates that receiving of a paging message on the independent multicast BWP is not supported.

For another example, one field is used to indicate whether the information is supported. When the field is included, it indicates that a multicast capability corresponding to the field is supported. In some embodiments, for example, when the first capability information includes a field A, it indicates that the first terminal device supports receiving of a paging message on the independent multicast BWP; or when the first capability information includes a field B, it indicates that the first terminal device supports receiving of a paging message on the extended initial BWP. On the contrary, if the field is not included, it indicates that the multicast capability corresponding to the field is not supported. It should be noted that the first capability information may alternatively be indicated by using a plurality of bits or at least one field. A quantity of bits or fields indicating the first capability information is not limited in this application.

Figures 4A, 5:
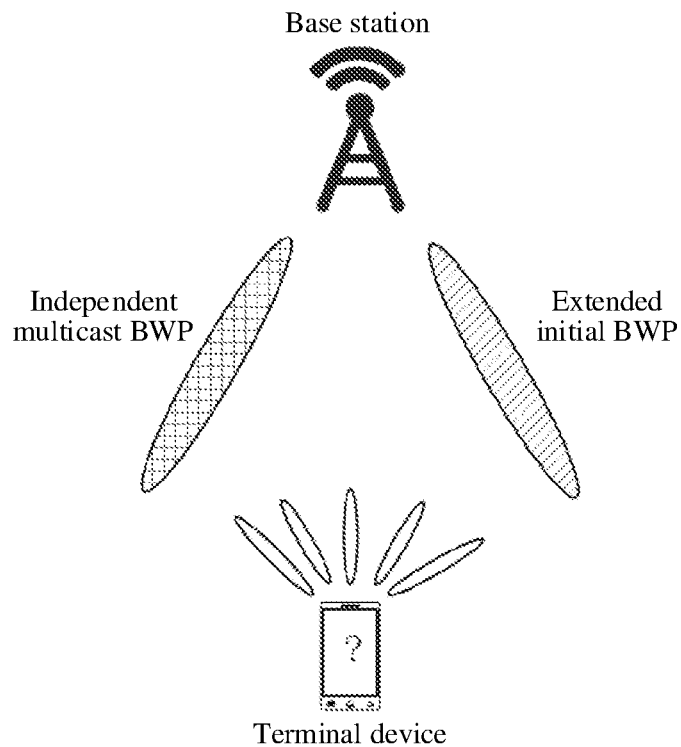
FIG. 4A is a schematic diagram of a correspondence between a terminal device and first capability information.
FIG. 5 is a schematic diagram of paging a terminal device by a network device according to an embodiment of this application.

Different terminal devices have respective first capability information, and the first capability information is used to indicate the bandwidth part supported by the first terminal device. For example, FIG. 4A is a schematic diagram of a correspondence between a terminal device and first capability information. As shown in FIG. 4A, first capability information corresponding to a terminal device A is supporting a first bandwidth part, first capability information corresponding to a terminal device B is supporting a second bandwidth part, and first capability information corresponding to a terminal device C is supporting the first bandwidth part and the second bandwidth part. The first bandwidth part and the second bandwidth part each are an independent multicast bandwidth part or an extended initial bandwidth part. The extended initial bandwidth part is an extended initial BWP. An initial BWP is extended in frequency domain based on the original initial BWP, to form the extended initial BWP. An extended frequency band is used as a multicast BWP, and the multicast BWP overlaps the extended initial BWP. The independent multicast bandwidth part is an independent multicast BWP. A manner of implementing the multicast BWP by using the independent multicast BWP is different from a manner of implementing the multicast BWP by using the extended initial BWP. The independent multicast BWP does not overlap the initial BWP in frequency domain, and the multicast BWP is implemented by introducing an independent BWP. The first bandwidth part and the second bandwidth part correspond to different first capability information. For example, in FIG. 4A, the first bandwidth part may be an independent multicast BWP, and the second bandwidth part may be an extended initial BWP. It may be understood that the terminal device A supports receiving of a paging message on the independent multicast BWP, the terminal device B supports receiving of a paging message on the extended initial BWP, and the terminal device C supports both receiving of a paging message on the independent multicast BWP and receiving of a paging message on the extended initial BWP.

There are a plurality of implementations in which the first capability information indicates the bandwidth part supported by the first terminal device. For example, the first capability information indicates a BWP identifier, and the BWP identifier corresponds to a BWP supported by the terminal device. Optionally, there may be one or more BWP identifiers. For another example, the first capability information indicates information about a supported BWP, and the information about the BWP includes at least one of the following: a start position of the BWP, a width in frequency domain, and a subcarrier spacing SCS corresponding to the BWP.

The first capability information is an identifier that can describe a BWP supported by the terminal device, or other character string information that can distinguish between BWPs. The identifier and the character string information may be preset. A specific representation form of the first capability information is not limited herein.

The network device receives the first capability information in a plurality of manners. For example, the network device receives the first capability information from the terminal device, or receives the capability information from a core network device.

In a possible implementation, the terminal device reports the first capability information to the network device, to indicate a BWP on which receiving of a paging message is supported. For example, the terminal device sends a BWP identifier to the network device, to indicate that the terminal device supports receiving of a paging message on a BWP corresponding to the BWP identifier. In some embodiments, for example, a terminal device a sends a first BWP identifier to the network device, to indicate that the terminal device a supports receiving of a paging message on the independent multicast BWP, and a terminal device b sends a second BWP identifier to the network device, to indicate that the terminal device b supports receiving of a paging message on the extended initial BWP.

In another possible implementation, the core network device sends the first capability information to the network device, to indicate a BWP on which the terminal device supports receiving of a paging message. For example, the core network device sends the first capability information to the network device, and the first capability information includes identification information of the terminal device and BWP description information corresponding to the identification information. Optionally, the BWP description information is a BWP identifier, and the terminal device supports receiving of a paging message on a BWP corresponding to the BWP identifier. In some embodiments, for example, the core network device sends the first capability information to the network device. The first capability information includes identification information dev_1 of a terminal device and a first BWP identifier corresponding to the identification information dev_1 of the terminal device, and the first BWP identifier is used to indicate that the terminal device whose identification information is dev_1 supports receiving of a paging message on the independent multicast BWP. For another example, the core network device sends the first capability information to the network device. The first capability information includes identification information dev_2 of a terminal device and a second BWP identifier corresponding to the identification information dev_2 of the terminal device, and the second BWP identifier is used to indicate that the terminal device whose identification information is dev_2 supports receiving of a paging message on the extended initial BWP.

Further, the network device may determine, based on the first capability information, a BWP on which the first terminal device supports receiving of a paging message.

S102: Send a first paging message on a target bandwidth part based on the first capability information.

After the network device obtains the first capability information, because the first capability information may indicate the bandwidth part supported by the first terminal device, the network device may determine the target bandwidth part based on the first capability information, so as to page the first terminal device on the target bandwidth part. The target bandwidth part is a BWP used to send a paging message to the first terminal device. For example, if the BWP supported by the first terminal device is an independent multicast BWP, the target bandwidth part is also an independent multicast BWP; or if the BWP supported by the first terminal device is an extended initial BWP, the target bandwidth part is also an extended initial BWP. The network device may send the first paging message on the target bandwidth part, to page the first terminal device. A process in which the network device sends the first paging message on the target bandwidth part is not described herein again.

FIG. 5 is a schematic diagram of paging a terminal device by a network device in a related technology according to an embodiment of this application. As shown in FIG. 5, because different terminals support different BWPs, the different terminals may have respective paging listening positions on an independent multicast BWP and an extended initial BWP. When the network device wants to page the terminal device, the network device cannot determine whether a paging receiving position of the terminal device is the extended initial BWP or the independent multicast BWP. Therefore, the network device pages the terminal device at paging positions of the two BWPs, and consequently paging resources are wasted.

Figure 6:
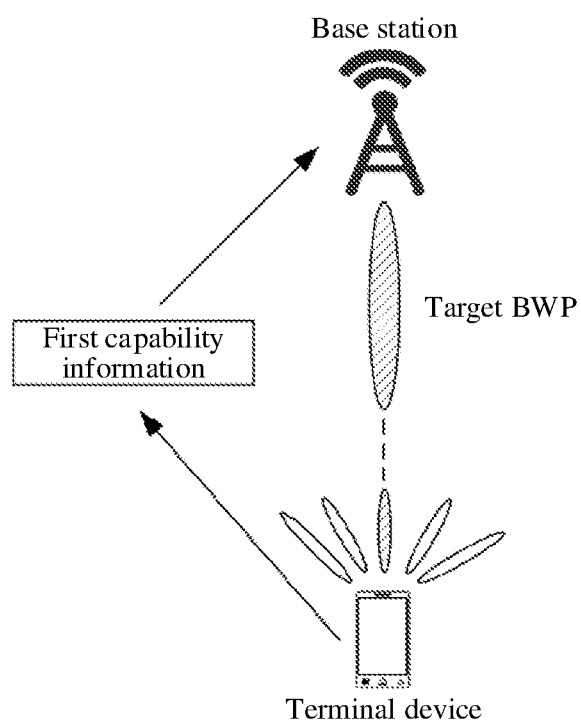
FIG. 6 is a schematic diagram of paging a terminal device by a network device according to an embodiment of this application.

FIG. 6 is a schematic diagram of paging a terminal device by a network device according to an embodiment of this application. As shown in FIG. 6, a base station obtains first capability information, determines a target bandwidth part (target BWP), and further sends a paging message on the target bandwidth part, to page the terminal device.

In this application, the network device receives the first capability information, determines the bandwidth part supported by the first terminal device, and sends the first paging message on the target bandwidth part, where the bandwidth part is used to carry paging or another message. The target bandwidth part matches the bandwidth part supported by the first terminal device. Therefore, sending the first paging message on the target bandwidth part can reduce a quantity of paging messages sent by the network device on other bandwidth parts, and compared with attempting to send the first paging message by the network device on a plurality of bandwidth parts, can effectively reduce a quantity of times of unnecessary paging sending by the network device, so as to reduce a quantity of wasted paging resources. This can effectively reduce a quantity of times of unnecessary listening of the first terminal device, reduce energy consumption of the terminal device, and improve paging efficiency.

Figure 7:
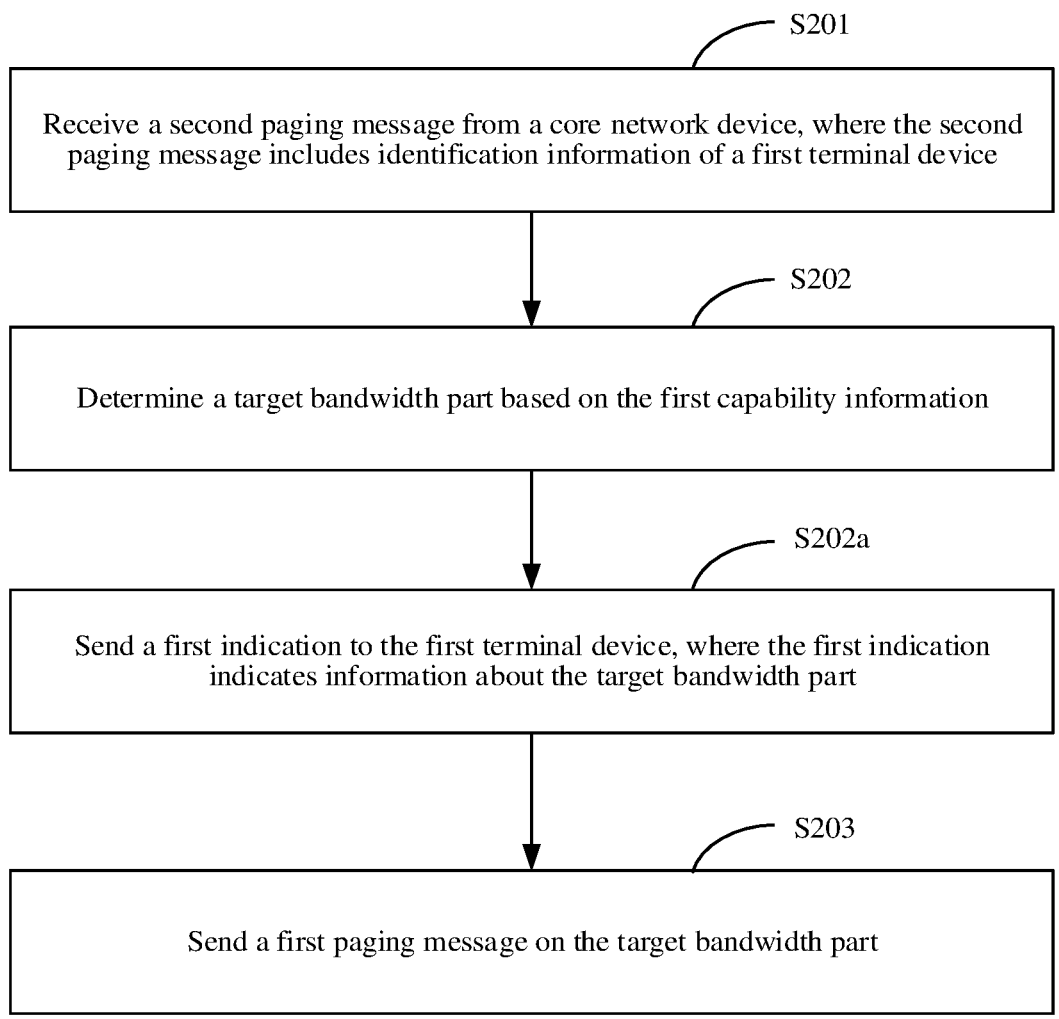
FIG. 7 is a schematic flowchart 2 of a communication method according to an embodiment of this application.

FIG. 7 is a schematic flowchart 2 of a communication method according to an embodiment of this application. As shown in FIG. 7, on the basis of the communication method provided in the embodiment shown in FIG. 4, step S101 in the communication method provided in this embodiment is refined based on a source of first capability information. The communication method provided in this embodiment includes the following steps.

S201: Receive a second paging message from a core network device, where the second paging message includes identification information of a first terminal device.

The core network device is communicatively connected to a network device. The network device is, for example, a gNB. The core network device is, for example, an AMF. For example, when multicast paging is to be performed, the AMF sends the second paging message to the gNB. The second paging message includes the identification information of the first terminal device that the AMF is to page and specific paging information. The gNB can send the specific paging information to the first terminal device based on the received second paging message.

For example, the identification information of the first terminal device includes at least one of the following: a terminal identifier, a group identifier corresponding to the terminal, and a service identifier corresponding to the terminal.

The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device.

The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier.

The service identifier corresponding to the terminal is used to indicate a service identifier corresponding to a paged terminal device. Optionally, the service identifier may be a multicast service identifier. The multicast service identifier may be a TMGI or a G-RNTI.

For example, the second paging message includes identification information of at least one first terminal device, and there is a mapping relationship between the identification information of the first terminal device and the first capability information. In a possible implementation, at least one piece of first capability information and a table of mapping between the first capability information and the identification information of the terminal device are preset in the network device, and the mapping table includes a mapping entry that describes the mapping relationship between the first capability information and the identification information of the terminal device. The network device may determine the corresponding first capability information based on the identification information of the first terminal device in the second paging message and the mapping entry in the mapping table. In another possible implementation, the second paging message further includes at least one piece of first capability information, and each piece of first capability information corresponds to the identification information of the first terminal device in the second paging message in a one-to-one or one-to-many mapping manner, that is, one piece of first capability information corresponds to identification information of one first terminal device, or one piece of first capability information corresponds to identification information of a plurality of first terminal devices. The network device determines, by using the second paging message, identification information of at least one first terminal device and first capability information corresponding to the identification information of the at least one first terminal device.

The second paging message includes at least one of the following: a DRX configuration, a message type indication, a paging priority, a TAI list, paging attempt quantity information, and the like.

In this application, the network device receives the second paging message from the core network device, obtains the identification information of the first terminal device from the second paging message, and determines, based on the pre-obtained mapping relationship between the identification information of the first terminal device and the first capability information, the first capability information corresponding to the first terminal device. When paging is performed on the target bandwidth based on the first capability information, the first terminal device may be paged. In addition, the terminal identifier may indicate one terminal device, or may indicate one group of terminal devices, so that the network device can page one group of terminals or a plurality of terminal devices in a same service group by using one terminal identifier, thereby reducing signaling overheads of paging the first terminal device by the network device, and improving efficiency of paging the first terminal device by the network device.

In a possible implementation, the identification information of the first terminal device is reported by the first terminal device to the core network device, or is obtained by the core network device by using an application server. There is a preset mapping relationship between the identification information of the first terminal device and service information of the first terminal device. The core network device may learn of the corresponding service information by using the identification information of the first terminal device. For example, the core network device determines, by using the identification information of the first terminal device, multimedia broadcast multicast service (Multimedia Broadcast Multicast Service, MBMS) information supported by the first terminal device and/or multicast service information that the first terminal device is interested in, and further determines a specific paging policy, to implement a paging manner that matches the service information of the first terminal device.

S202: Determine a target bandwidth part based on the first capability information.

Figure 8:
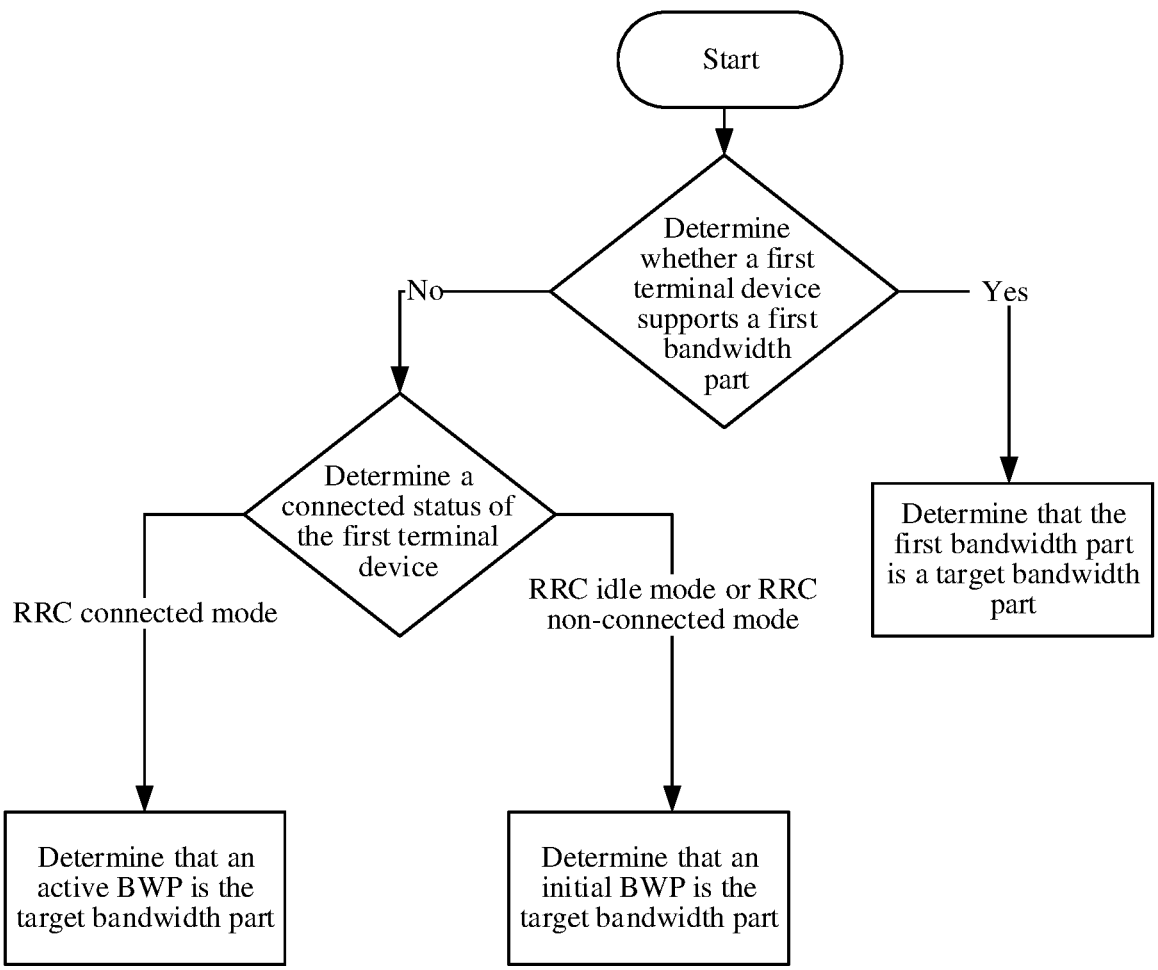
FIG. 8 is a schematic flowchart of determining a target bandwidth part according to an embodiment of this application.

FIG. 8 is a schematic flowchart of determining a target bandwidth part according to an embodiment of this application. As shown in FIG. 8, in a possible implementation, a manner in which the network device determines the target bandwidth part includes:

when the first terminal device supports a first bandwidth part, determining that the target bandwidth part is the first bandwidth part; or when the first terminal device does not support the first bandwidth part, and the first terminal device is in an RRC idle mode or an RRC inactive mode, determining that the target bandwidth part is an initial BWP; or when the first terminal device does not support the first bandwidth part, and the first terminal device is in an RRC connected mode, determining that the target bandwidth part is an active BWP. For example, the first bandwidth part may be a multicast BWP or an extended initial BWP.

In some embodiments, because the first bandwidth part carries a position used to listen to paging, that is, search space and/or a CORESET, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part. The first bandwidth part may be distinguished from another bandwidth part by using at least one of a frequency domain width, a frequency domain position, and a subcarrier spacing.

In a possible implementation, after step S202, the method further includes:

S202a: Send a first indication to the first terminal device, where the first indication indicates information about the target bandwidth part.

For example, the first indication may be carried in configuration information sent by the network device to the first terminal device, and indicates the information about the target bandwidth part on which the first terminal device receives paging.

For example, the information about the target bandwidth part includes a BWP identifier. In some embodiments, the BWP identifier is used to indicate an "extended initial BWP" or an "independent multicast BWP". If the information about the target bandwidth part is a BWP identifier, the terminal device determines, based on a mapping relationship between a BWP identifier and a BWP, the target bandwidth part corresponding to the BWP identifier. In a possible implementation, the terminal device determines a mapping relationship between a BWP identifier and a BWP, and sends the mapping relationship to the network device. For example, the terminal device may send the mapping relationship between a BWP identifier and a BWP when sending the first capability information. In another possible implementation, the network device determines a mapping relationship between a BWP identifier and a BWP, and sends the mapping relationship to the terminal device. Correspondingly, the terminal device receives the information about the target bandwidth part and the mapping relationship from the network device, and the information about the target bandwidth part is a BWP identifier of the target bandwidth part. Further, the terminal device determines the target bandwidth part based on the BWP identifier and the mapping relationship. The mapping relationship determined by the network device may be determined based on indication information from the core network device. For example, the core network device determines a mapping relationship between a BWP identifier and a BWP, and sends the mapping relationship to an access network device, and the access network device sends the mapping relationship to the terminal device.

For example, the information about the target bandwidth part includes a position information indication of the target bandwidth part in frequency domain. In some embodiments, for example, the information about the target bandwidth part includes information describing a "start position" and a "frequency domain bandwidth". For another example, the information about the target bandwidth part includes information describing an "end position" and a "frequency domain bandwidth". For still another example, the information about the target bandwidth part includes information describing a "start position" and an "end position".

For example, the first indication may be carried in an RRC message, a media access control control element (MAC Control Element, MAC CE), or downlink control information (Downlink Control Information, DCI).

For example, the first terminal device can support a plurality of BWPs. After receiving the first indication sent by the network device, the first terminal device may receive, based on the first indication, a paging message at a paging position corresponding to the target bandwidth part, so that the target bandwidth part on which the first terminal device receives paging matches a target bandwidth part on which the network device sends paging.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

S203: Send a first paging message on the target bandwidth part.

In some embodiments, the first paging message is generated by the network device based on the second paging message, and the first paging message includes a terminal identifier of the first terminal device. For example, the first paging message may correspond to a multicast paging service, or may correspond to a unicast paging service.

In a possible implementation, the step of sending a first paging message by the network device on the target bandwidth part includes:

The network device receives the second paging message sent by the core network device, and the second paging message includes the identification information of the first terminal device and specific paging content that is to be sent to the first terminal device. The network device generates, based on the specific paging content, the first paging message used to page the first terminal device, and the network device sends the first paging message on the target bandwidth part. Correspondingly, the first terminal device receives the first paging message on the target bandwidth part, and after receiving the first paging message, the first terminal device obtains the specific paging content in the first paging message, so that the core network device can page the first terminal device by using the network device.

Optionally, the first paging message may further include an access type, and the access type indicates whether the paging message is sent due to a protocol data unit (Protocol Data Unit, PDU) session accessed from non-3GPP.

In a possible implementation, the sending a first paging message on the target bandwidth part includes: sending the first paging message at a time-frequency resource position that is used for paging and that corresponds to the target bandwidth part, where the time-frequency resource position is determined based on the target bandwidth part and a correspondence between the target bandwidth part and search space or a CORESET. A correspondence between each of different bandwidth parts and search space or a CORESET may be preconfigured by the network device. For example, the correspondence may be sent by the network device to the terminal device by using an RRC reconfiguration message.

In this embodiment of this application, the first capability information is delivered by the core network device to the network device. After obtaining the first capability information in different ways, the core network device delivers the identification information of the terminal device and the corresponding capability information to the network device, so that the network device can learn of the BWP supported by the first terminal device. Therefore, when sending the first paging information to the first terminal device, the network device can perform paging on the bandwidth part supported by the first terminal device, so as to reduce a quantity of paging resources wasted because paging is performed on a plurality of BWPs.

Figure 9:
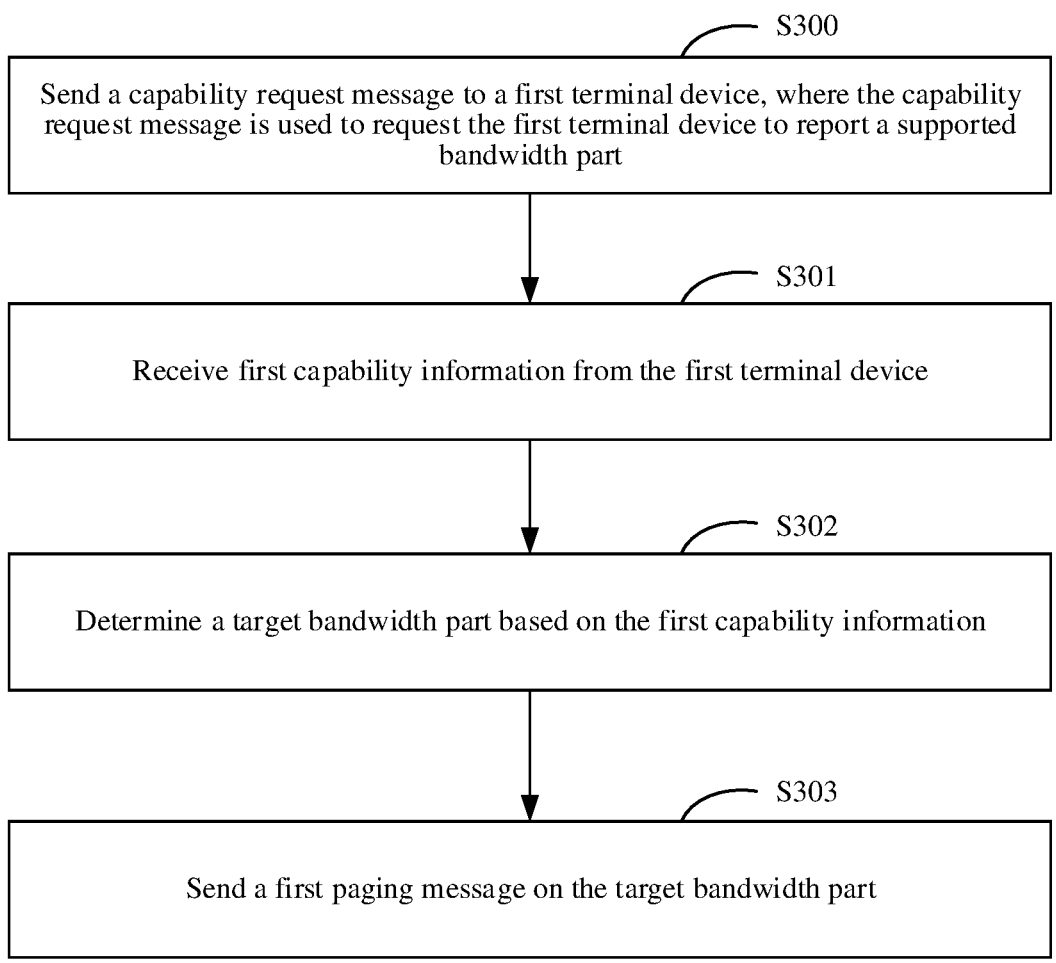
FIG. 9 is a schematic flowchart 3 of a communication method according to an embodiment of this application.

FIG. 9 is a schematic flowchart 3 of a communication method according to an embodiment of this application. As shown in FIG. 9, on the basis of the communication method provided in the embodiment shown in FIG. 4, step S101 in the communication method provided in this embodiment is refined based on a source of first capability information. The communication method provided in this embodiment includes the following steps.

S301: Receive first capability information from a first terminal device.

In a possible implementation, the terminal device reports the first capability information to a network device, to indicate a BWP on which receiving of a paging message is supported. For example, the terminal device sends a BWP identifier to the network device, to indicate that the terminal device supports receiving of a paging message on a BWP corresponding to the BWP identifier. In some embodiments, for example, a terminal device a sends a first BWP identifier to the network device, to indicate that the terminal device a supports receiving of a paging message on an independent multicast BWP, and a terminal device b sends a second BWP identifier to the network device, to indicate that the terminal device b supports receiving of a paging message on an extended initial BWP. Further, for example, the first capability information may be carried in a UE capability information (UECapabilityInformation) message or another RRC message, and is sent by the first terminal device to the network device. The network device may connect the terminal device to a RAN node or a device, which may also be referred to as a base station.

S302: Determine a target bandwidth part based on the first capability information.

S303: Send a first paging message on the target bandwidth part.

Implementations and technical effects of steps S302 and S303 in this embodiment are the same as the implementations and the technical effects of steps S202 and S203 in the embodiment shown in FIG. 7, and details are not described herein again.

In a possible implementation, before step S301, the method further includes:

S300: Send a capability request message to the first terminal device, where the capability request message is used to request the first terminal device to report the supported bandwidth part.

Optionally, the capability request message may be a UECapabilityEnquiry message or another RRC message. The first capability information received by the network device may be stored in a storage medium of the network device, or may be forwarded to a core network device. Before the first capability information is received, the capability request message is sent to the first terminal device, to request the first terminal device to report the first capability information to the network device, so that the first capability information is synchronized between the first terminal device and the network device, thereby implementing synchronization of the target bandwidth part. In this way, a paging message can be received and sent between the network device and the first terminal device on the target bandwidth part.

In this embodiment of this application, the first capability information is reported by the first terminal device to the network device. The first terminal device generates the first capability information based on a BWP supported by the first terminal device, and sends the first capability information to the network device, so that the network device can learn of the BWP supported by the first terminal device. Therefore, when sending the first paging information to the first terminal device, the network device can perform paging on the bandwidth part supported by the first terminal device, so as to reduce a quantity of paging resources wasted because paging is performed on a plurality of BWPs.

Figure 10:
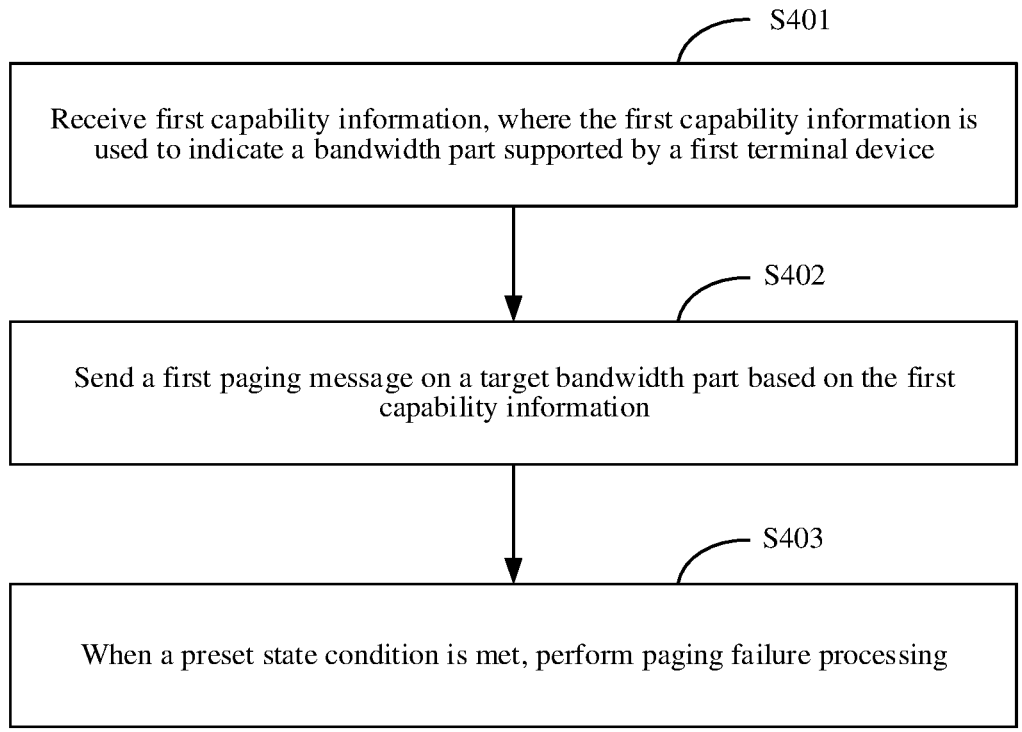
FIG. 10 is a schematic flowchart 4 of a communication method according to an embodiment of this application.

FIG. 10 is a schematic flowchart 4 of a communication method according to an embodiment of this application. As shown in FIG. 10, on the basis of the communication method provided in the embodiment shown in FIG. 4, a step of processing a paging failure is added in the communication method provided in this embodiment. The communication method provided in this embodiment includes the following steps.

S401: Receive first capability information, where the first capability information is used to indicate a bandwidth part supported by a first terminal device.

S402: Send a first paging message on a target bandwidth part based on the first capability information.

For implementations and technical effects of steps S401 and S402 in this embodiment, refer to the implementations and the technical effects of steps S101 and S102 in the embodiment shown in FIG. 4, and details are not described herein again.

S403: When a preset state condition is met, perform paging failure processing.

In some embodiments, a process of performing paging failure processing by a network device includes: when the preset state condition is met, performing at least one of the following: sending the capability request message to the first terminal device, where the capability request message is used to request the first terminal device to report the supported bandwidth part; and sending the first paging message on at least one available bandwidth part, where the available bandwidth part is a bandwidth part for which a paging resource is configured.

The sending the first paging message by the network device on at least one available bandwidth part is, for example: sending the first paging message on all bandwidth parts for which a paging resource is configured and that can be used to send paging; or randomly selecting one bandwidth part from one or more bandwidth parts for which a paging resource is configured and that can be used to send paging, to send the first paging message; or selecting, from one or more bandwidth parts for which a paging resource is configured and that can be used to send paging, a bandwidth part corresponding to a time domain position at which a paging message is sent most recently, to send the first paging message.

Optionally, the preset state condition includes at least one of the following: a quantity of times of sending the first paging message is greater than a first threshold; the first paging message fails to be sent; and no response information is received from the first terminal device within first duration after the first paging message is sent. Optionally, the first threshold is determined based on the paging attempt quantity information from the core network device.

In this application, when a preset condition is met, the network device sends the capability request message to the first terminal device, and/or sends the first paging message on the at least one available bandwidth part. When the network device performs paging communication with the first terminal device, a problem such as a paging failure or a paging timeout may occur, and consequently normal communication between the network device and the first terminal device is affected. The problem may be caused because an incorrect target bandwidth part is used, or channel quality is poor. Therefore, when a problem occurs when the network device performs paging on the target bandwidth part, the network device re-sends the capability request information and/or the first paging message to the first terminal device, to obtain the bandwidth part supported by the first terminal device, so as to re-determine the target bandwidth part, and/or attempt to perform paging on at least one another available bandwidth part, so as to correct a problem that occurs in a paging process. This improves quality of paging between the network device and the first terminal device.

Certainly, it should be noted that the step of processing the paging failure by the network device added in this embodiment may also be applied to the embodiments corresponding to FIG. 7 and FIG. 9, that is, after step S203 in the embodiment shown in FIG. 7 or after step S303 in the embodiment shown in FIG. 9, step S403 in this embodiment is added, and corresponding technical effects are achieved. A solution in which the embodiment shown in FIG. 10 is combined with the embodiment shown in FIG. 7 or FIG. 9 is not described in detail herein.

Figure 11:
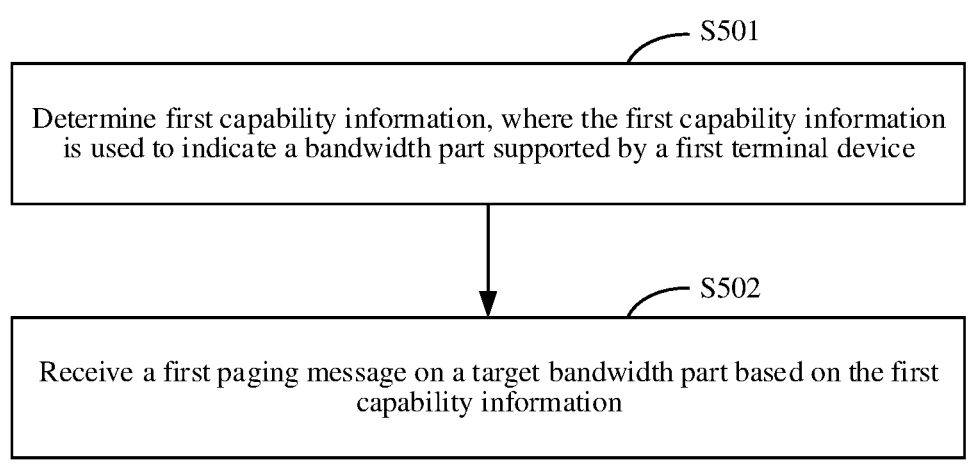
FIG. 11 is a schematic flowchart 5 of a communication method according to an embodiment of this application.

FIG. 11 is a schematic flowchart 5 of a communication method according to an embodiment of this application. The method is applied to a first terminal device. As shown in FIG. 11, the method includes the following steps.

S501: Determine first capability information, where the first capability information is used to indicate a bandwidth part supported by the first terminal device.

For example, the first terminal device determines the first capability information, that is, determines a type of the bandwidth part supported by the first terminal device, for example, whether the first terminal device supports an independent multicast BWP, or extends a BWP used for multicast paging on an initial BWP, or both. The first capability information of the first terminal device may be preset. The first terminal device may determine, based on preset information, for example, information about a supported protocol and an operating system, the bandwidth part supported by the first terminal device, that is, the first capability information.

In a possible implementation, a method for determining the first capability information includes: when the first terminal device supports a first bandwidth part, determining that the target bandwidth part is the first bandwidth part; or when the first terminal device does not support the first bandwidth part, and the first terminal device is in an RRC idle mode or an RRC inactive mode, determining that the target bandwidth part is an initial BWP; or when the first terminal device does not support the first bandwidth part, and the first terminal device is in an RRC connected mode, determining that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part. Optionally, the first bandwidth part is an independent multicast bandwidth part or an extended initial bandwidth part.

In this embodiment of this application, the step of determining first capability information is the same as the step of determining first capability information of the first terminal device provided in the embodiment shown in FIG. 7. Details are not described herein again.

S502: Receive a first paging message on a target bandwidth part based on the first capability information.

The first terminal device can determine, based on the first capability information, the bandwidth part supported by the first terminal device, and further use the bandwidth part supported by the first terminal device as the target bandwidth part to perform paging receiving on the target bandwidth part. When learning of the first capability information of the first terminal device, a network device may send the first paging message on the target bandwidth part corresponding to the first capability information, to implement paging information receiving and sending between the network device and the first terminal device.

In this application, the first terminal device determines the first capability information, to determine the bandwidth part supported by the first terminal device, and receives the first paging message on the target bandwidth part. Because the target bandwidth part is indicated by using the capability information of the first terminal device, the target bandwidth part matches the bandwidth part supported by the first terminal device. The first terminal device may receive the first paging message on the target bandwidth part, and a network device that uses the first capability information can page the first terminal device only by sending paging on the target bandwidth part, without attempting to send another paging message on another bandwidth part. This resolves a problem of a paging resource waste, and improves paging efficiency.

Figure 12:
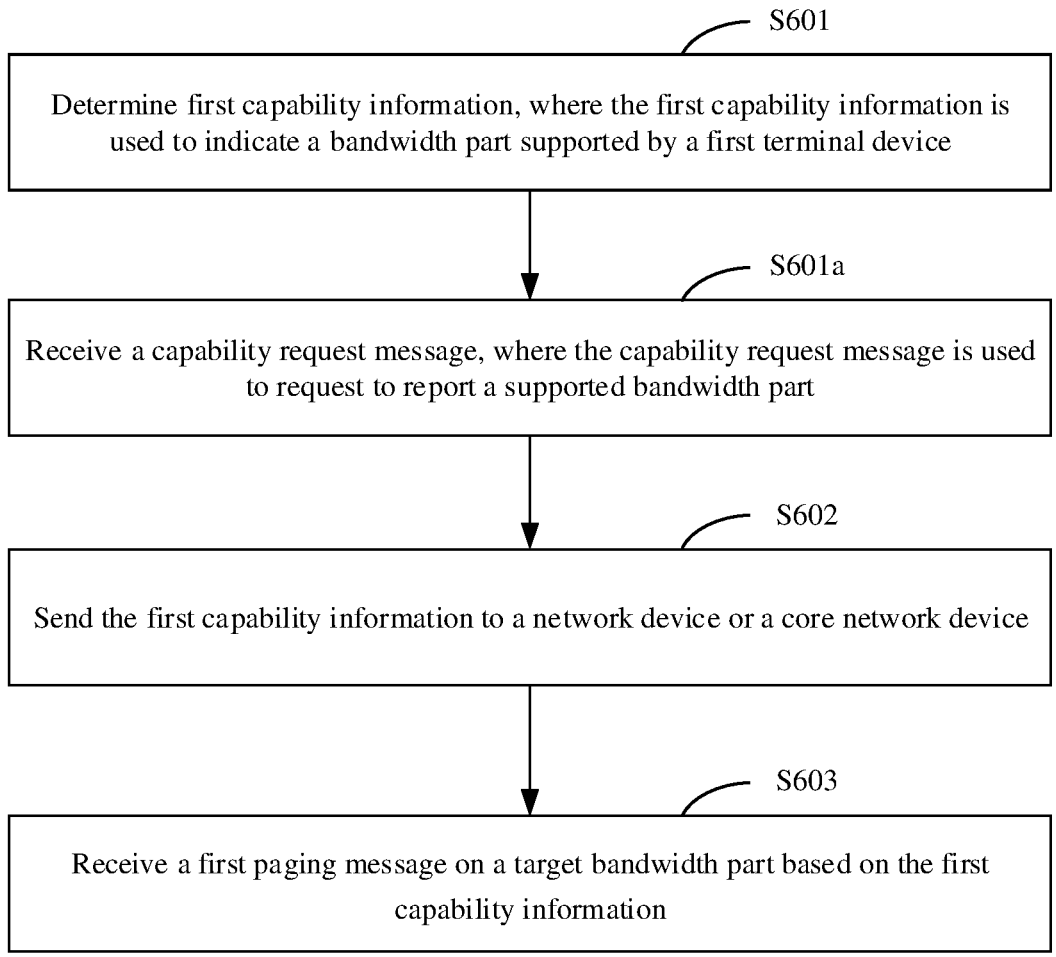
FIG. 12 is a schematic flowchart 6 of a communication method according to an embodiment of this application.

FIG. 12 is a schematic flowchart 6 of a communication method according to an embodiment of this application. As shown in FIG. 12, on the basis of the communication method provided in the embodiment shown in FIG. 11, a step of sending first capability information is added in the communication method provided in this embodiment. The method includes the following steps.

S601: Determine first capability information, where the first capability information is used to indicate a bandwidth part supported by a first terminal device.

S602: Send the first capability information to a network device or a core network device.

In a possible implementation, the first terminal device sends the first capability information to the network device. In some embodiments, the first terminal device reports information about the bandwidth part supported by the first terminal device to the network device as the first capability information, so that the network device can determine the corresponding target bandwidth part by using the first capability information. Optionally, the first capability information may be carried in a terminal device capability information (UECapabilityInformation) message or another RRC message, and is sent by the first terminal device to the network device.

In a possible implementation, the first terminal device sends the first capability information to the core network device. In some embodiments, the first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the first capability information to the AMF, to report the first capability information.

S603: Receive a first paging message on a target bandwidth part based on the first capability information.

In a possible implementation, before step S602, the method further includes:

S601a: Receive a capability request message, where the capability request message is used to request to report the supported bandwidth part.

Optionally, the capability request message may be sent by the network device, the core network device, or another terminal device, and the capability request message may be a UECapabilityEnquiry message or another RRC message. The first terminal device receives the capability request message, and reports the first capability information of the first terminal device to the network device, the core network device, or the another terminal device in response to the capability request message, so that the first capability information can be synchronized between the first terminal device and another device, thereby implementing synchronization of the target bandwidth part. In this way, the first terminal device can receive a paging message on the target bandwidth part.

Implementations and technical effects of steps S601 and S603 in this embodiment are the same as the implementations and the technical effects of steps S501 and S502 in the embodiment shown in FIG. 11, and details are not described herein again.

Figure 13:
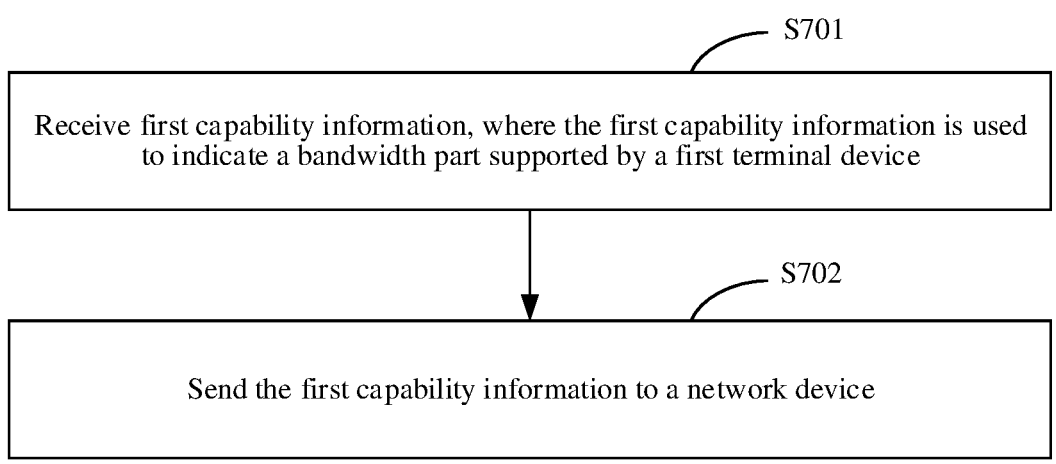
FIG. 13 is a schematic flowchart 7 of a communication method according to an embodiment of this application.

FIG. 13 is a schematic flowchart 7 of a communication method according to an embodiment of this application. The method is applied to a core network device. As shown in FIG. 13, the method includes the following steps.

S701: Receive first capability information, where the first capability information is used to indicate a bandwidth part supported by a first terminal device.

For example, the first capability information may be from the terminal device, a network device, another network element, or instruction information entered by a user.

In a possible implementation, the first capability information may be from a server (for example, an APP server), and the core network device obtains, by using the server, the first capability information of the first terminal device or first capability information of a plurality of terminal devices that include the first terminal device. The core network device may be an SMF network element or an AMF network element.

In a possible implementation, the first capability information may be from the first terminal device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the another first capability information to the AMF, so that the core network device receives the first capability information.

In a possible implementation, the first capability information may be from the network device, and after receiving the first capability information from the first terminal device, the network device forwards the first capability information to the core network device, so that the core network device receives the first capability information forwarded by the network device. For example, a gNB forwards the first capability information to the AMF network element. The forwarding message may be an N2 message or an NG2 message. N2 is an interface between a RAN device and a core network device in LTE, and NG2 is an interface between a RAN device and a core network device in NR.

S702: Send the first capability information to a network device.

In a possible implementation, the core network device sends a second paging message to the network device. The second paging message includes identification information of the first terminal device and the first capability information, the identification information of the first terminal device is used to indicate a paged terminal device, and there is a mapping relationship between the identification information of the first terminal device and the first capability information.

In another possible implementation, the core network device sends the first capability information to the network device, so that the network device can obtain the first capability information. When the core network device pages the first terminal device, the core network device sends, to the network device, the second paging message carrying the identification information of the first terminal device, so that the network device can determine the first capability information of the first terminal device based on the identification information of the first terminal device and a preset mapping relationship between identification information and a first capability, and page the first terminal device on a target bandwidth part.

For example, the identification information of the first terminal device includes at least one of the following: a terminal identifier, a group identifier corresponding to the terminal, and a service identifier corresponding to the terminal.

The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device.

The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier.

The service identifier corresponding to the terminal is used to indicate a service identifier corresponding to a paged terminal device. Optionally, the service identifier may be a multicast service identifier. The multicast service identifier may be a TMGI or a G-RNTI. In this application, the core network device sends the second paging message to the network device, so that the network device obtains the identification information of the first terminal device from the second paging message. In this way, the network device can determine, based on the pre-obtained mapping relationship between the identification information of the first terminal device and the first capability information, the first capability information corresponding to the first terminal device, and the network device can further page the first terminal device when paging the target bandwidth corresponding to the first capability information. In addition, the terminal identifier may indicate one terminal device, or may indicate one group of terminal devices. The core network device sends the second paging message to the network device, so that the network device can page one group of terminals or a plurality of terminal devices in a same service group by using one terminal identifier, thereby reducing signaling overheads of paging the first terminal device by the network device, and improving efficiency of paging the first terminal device by the network device.

Figure 14:
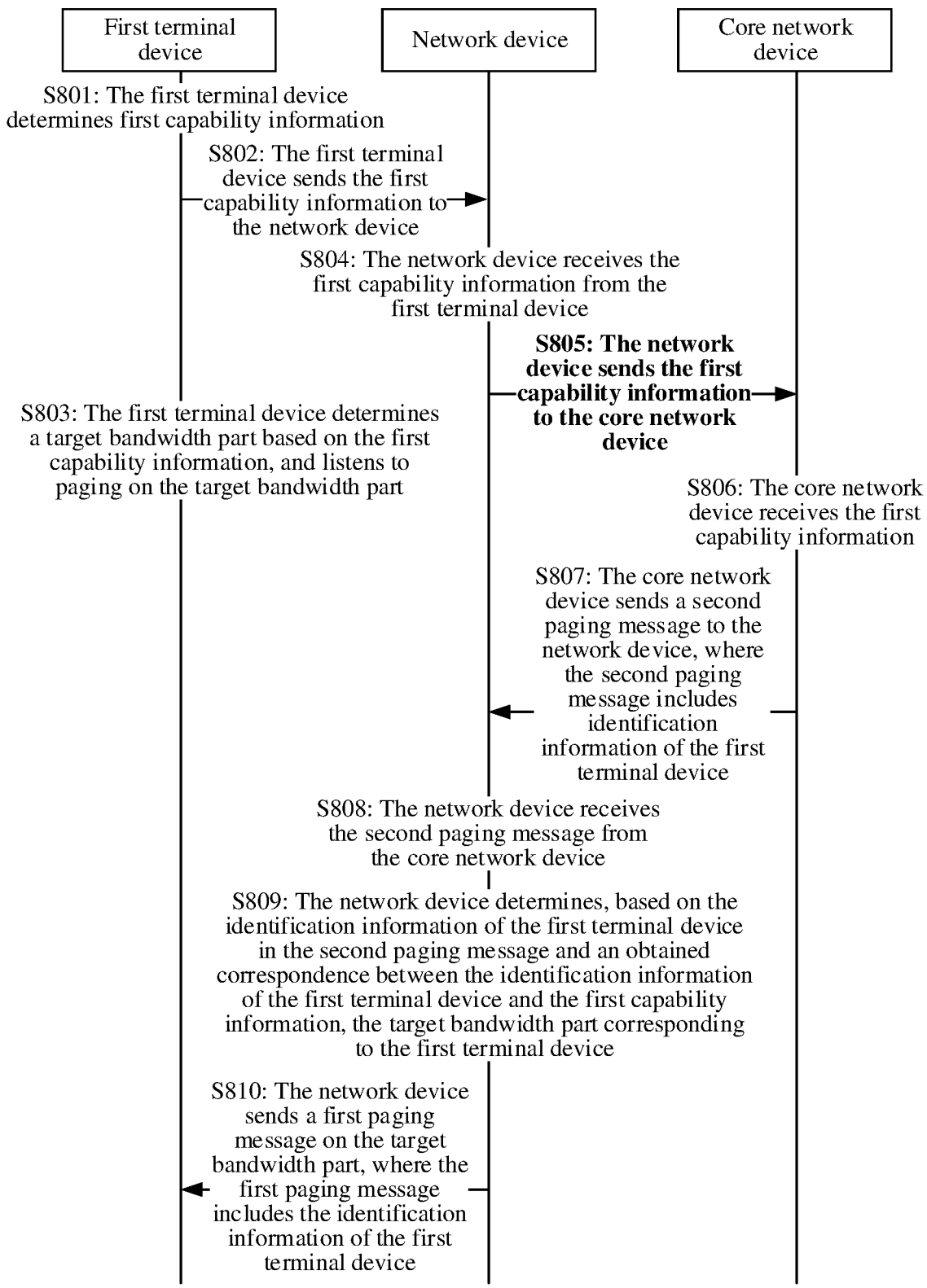
FIG. 14 is a signaling diagram 1 of a communication method according to an embodiment of this application.

FIG. 14 is a signaling diagram 1 of a communication method according to an embodiment of this application. As shown in FIG. 14, the communication method provided in this embodiment includes the following steps.

S801: A first terminal device determines first capability information.

S802: The first terminal device sends the first capability information to a network device.

S803: The first terminal device determines a target bandwidth part based on the first capability information, and listens to paging on the target bandwidth part.

S804: The network device receives the first capability information from the first terminal device.

S805: The network device sends the first capability information to a core network device.

S806: The core network device receives the first capability information.

S807: The core network device sends a second paging message to the network device, where the second paging message includes identification information of the first terminal device.

Optionally, the second paging message further includes the first capability information corresponding to the identification information of the first terminal device.

Optionally, the core network device may send the identification information of the first terminal device and the first capability information to the network device by using a first message, where the first message is different from the second paging message.

S808: The network device receives the second paging message from the core network device.

S809: The network device determines, based on the identification information of the first terminal device in the second paging message and an obtained correspondence between the identification information of the first terminal device and the first capability information, the target bandwidth part corresponding to the first terminal device.

S810: The network device sends a first paging message on the target bandwidth part, where the first paging message includes the identification information of the first terminal device.

Optionally, the first paging message further includes identification information of a second terminal device, and a target bandwidth part corresponding to the second terminal device is the same as that of the first terminal device.

In a possible example, the second paging message includes identifiers of UE 1, UE 2, UE 3, and UE 4. It may be understood that the core network device pages the UE 1 to the UE 4, and it can be learned, based on an obtained correspondence between the identifier of the first terminal device and the first capability information, that target bandwidth parts corresponding to first terminal devices are an extended initial BWP, an independent multicast BWP, an independent multicast BWP, and an extended initial BWP. Therefore, the network device learns that the target bandwidth parts corresponding to the UE 1 and the UE 3 are the same, that is, the extended initial BWP, and the target bandwidth parts corresponding to the UE 2 and the UE 4 are the same, that is, the independent multicast BWP. Correspondingly, the network device sends the first paging message on the extended initial BWP, where the first paging message includes the identifiers of the UE 1 and the UE 3. The network device sends the first paging message on the independent multicast BWP, where the first paging message includes the identifiers of the UE 2 and the UE 4.

In this example, the network device may determine, based on the second paging message sent by the core network device and the correspondence between the identifier of the first terminal device and the first capability information, the target BWP for sending the first paging message and content of the first paging message.

In another possible example, the core network learns of a correspondence between the identifier of the first terminal device and the first capability information. Therefore, when sending the second paging message, the core network device may send to-be-paged UEs with a same target bandwidth part to the network device by using a same second paging message. For example, target bandwidth parts corresponding to UE 1 to UE 4 each are an independent multicast BWP. In this case, the core network device sends the second paging message to the network device, where the second paging message includes identifiers of the UE 1 to the UE 4. After receiving the second paging message, the network device sends the first paging message on the target bandwidth part, where the first paging message is generated based on the second paging message. It may be understood that UE identification information in the first paging message is the same as UE identification information in the second paging message, which is equivalent to that the network device sends, to the first terminal device by using the first paging message, content in the second paging message sent by the core network device.

In this application, the network device receives the first capability information sent by the first terminal device, to determine the bandwidth part supported by the first terminal device, and sends the first paging message on the target bandwidth part, where the bandwidth part is used to carry paging or another message. Because the target bandwidth part matches the bandwidth part supported by the first terminal device, the first paging message is sent on the target bandwidth part, so that a quantity of paging messages received by the first terminal device on other bandwidth parts can be reduced, thereby reducing resource overheads and improving paging efficiency.

In this embodiment, specific implementations of S801 to S810 are the same as the implementations of the corresponding steps in the embodiments shown in FIG. 4 to FIG. 13 of this application. For specific implementations and technical effects of the steps, refer to the descriptions in the foregoing embodiments. Details are not described herein again.

Figure 15:
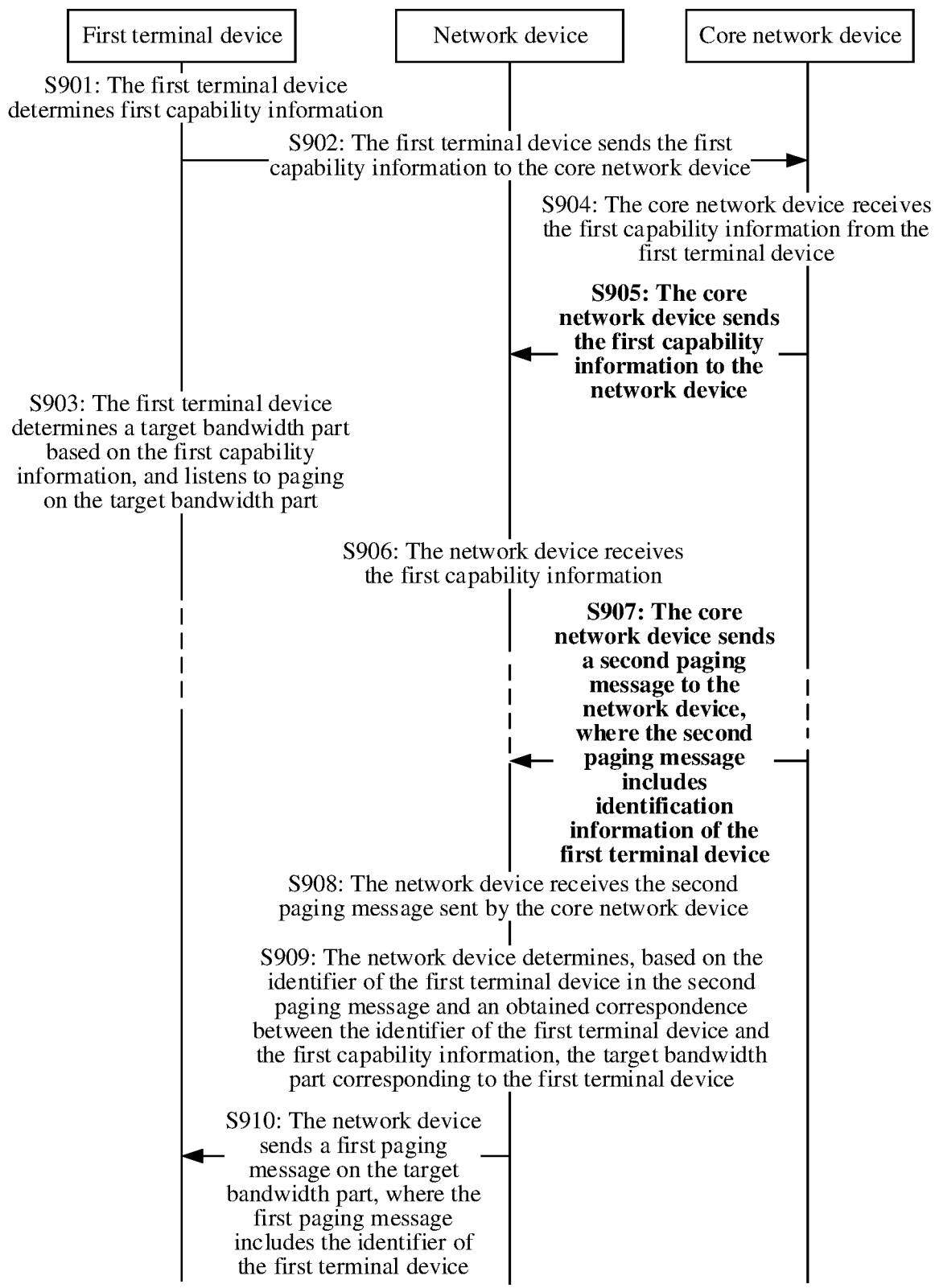
FIG. 15 is a signaling diagram 2 of a communication method according to an embodiment of this application.

FIG. 15 is a signaling diagram 2 of a communication method according to an embodiment of this application. As shown in FIG. 15, the communication method provided in this embodiment includes the following steps.

S901: A first terminal device determines first capability information.

S902: The first terminal device sends the first capability information to a core network device.

S903: The first terminal device determines a target bandwidth part based on the first capability information, and listens to paging on the target bandwidth part.

S904: The core network device receives the first capability information from the first terminal device.

S905: The core network device sends the first capability information to a network device.

Optionally, the first capability information includes corresponding identification information of the first terminal device.

S906: The network device receives the first capability information.

S907: The core network device sends a second paging message to the network device, where the second paging message includes the identification information of the first terminal device.

Optionally, the second paging message further includes the first capability information corresponding to the identification information of the first terminal device.

Optionally, the core network device may send the identification information of the first terminal device and the first capability information to the network device by using a first message, where the first message is different from the second paging message.

S908: The network device receives the second paging message sent by the core network device.

S909: The network device determines, based on the identifier of the first terminal device in the second paging message and an obtained correspondence between the identifier of the first terminal device and the first capability information, the target bandwidth part corresponding to the first terminal device.

S910: The network device sends a first paging message on the target bandwidth part, where the first paging message includes the identifier of the first terminal device.

Optionally, the first paging message further includes an identifier of a second terminal device, and a target bandwidth part corresponding to the second terminal device is the same as that of the first terminal device.

Optionally, the first paging message further includes an identifier of a second terminal device, and a target bandwidth part corresponding to the second terminal device is the same as that of the first terminal device.

In a possible example, the second paging message includes identifiers of UE 1, UE 2, UE 3, and UE 4. It may be understood that the core network device pages the UE 1 to the UE 4, and it can be learned, based on an obtained correspondence between the identifier of the first terminal device and the first capability information, that target bandwidth parts corresponding to first terminal devices are an extended initial BWP, an independent multicast BWP, an independent multicast BWP, and an extended initial BWP. Therefore, the network device learns that the target bandwidth parts corresponding to the UE 1 and the UE 3 are the same, that is, the extended initial BWP, and the target bandwidth parts corresponding to the UE 2 and the UE 4 are the same, that is, the independent multicast BWP. Correspondingly, the network device sends the first paging message on the extended initial BWP, where the first paging message includes the identifiers of the UE 1 and the UE 3. The network device sends the first paging message on the independent multicast BWP, where the first paging message includes the identifiers of the UE 2 and the UE 4.

In this example, the network device may determine, based on the first capability information sent by the core network device, the target BWP and content of the first paging message.

In another possible example, the core network learns of a correspondence between the identifier of the first terminal device and the first capability information. Therefore, when sending the second paging message, the core network device may send to-be-paged UEs with a same target bandwidth part to the network device by using a same second paging message. For example, target bandwidth parts corresponding to UE 1 to UE 4 each are a multicast BWP. In this case, the core network device sends the second paging message to the network device, where the second paging message includes identifiers of the UE 1 to the UE 4. After receiving the second paging message, the network device sends the first paging message on the target bandwidth part, where the first paging message is generated based on the second paging message. It may be understood that UE identification information in the first paging message is the same as UE identification information in the second paging message, which is equivalent to that the network device sends, to the first terminal device by using the first paging message, content in the second paging message sent by the core network device.

In this embodiment, implementations of S901 to S910 are the same as the implementations of the corresponding steps in the embodiments shown in FIG. 4 to FIG. 13 of this application. For specific implementations and technical effects of the steps, refer to the descriptions in the foregoing embodiments. Details are not described herein again.

Figure 16:
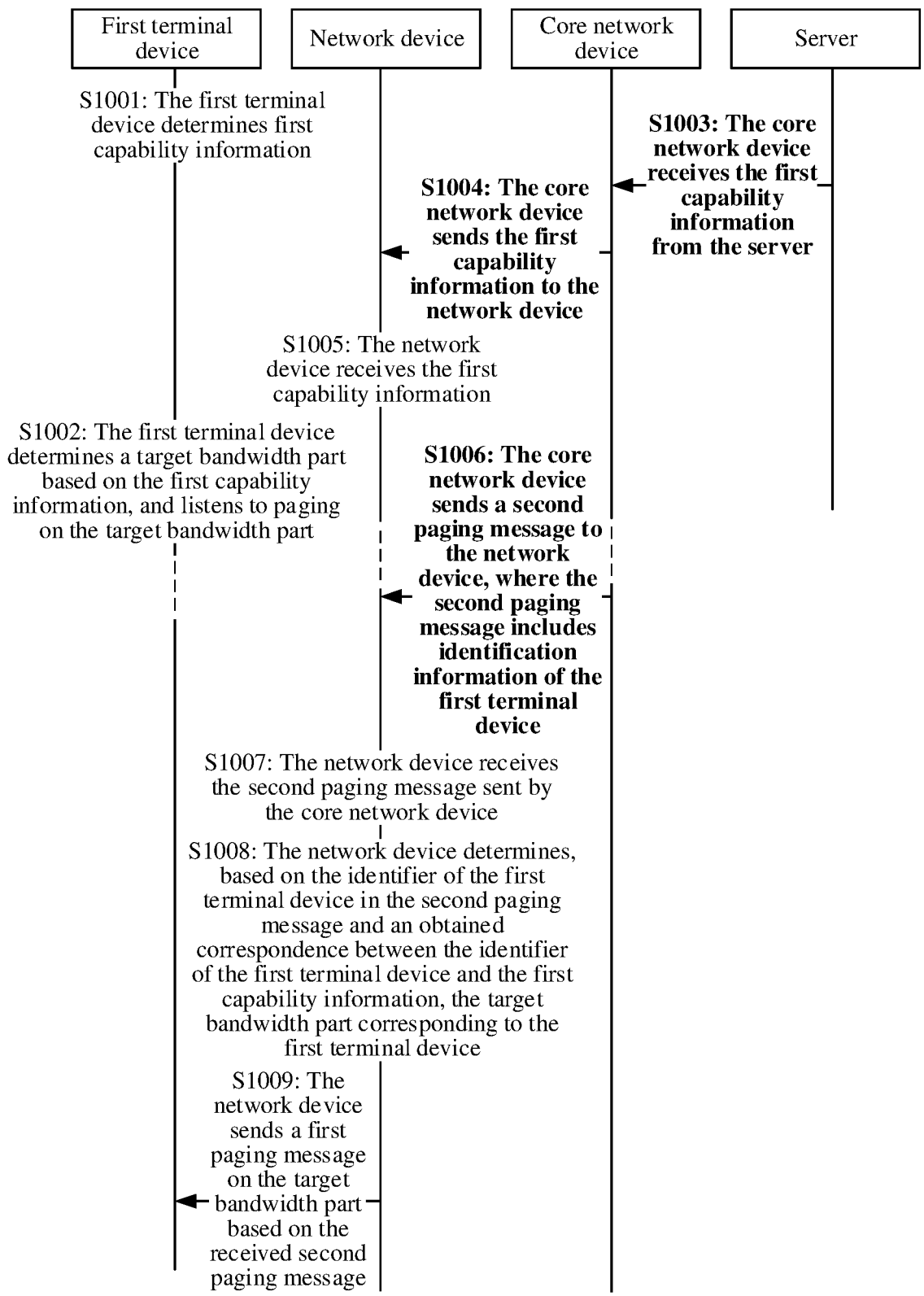
FIG. 16 is a signaling diagram 3 of a communication method according to an embodiment of this application.

FIG. 16 is a signaling diagram 3 of a communication method according to an embodiment of this application. As shown in FIG. 16, the communication method provided in this embodiment includes the following steps.

S1001: A first terminal device determines first capability information.

S1002: The first terminal device determines a target bandwidth part based on the first capability information, and listens to paging on the target bandwidth part.

S1003: A core network device receives the first capability information from a server.

Optionally, the server is, for example, an APP server.

Optionally, the first capability information includes corresponding identification information of the first terminal device.

S1004: The core network device sends the first capability information to a network device.

S1005: The network device receives the first capability information.

S1006: The core network device sends a second paging message to the network device, where the second paging message includes the identification information of the first terminal device.

Optionally, the second paging message further includes the first capability information corresponding to the identification information of the first terminal device.

Optionally, the core network device may send the identification information of the first terminal device and the first capability information to the network device by using a first message, where the first message is different from the second paging message.

S1007: The network device receives the second paging message sent by the core network device.

S1008: The network device determines, based on the identifier of the first terminal device in the second paging message and an obtained correspondence between the identifier of the first terminal device and the first capability information, the target bandwidth part corresponding to the first terminal device.

S1009: The network device sends a first paging message on the target bandwidth part, where the first paging message includes the identifier of the first terminal device.

Optionally, the first paging message further includes an identifier of a second terminal device, and a target bandwidth part corresponding to the second terminal device is the same as that of the first terminal device.

In a possible example, the second paging message includes identifiers of UE 1, UE 2, UE 3, and UE 4. It may be understood that the core network device pages the UE 1 to the UE 4, and it can be learned, based on an obtained correspondence between the identifier of the first terminal device and the first capability information, that target bandwidth parts corresponding to first terminal devices are an extended initial BWP, an independent multicast BWP, an independent multicast BWP, and an extended initial BWP. Therefore, the network device learns that the target bandwidth parts corresponding to the UE 1 and the UE 3 are the same, that is, the extended initial BWP, and the target bandwidth parts corresponding to the UE 2 and the UE 4 are the same, that is, the independent multicast BWP. Correspondingly, the network device sends the first paging message on the extended initial BWP, where the first paging message includes the identifiers of the UE 1 and the UE 3. The network device sends the first paging message on the independent multicast BWP, where the first paging message includes the identifiers of the UE 2 and the UE 4.

In this example, the network device may determine, based on the second paging message sent by the core network device and the correspondence between the identifier of the first terminal device and the first capability information, the target BWP for sending the first paging message and content of the first paging message.

In another possible example, the core network learns of a correspondence between the identifier of the first terminal device and the first capability information. Therefore, when sending the second paging message, the core network device may send to-be-paged UEs with a same target bandwidth part to the network device by using a same second paging message. For example, target bandwidth parts corresponding to UE 1 to UE 4 each are a multicast BWP. In this case, the core network device sends the second paging message to the network device, where the second paging message includes identifiers of the UE 1 to the UE 4. After receiving the second paging message, the network device sends the first paging message on the target bandwidth part, where the first paging message is generated based on the second paging message. It may be understood that UE identification information in the first paging message is the same as UE identification information in the second paging message, which is equivalent to that the network device sends, to the first terminal device by using the first paging message, content in the second paging message sent by the core network device.

In this application, the network device receives the first capability information from the first terminal device or the core network device, to determine the bandwidth part supported by the first terminal device, and sends the first paging message on the target bandwidth part. In different application scenarios, the first capability information of the terminal device may be stored at different positions. Because the network device in this application may obtain the first capability information by using different information sources, an application scenario of the solution in this embodiment of this application can be further expanded, and an application scope of the method can be widened.

In this embodiment, implementations of S1001 to S1009 are the same as the implementations of the corresponding steps in the embodiments shown in FIG. 4 to FIG. 13 of this application. For specific implementations and technical effects of the steps, refer to the descriptions in the foregoing embodiments. Details are not described herein again.

Figure 17:
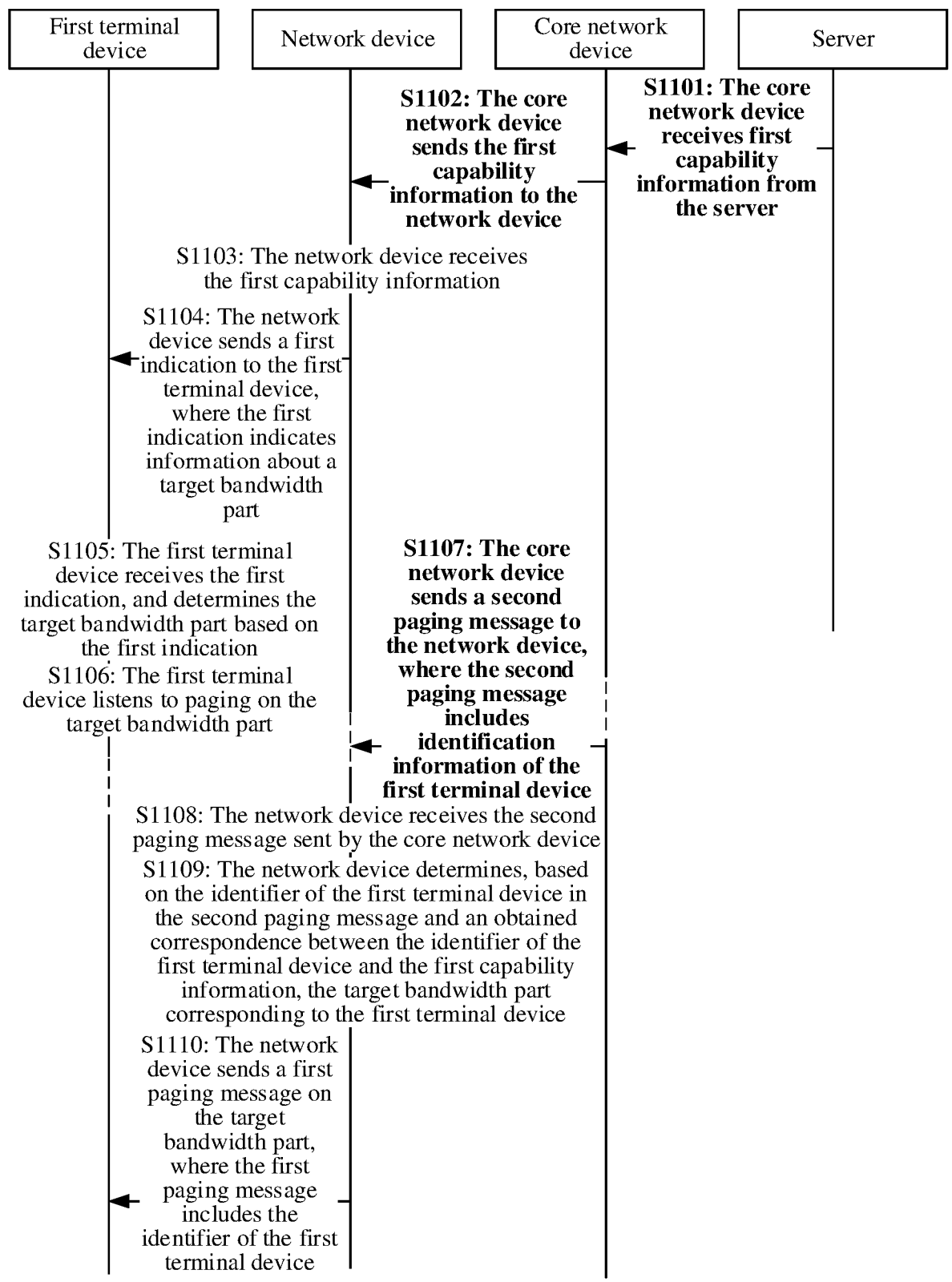
FIG. 17 is a signaling diagram 4 of a communication method according to an embodiment of this application.

FIG. 17 is a signaling diagram 4 of a communication method according to an embodiment of this application. As shown in FIG. 17, the communication method provided in this embodiment includes the following steps.

S1101: A core network device receives first capability information from a server.

Optionally, the server is, for example, an APP server.

S1102: The core network device sends the first capability information to a network device.

Optionally, the first capability information includes corresponding identification information of a first terminal device.

S1103: The network device receives the first capability information.

S1104: The network device sends a first indication to the first terminal device, where the first indication indicates information about a target bandwidth part.

S1105: The first terminal device receives the first indication, and determines the target bandwidth part based on the first indication.

S1106: The first terminal device listens to paging on the target bandwidth part.

S1107: The core network device sends a second paging message to the network device, where the second paging message includes the identification information of the first terminal device.

Optionally, the second paging message further includes the first capability information corresponding to the identification information of the first terminal device.

Optionally, the core network device may send the identification information of the first terminal device and the first capability information to the network device by using a first message, where the first message is different from the second paging message.

S1108: The network device receives the second paging message sent by the core network device.

S1109: The network device determines, based on the identifier of the first terminal device in the second paging message and an obtained correspondence between the identifier of the first terminal device and the first capability information, the target bandwidth part corresponding to the first terminal device.

S1110: The network device sends a first paging message on the target bandwidth part, where the first paging message includes the identifier of the first terminal device.

Optionally, the first paging message further includes an identifier of a second terminal device, and a target bandwidth part corresponding to the second terminal device is the same as that of the first terminal device.

In a possible example, the second paging message includes identifiers of UE 1, UE 2, UE 3, and UE 4. It may be understood that the core network device pages the UE 1 to the UE 4, and it can be learned, based on an obtained correspondence between the identifier of the first terminal device and the first capability information, that target bandwidth parts corresponding to first terminal devices are an extended initial BWP, an independent multicast BWP, an independent multicast BWP, and an extended initial BWP. Therefore, the network device learns that the target bandwidth parts corresponding to the UE 1 and the UE 3 are the same, that is, the extended initial BWP, and the target bandwidth parts corresponding to the UE 2 and the UE 4 are the same, that is, the independent multicast BWP. Correspondingly, the network device sends the first paging message on the extended initial BWP, where the first paging message includes the identifiers of the UE 1 and the UE 3. The network device sends the first paging message on the independent multicast BWP, where the first paging message includes the identifiers of the UE 2 and the UE 4.

In this example, the network device may determine, based on the second paging message sent by the core network device and the correspondence between the identifier of the first terminal device and the first capability information, the target BWP for sending the first paging message and content of the first paging message.

In another possible example, the core network learns of a correspondence between the identifier of the first terminal device and the first capability information. Therefore, when sending the second paging message, the core network device may send to-be-paged UEs with a same target bandwidth part to the network device by using a same second paging message. For example, target bandwidth parts corresponding to UE 1 to UE 4 each are a multicast BWP. In this case, the core network device sends the second paging message to the network device, where the second paging message includes identifiers of the UE 1 to the UE 4. After receiving the second paging message, the network device sends the first paging message on the target bandwidth part, where the first paging message is generated based on the second paging message. It may be understood that UE identification information in the first paging message is the same as UE identification information in the second paging message, which is equivalent to that the network device sends, to the first terminal device by using the first paging message, content in the second paging message sent by the core network device.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

In this embodiment, implementations of S1101 to S1110 are the same as the implementations of the corresponding steps in the embodiments shown in FIG. 4 to FIG. 13 of this application. For specific implementations and technical effects of the steps, refer to the descriptions in the foregoing embodiments. Details are not described herein again.

Figure 18:
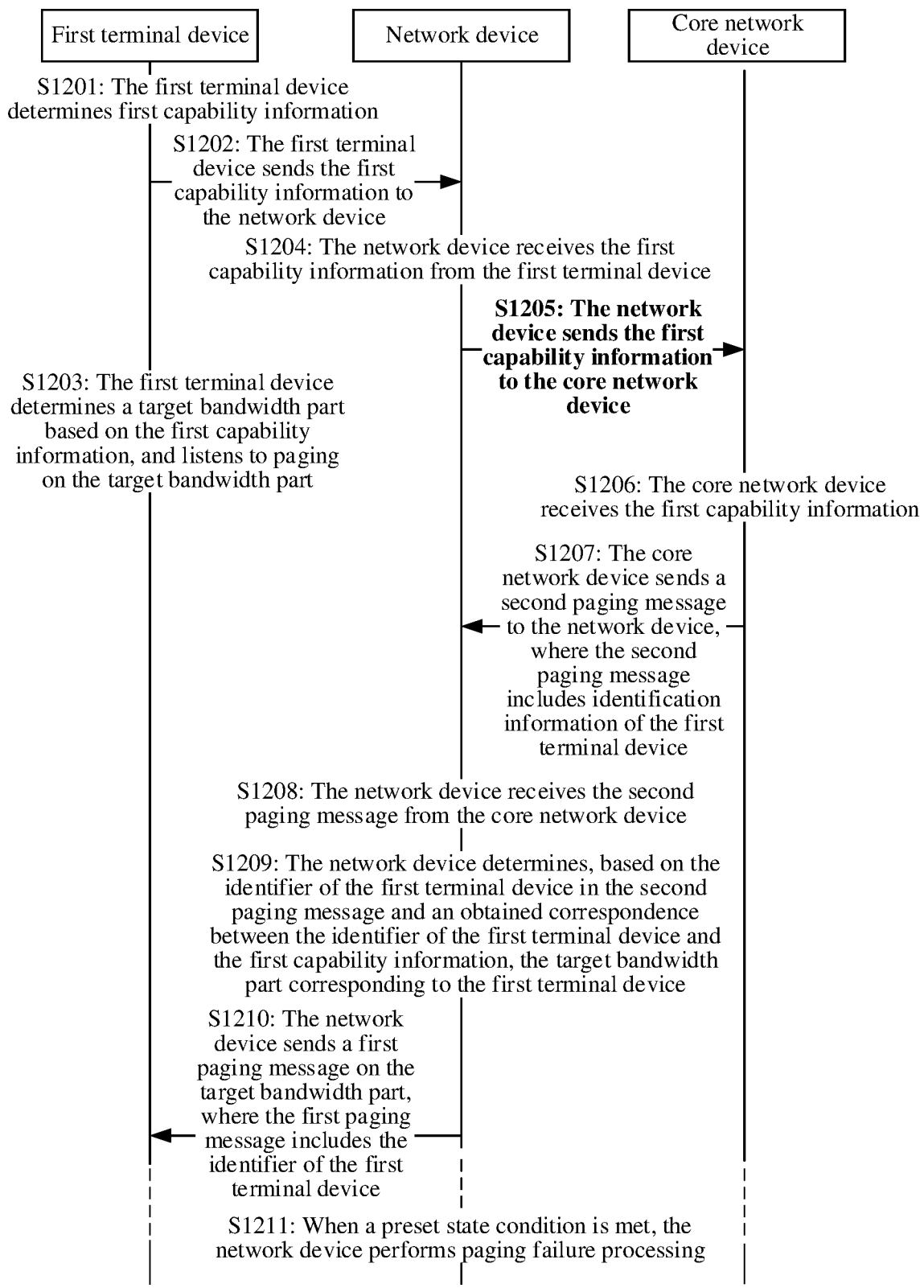
FIG. 18 is a signaling diagram 5 of a communication method according to an embodiment of this application.

FIG. 18 is a signaling diagram 5 of a communication method according to an embodiment of this application. As shown in FIG. 18, on the basis of the method shown in FIG. 14, a step of processing a paging failure is added in the communication method provided in this embodiment. The communication method provided in this embodiment includes the following steps.

S1201: A first terminal device determines first capability information.

S1202: The first terminal device sends the first capability information to a network device.

S1203: The first terminal device determines a target bandwidth part based on the first capability information, and listens to paging on the target bandwidth part.

S1204: The network device receives the first capability information from the first terminal device.

S1205: The network device sends the first capability information to a core network device.

S1206: The core network device receives the first capability information.

S1207: The core network device sends a second paging message to the network device, where the second paging message includes identification information of the first terminal device.

Optionally, the second paging message further includes the first capability information corresponding to the identification information of the first terminal device.

Optionally, the core network device may send the identification information of the first terminal device and the first capability information to the network device by using a first message, where the first message is different from the second paging message.

S1208: The network device receives the second paging message from the core network device.

S1209: The network device determines, based on the identifier of the first terminal device in the second paging message and an obtained correspondence between the identifier of the first terminal device and the first capability information, the target bandwidth part corresponding to the first terminal device.

S1210: The network device sends a first paging message on the target bandwidth part, where the first paging message includes the identifier of the first terminal device.

Optionally, the first paging message further includes an identifier of a second terminal device, and a target bandwidth part corresponding to the second terminal device is the same as that of the first terminal device.

S1211: When a preset state condition is met, the network device performs paging failure processing.

In this application, when a preset condition is met, the network device sends a capability status message to the first terminal device, and/or sends first paging to the first terminal device on at least one available bandwidth part. When the network device performs paging communication with the terminal device, a problem such as a paging failure or a paging timeout usually occurs due to various reasons, and consequently normal communication between the network device and the first terminal device is affected. This phenomenon may be caused because an incorrect target bandwidth part is determined, or may be caused by environment impact. Therefore, when a problem occurs when the network device determines the target bandwidth part and performs paging on the target bandwidth part, the network device re-sends the capability request information and/or the first paging message to the first terminal device, to re-determine the target bandwidth part, and/or makes an attempt on another bandwidth part, to correct a problem that occurs in a paging process. This improves quality of paging between the network device and the first terminal device.

A specific implementation step of S1211 is the same as step S403 in the embodiment shown in FIG. 10. Details are described herein. It should be noted that the step of processing the paging failure by the network device added in this embodiment may also be applied to the embodiments corresponding to FIG. 15 to FIG. 17, that is, after step S909 in the embodiment shown in FIG. 15, step S1008 in the embodiment shown in FIG. 16, or step S1109 in the embodiment shown in FIG. 17, step S1211 in this embodiment is added, and corresponding technical effects are achieved. A solution in which step S1211 is combined with the embodiments shown in FIG. 15 to FIG. 17 is not described in detail herein.

In this embodiment, implementations of S1201 to S1211 are the same as the implementations of the corresponding steps in the embodiments shown in FIG. 4 to FIG. 13 of this application. For specific implementations and technical effects of the steps, refer to the descriptions in the foregoing embodiments. Details are not described herein again.

The foregoing describes in detail the communication method in embodiments of this application. The following describes a communication apparatus in embodiments of this application.

Figure 19:
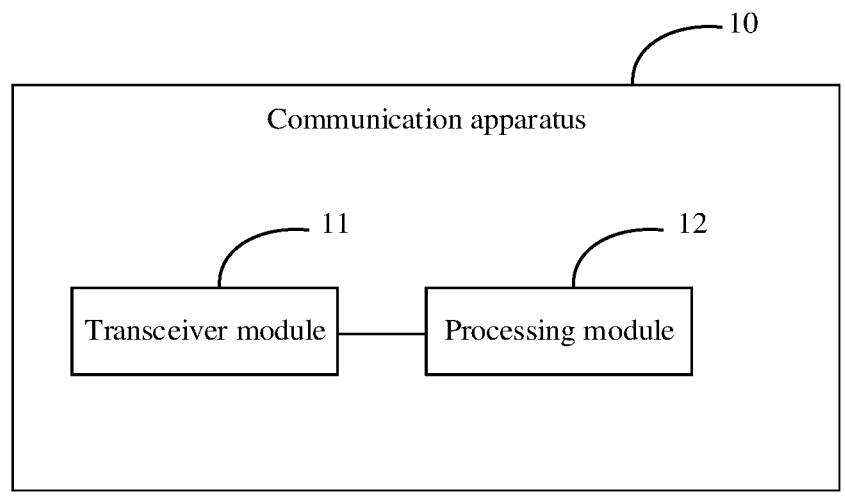
FIG. 19 is a schematic block diagram of a communication apparatus according to an embodiment of this application.

In an example, FIG. 19 is a schematic block diagram of a communication apparatus according to an embodiment of this application. A communication apparatus 10 in this embodiment of this application may be the network device in the foregoing method embodiments, or may be one or more chips in the network device. The communication apparatus 10 may be configured to implement some or all functions of the network device in the foregoing method embodiments. The communication apparatus 10 may include a transceiver module 11 or a processing module 12.

The transceiver module 11 is configured to receive first capability information, where the first capability information is used to indicate a bandwidth part supported by a first terminal device.

The processing module 12 is configured to control, based on the first capability information, the transceiver module 11 to send a first paging message on a target bandwidth part.

In this application, the network device receives the first capability information, to determine the bandwidth part supported by the first terminal device, and sends the first paging message on the target bandwidth part, where the bandwidth part is used to carry paging or another message. Because the target bandwidth part matches the bandwidth part supported by the first terminal device, the first paging message is sent on the target bandwidth part, so that a quantity of paging messages received by the first terminal device on other bandwidth parts can be reduced, thereby reducing resource overheads and improving paging efficiency.

In a possible implementation, the first capability information may be from the first terminal device. The first terminal device reports information about the bandwidth part supported by the first terminal device to the network device as the first capability information. Optionally, the first capability information may be carried in a UECapabilityInformation message or another radio resource control RRC message, and is sent by the first terminal device to the network device. The network device may connect the terminal device to a RAN node or a device, which may also be referred to as a base station.

In a possible implementation, the first capability information may be from a core network device. Optionally, the core network device may obtain the first capability information from an APP server. An obtaining manner includes: obtaining the first capability information of the first terminal device or obtaining first capability information of a plurality of terminal devices, where the plurality of terminal devices include the first terminal device. The core network device sends the first capability information to the network device. The core network device may be an SMF network element or an AMF network element.

Optionally, after receiving the first capability information from the first terminal device, the transceiver module 11 forwards the first capability information to the core network device. For example, a gNB forwards the first capability information to the AMF network element. The gNB may forward the first capability information to the AMF network element by using an N2 message or an NG2 message. N2 is an interface between a RAN and a core network device in LTE, and NG2 is an interface between a RAN device and a core network device in NR.

In this application, the network device receives the first capability information from the first terminal device or the core network device, to determine the bandwidth part supported by the first terminal device, and sends the first paging message on the target bandwidth part. In different application scenarios, the first capability information of the terminal device may be stored on a terminal device side and updated by the terminal device, or may be stored on a core network device side and updated by the core network device. Because the network device in this application may obtain the first capability information by using different information sources, an application scenario of the solution in this embodiment of this application can be further expanded, and an application scope of the method can be widened.

In a possible implementation, the transceiver module 11 is configured to receive a second paging message from a core network device, where the second paging message includes identification information of the first terminal device, and there is a mapping relationship between the identification information of the first terminal device and the first capability information.

For example, the identification information of the first terminal device includes at least one of the following: a terminal identifier, a group identifier corresponding to the terminal, and a service identifier corresponding to the terminal.

The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device.

The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier.

The service identifier corresponding to the terminal is used to indicate a service identifier corresponding to a paged terminal device. Optionally, the service identifier may be a multicast service identifier. The multicast service identifier may be a TMGI or a G-RNTI. In this application, the network device receives the second paging message from the core network device, obtains the identification information of the first terminal device from the second paging message, and determines, based on the pre-obtained mapping relationship between the identification information of the first terminal device and the first capability information, the first capability information corresponding to the first terminal device. When paging is performed on the target bandwidth based on the first capability information, the first terminal device may be paged. In addition, the terminal identifier may indicate one terminal device, or may indicate one group of terminal devices, so that the network device can page one group of terminals or a plurality of terminal devices in a same service group by using one terminal identifier, thereby reducing signaling overheads of paging the first terminal device by the network device, and improving efficiency of paging the first terminal device by the network device.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

In a possible implementation, the processing module 12 is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast BWP or an extended initial BWP. The extended initial bandwidth part is a multicast BWP formed by extending the initial BWP in frequency domain, and the multicast BWP overlaps the extended initial BWP in frequency domain. The independent multicast bandwidth part is an independent multicast BWP, and the multicast BWP does not overlap the initial BWP in frequency domain.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the network device sends the first paging message on the target bandwidth part, so that the first terminal device can be accurately paged without performing a plurality of times of paging on a plurality of bandwidth parts, thereby improving paging efficiency.

In a possible implementation, the processing module 12 is configured to determine the target bandwidth part based on the first capability information; and send a first indication to the first terminal device, where the first indication indicates information about the target bandwidth part.

In this application, after determining the target bandwidth part, the network device sends, to the first terminal device, the first indication indicating the target bandwidth part, so that the first terminal device can obtain the information about the target bandwidth part, and further receive paging on the target bandwidth part. The first indication information may be sent together with the first paging message, or may be sent before the first paging message. The first indication is sent to the first terminal device, so that the first terminal device can be flexibly configured, thereby expanding an application scenario of this embodiment of this application.

In a possible implementation, before receiving the first capability information, the transceiver module 11 is further configured to send a capability request message to the first terminal device, where the capability request message is used to request the first terminal device to report the supported bandwidth part.

Optionally, the capability request message may be a UECapabilityEnquiry message or another RRC message. Before the first capability information is received, the capability request message is sent to the first terminal device, to request the first terminal device to report the first capability information to the network device, so that the first capability information is synchronized between the first terminal device and the network device, thereby implementing synchronization of the target bandwidth part. In this way, a paging message can be received and sent between the network device and the first terminal device on the target bandwidth part.

In a possible implementation, the second paging message includes at least one of the following: a DRX configuration, a message type indication, a paging priority, a TAI list, and paging attempt quantity information.

In a possible implementation, the processing module 12 is further configured to: when a preset state condition is met, perform at least one of the following: sending the capability request message to the first terminal device, where the capability request message is used to request the first terminal device to report the supported bandwidth part; and sending the first paging message on at least one available bandwidth part, where the available bandwidth part is a bandwidth part for which a paging resource is configured.

Optionally, when sending the first paging message on the at least one available bandwidth part, the processing module 12 is specifically configured to: send the first paging message on all bandwidth parts for which a paging resource is configured and that can be used to send paging; or randomly select one bandwidth part from one or more bandwidth parts for which a paging resource is configured and that can be used to send paging, to send the first paging message; or select, from one or more bandwidth parts for which a paging resource is configured and that can be used to send paging, a bandwidth part corresponding to a time domain position at which a paging message can be sent most recently, to send the first paging message.

Optionally, the preset state condition includes at least one of the following: a quantity of times of sending the first paging message is greater than a first threshold; the first paging message fails to be sent; and no response information is received from the first terminal device within first duration after the first paging message is sent. Optionally, the first threshold is determined based on the paging attempt quantity information from the core network device.

In this application, when a preset condition is met, the network device sends the capability request message to the first terminal device, and/or sends the first paging message on the at least one available bandwidth part. When the network device performs paging communication with the first terminal device, a problem such as a paging failure or a paging timeout may occur, and consequently normal communication between the network device and the first terminal device is affected. A cause of the problem may be that an incorrect target bandwidth part is used, or channel quality is poor. Therefore, when a problem occurs when the network device performs paging on the target bandwidth part, the network device re-sends the capability request information and/or the first paging message to the first terminal device, to obtain the bandwidth part supported by the first terminal device, so as to re-determine the target bandwidth part, and/or attempt to perform paging on at least one another available bandwidth part, so as to correct a problem that occurs in a paging process. This improves quality of paging between the network device and the first terminal device.

The transceiver module 11 may perform step S101 in the method shown in FIG. 4, or may perform step S102 in the method shown in FIG. 4 together with the processing module 12; or may perform steps S201, S202a, and S203 in the method shown in FIG. 7, steps S300, S301, and S303 in the method shown in FIG. 9, or step S401 in the method shown in FIG. 10, or may perform step S401 in the method shown in FIG. 10 together with the processing module 12, or may perform step S403 in the method shown in FIG. 10 together with the processing module 12.

The processing module 12 may perform step S102 in the method shown in FIG. 4 together with the transceiver module 11, or may perform step S202 in the method shown in FIG. 7, or may perform step S302 in the method shown in FIG. 9, or may perform step S402 in the method shown in FIG. 10 together with the transceiver module 11, or may perform step S403 in the method shown in FIG. 10 together with the transceiver module 11.

The apparatus in the embodiment shown in FIG. 19 may be configured to perform the technical solutions in the embodiments shown in FIG. 4 to FIG. 10 in the foregoing methods and the operations performed by the network device in the embodiments shown in FIG. 14 to FIG. 18. Implementation principles and technical effects thereof are similar, and details are not described herein again.

Figure 20:
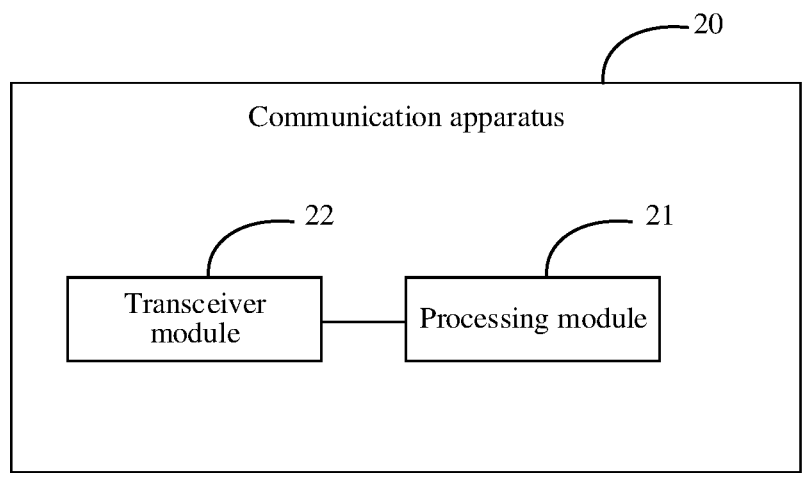
FIG. 20 is a schematic block diagram of a communication apparatus according to an embodiment of this application.

In an example, FIG. 20 is a schematic block diagram of a communication apparatus according to an embodiment of this application. A communication apparatus 20 in this embodiment of this application may be the first terminal device in the foregoing method embodiments, or may be one or more chips in the first terminal device. The communication apparatus 20 may be configured to implement some or all functions of the first terminal device in the foregoing method embodiments. The communication apparatus 20 may include a processing module 21 or a transceiver module 22.

The processing module 21 is configured to determine first capability information, where the first capability information is used to indicate a bandwidth part supported by the first terminal device.

The transceiver module 22 is configured to receive a first paging message on a target bandwidth part based on the first capability information.

In this application, the first terminal device determines the first capability information, to determine the bandwidth part supported by the first terminal device, and receives the first paging message on the target bandwidth part. Because the target bandwidth part is determined by using the capability information of the first terminal device, the target bandwidth part matches the bandwidth part supported by the first terminal device. The first terminal device may receive the first paging message on the target bandwidth part, and a network device that uses the first capability information can page the first terminal device only by sending paging on the target bandwidth part, without attempting to send another paging message on another bandwidth part. This resolves a problem of a paging resource waste, and improves paging efficiency.

In a possible implementation, the transceiver module 22 is configured to send the first capability information to a network device. The first terminal device reports information about the bandwidth part supported by the first terminal device to the network device as the first capability information, so that the network device can determine the corresponding target bandwidth part by using the first capability information. Optionally, the first capability information may be carried in a UECapabilityInformation message or another RRC message, and is sent by the first terminal device to the network device. The network device may connect the terminal device to a RAN node or a device, which may also be referred to as a base station.

In a possible implementation, the transceiver module 22 is configured to send the first capability information to a core network device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the first capability information to the AMF, to report the first capability information.

In this application, the first terminal device sends the first capability information to the network device or the core network device, so that the network device or the core network device can determine the target bandwidth part or the paging policy based on the first capability information, thereby paging the first terminal device on the target bandwidth part. In this application, the first terminal device may report the first capability information in different manners, so that the network device or the core network device obtains the first capability information. Therefore, an application scenario of the solution in this embodiment of this application can be further expanded, and an application scope of the method can be widened.

In a possible implementation, the transceiver module 22 is further configured to receive a capability request message, where the capability request message is used to request to report the supported bandwidth part.

Optionally, the capability request message may be sent by the network device, the core network device, or another terminal device, and the capability request message may be a UECapabilityEnquiry message or another RRC message. The first terminal device receives the capability request message, and reports the first capability information of the first terminal device to the network device, the core network device, or the another terminal device in response to the capability request message, so that the first capability information can be synchronized between the first terminal device and another device, thereby implementing synchronization of the target bandwidth part. In this way, the first terminal device can receive a paging message on the target bandwidth part.

In a possible implementation, the processing module 21 is configured to: when the first terminal device supports a first bandwidth part, determine that the target bandwidth part is the first bandwidth part; or when the first terminal device does not support the first bandwidth part, and the first terminal device is in an RRC idle mode or an RRC inactive mode, determine that the target bandwidth part is an initial BWP; or when the first terminal device does not support the first bandwidth part, and the first terminal device is in an RRC connected mode, determine that the target bandwidth part is an active BWP.

Optionally, a frequency domain width of the first bandwidth part is greater than a frequency domain width of the initial bandwidth part; and/or a frequency domain position of the first bandwidth part is different from a frequency domain position of the initial bandwidth part; and/or a subcarrier spacing of the first bandwidth part is different from a subcarrier spacing of the initial bandwidth part.

Optionally, the first bandwidth part is an independent multicast bandwidth part or an extended initial bandwidth part.

In this application, a target bandwidth part that matches a paging receiving bandwidth position of the first terminal device is determined based on an RRC mode of the first terminal device, and a relationship between the first bandwidth part and the bandwidth part supported by the first terminal device and indicated by the first capability information. The target bandwidth part is the paging receiving bandwidth position of the first terminal device. Therefore, after determining the target bandwidth part, the first terminal device receives the first paging message on the target bandwidth part, so that a paging message sent by the network device can be accurately received, and the network device does not need to perform a plurality of times of paging on a plurality of bandwidth parts, thereby improving paging efficiency.

The processing module 21 may perform step S501 in the method shown in FIG. 11, or may perform step S601 in the method shown in FIG. 12.

The transceiver module 22 may perform step S502 in the method shown in FIG. 11, or may perform steps S601a, S602, and S603 in the method shown in FIG. 12.

The apparatus in the embodiment shown in FIG. 20 may be configured to perform the technical solutions in the embodiments shown in FIG. 11 and FIG. 12 in the foregoing methods and the operations performed by the first terminal device in the embodiments shown in FIG. 14 to FIG. 18. Implementation principles and technical effects thereof are similar, and details are not described herein again.

In addition, implementation of this embodiment does not depend on whether the embodiment shown in FIG. 19 is implemented, and this embodiment may be independently implemented.

Figure 21:
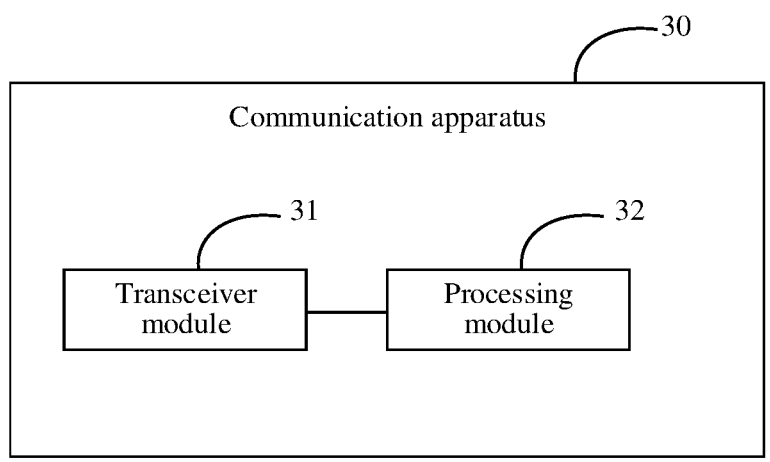
FIG. 21 is a schematic block diagram of a communication apparatus according to an embodiment of this application.

In an example, FIG. 21 is a schematic block diagram of a communication apparatus according to an embodiment of this application. A communication apparatus 30 in this embodiment of this application may be the core network device in the foregoing method embodiments, or may be one or more chips in the core network device. The communication apparatus 30 may be configured to implement some or all functions of the core network device in the foregoing method embodiments. The communication apparatus 30 may include a transceiver module 31 or a processing module 32.

The transceiver module 31 is configured to receive first capability information, where the first capability information is used to indicate a bandwidth part supported by a first terminal device.

The processing module 32 is configured to control the transceiver module 31 to send the first capability information to a network device.

In this application, the core network device receives the first capability information, and sends the first capability information to the network device by using a specific paging policy, so that the network device can determine a target bandwidth part based on the first capability information corresponding to the first terminal device, and receive a message of the first terminal device by using the target bandwidth part. Because the target bandwidth part matches the bandwidth part supported by the first terminal device, the network device that receives the first capability information sends a first paging message to the target bandwidth part. This can reduce a quantity of paging messages received by the first terminal device on another bandwidth part, reduce resource overheads, and improve paging efficiency.

In a possible implementation, the first capability information may be from the first terminal device. The first terminal device reports information about the bandwidth part supported by the first terminal device to the core network device as the first capability information, so that the core network device can determine a paging policy by using the first capability information, thereby paging the first terminal device. Optionally, the core network device may be an AMF network element. The first terminal device carries the first capability information by using a NAS message, and sends the another first capability information to the AMF, so that the core network device receives the first capability information.

In a possible implementation, the first capability information may be from an APP server, and the core network device obtains, by using the APP server, the first capability information of the first terminal device or first capability information of a plurality of terminal devices that include the first terminal device. The core network device may be an SMF network element or an AMF network element.

Optionally, after receiving the first capability information from the first terminal device, the transceiver module 31 is further configured to forward the first capability information to the core network device, and the core network device receives the first capability information forwarded by the network device. For example, a gNB forwards the first capability information to the AMF network element. The forwarding message may be an N2 message or an NG2 message. N2 is an interface between an access network device and a core network device in LTE, and NG2 is an interface between an access network device and a core network device in NR.

In a possible implementation, the transceiver module 31 is configured to send a second paging message to the network device, where the second paging message includes identification information of the first terminal device, the identification information of the first terminal device is used to indicate a paged terminal device, and there is a mapping relationship between the identification information of the first terminal device and the first capability information.

In this application, the core network device sends the second paging message to the network device, so that the network device obtains the identification information of the first terminal device from the second paging message. In this way, the network device can determine, based on the pre-obtained mapping relationship between the identification information of the first terminal device and the first capability information, the first capability information corresponding to the first terminal device, and the network device can further page the first terminal device when paging the target bandwidth corresponding to the first capability information. In addition, the terminal identifier may indicate one terminal device, or may indicate one group of terminal devices. The core network device sends the second paging message to the network device, so that the network device can page one group of terminals or a plurality of terminal devices in a same service group by using one terminal identifier, thereby reducing signaling overheads of paging the first terminal device by the network device, and improving efficiency of paging the first terminal device by the network device.

For example, the identification information of the first terminal device includes at least one of the following: a terminal identifier, a group identifier corresponding to the terminal, and a service identifier corresponding to the terminal.

The terminal identifier is used to uniquely indicate one terminal device. In a possible implementation, the terminal identifier is an identifier configured by a core network for the terminal device. In some embodiments, the terminal identifier is, for example, an S-TMSI. In another possible implementation, the terminal identifier is stored in a SIM card, for example, an IMSI. In still another possible implementation, the terminal identifier is an identifier configured by the network device for the terminal device. In some embodiments, the terminal identifier is, for example, an I-RNTI. Herein, the terminal identifier is used to indicate a paged terminal device.

The group identifier corresponding to the terminal is used to indicate a terminal device group corresponding to a paged terminal device. The terminal device group includes a plurality of terminal devices having a common group identifier, for example, a plurality of terminal devices in one cell. The plurality of terminal devices in the terminal device group are communicatively connected to another external network device by using a unified group identifier.

The service identifier corresponding to the terminal is used to indicate a service identifier corresponding to a paged terminal device. Optionally, the service identifier may be a multicast service identifier. The multicast service identifier may be a TMGI or a G-RNTI.

In a possible implementation, the second paging message includes the first capability information. In some embodiments, the core network device sends both the identification information of the first terminal device and the corresponding first capability information to the network device by using the second paging message. The network device may obtain the mapping relationship between the first terminal device and the corresponding first capability information based on the second paging message, and further send the first paging message on the target bandwidth part corresponding to the first capability information, to page the first terminal device.

The transceiver module 31 may perform step S701 in the method shown in FIG. 13, or may perform step S702 in the method shown in FIG. 13 together with the processing module 32.

The processing module 32 may perform step S702 in the method shown in FIG. 13 together with the transceiver module 31.

The apparatus in the embodiment shown in FIG. 21 may be configured to perform the technical solution in the embodiment shown in FIG. 13 in the foregoing method and the operations performed by the core network device in the embodiments shown in FIG. 14 to FIG. 18. Implementation principles and technical effects thereof are similar, and details are not described herein again.

In addition, implementation of this embodiment does not depend on whether the embodiment shown in FIG. 19 or FIG. 20 is implemented, and this embodiment may be independently implemented.

In all the following embodiments, a processor, a memory, a receiver, and a transmitter do not necessarily exist simultaneously, and the following apparatuses or devices may alternatively exist in a product form of a chip. The apparatus or the device specifically includes a processor. The processor is connected to a memory. The memory stores computer program instructions. The processor executes the computer program instructions stored in the memory, to implement the method provided in any one of the foregoing implementations. The memory and the processor may be integrated together, or may be independent components. If the memory and the processor are independent components, the memory may be located inside the apparatus or the device, or may be located outside the apparatus or the device. In other words, the memory is optional.

In a possible implementation, the processor includes a logic circuit and an input interface and/or an output interface. The output interface is configured to perform a sending action in a corresponding method, and the input interface is configured to perform a receiving action in the corresponding method.

In a possible implementation, the following apparatus or device further includes a communication interface and a communication bus. The processor, the memory, and the communication interface are connected by using the communication bus. The communication interface is configured to perform receiving and sending actions in the corresponding method. The communication interface may also be referred to as a transceiver. Optionally, the communication interface includes a transmitter or a receiver. In this case, the transmitter is configured to perform a sending action in a corresponding method, and the receiver is configured to perform a receiving action in the corresponding method.

Figure 22:
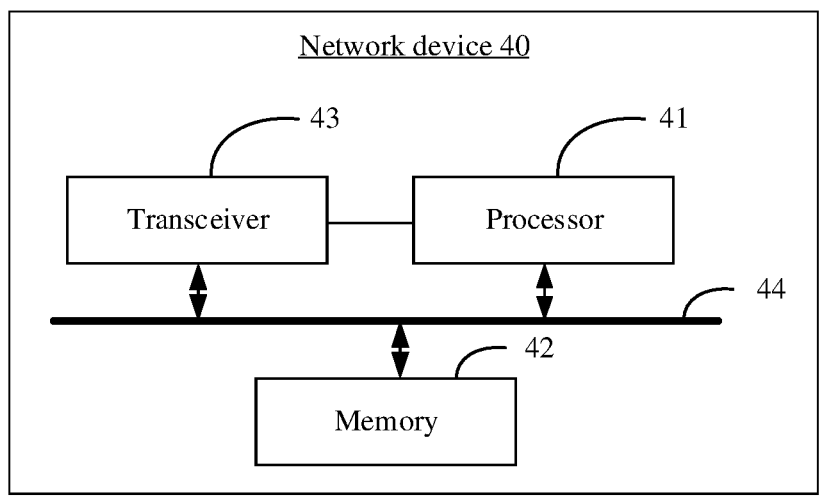
FIG. 22 is a schematic block diagram of a structure of a network device according to an embodiment of this application.

FIG. 22 is a schematic block diagram of a structure of a network device according to an embodiment of this application. As shown in FIG. 22, a network device 40 provided in this embodiment of this application may be configured to perform the actions or the steps of the network device in the embodiments shown in FIG. 14 to FIG. 18, and may be further configured to perform the actions or the steps of the modules of the apparatus in the embodiment shown in FIG. 19. The network device 40 specifically includes a processor 41, a memory 42, and a transceiver 43. The transceiver 43 may be connected to an antenna.

The memory 42 is configured to store a computer program.

The processor 41 is configured to execute the computer program stored in the memory 42, to implement the processing action of the network device in the embodiments shown in FIG. 4 to FIG. 18, or the processing action of each module of the apparatus in the embodiment shown in FIG. 19. Details are not described again.

The transceiver 43 is configured to perform the receiving action or the sending action of the network device in the embodiments shown in FIG. 4 to FIG. 18, or the receiving action or the sending action of each module of the apparatus in the embodiment shown in FIG. 19. Details are not described again.

Optionally, the terminal device may further include a bus 44. The processor 41, the memory 42, and the transceiver 43 may be connected to each other by using the bus 44. The bus 44 may be a peripheral component interconnect (peripheral component interconnect, PCI) bus, an extended industry standard architecture (extended industry standard architecture, EISA) bus, or the like. The bus 44 may be classified into an address bus, a data bus, a control bus, and the like. For ease of representation, only one thick line is used to represent the bus in FIG. 22, but this does not mean that there is only one bus or only one type of bus.

In embodiments of this application, the foregoing embodiments may be mutually referenced. Same or similar steps and nouns are not described again.

Alternatively, some or all of the foregoing modules may alternatively be embedded in a chip by using an integrated circuit. The foregoing modules may be separately implemented, or may be integrated together. That is, the foregoing modules may be configured as one or more integrated circuits for implementing the foregoing methods, for example, one or more application-specific integrated circuits (Application-Specific Integrated Circuit, ASIC), one or more digital signal processors (digital signal processor, DSP), or one or more field programmable gate arrays (Field Programmable Gate Array, FPGA).

Figure 23:
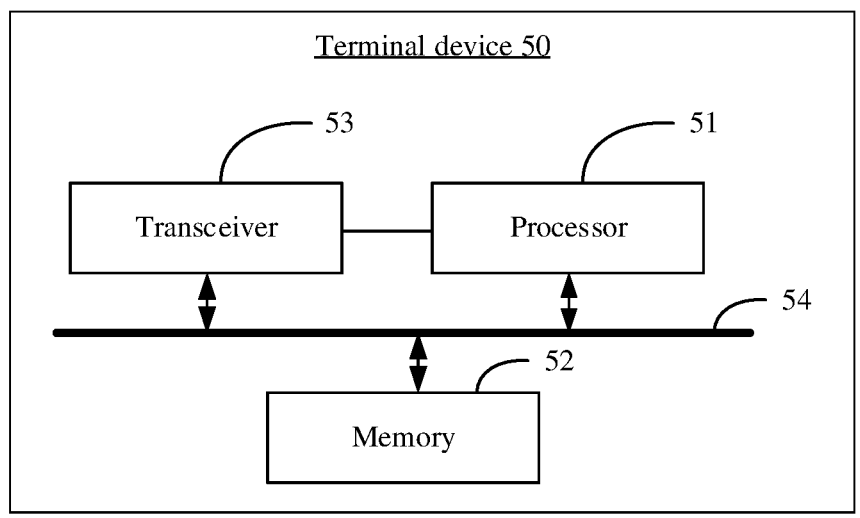
FIG. 23 is a schematic block diagram of a structure of a terminal device according to an embodiment of this application.

FIG. 23 is a schematic block diagram of a structure of a terminal device according to an embodiment of this application. As shown in FIG. 23, a terminal device 50 provided in this embodiment of this application may be configured to perform the actions or the steps of the terminal device in the embodiments shown in FIG. 14 to FIG. 18, and may be further configured to perform the actions or the steps of the modules of the apparatus in the embodiment shown in FIG. 20. The terminal device 50 specifically includes a processor 51, a memory 52, and a transceiver 53. The transceiver 53 may be connected to an antenna.

The memory 52 is configured to store a computer program.

The processor 51 is configured to execute the computer program stored in the memory 52, to implement the processing action of the terminal device in the embodiments shown in FIG. 4 to FIG. 18, or the processing action of each module of the apparatus in the embodiment shown in FIG. 20. Details are not described again.

The transceiver 53 is configured to perform the receiving action or the sending action of the terminal device in the embodiments shown in FIG. 4 to FIG. 18, or the receiving action or the sending action of each module of the apparatus in the embodiment shown in FIG. 20. Details are not described again.

Optionally, the terminal device may further include a bus 54. The processor 51, the memory 52, and the transceiver 53 may be connected to each other by using the bus 54. The bus 54 may be a PCI bus, an EISA bus, or the like. The bus 54 may be classified into an address bus, a data bus, a control bus, and the like. For ease of representation, only one thick line is used to represent the bus in FIG. 23, but this does not mean that there is only one bus or only one type of bus.

In embodiments of this application, the foregoing embodiments may be mutually referenced. Same or similar steps and nouns are not described again.

Alternatively, some or all of the foregoing modules may alternatively be embedded in a chip by using an integrated circuit. The foregoing modules may be separately implemented, or may be integrated together. The foregoing modules may be configured as one or more integrated circuits for implementing the foregoing methods, for example, one or more ASICs, one or more DSPs, or one or more FPGAs.

Figure 24:
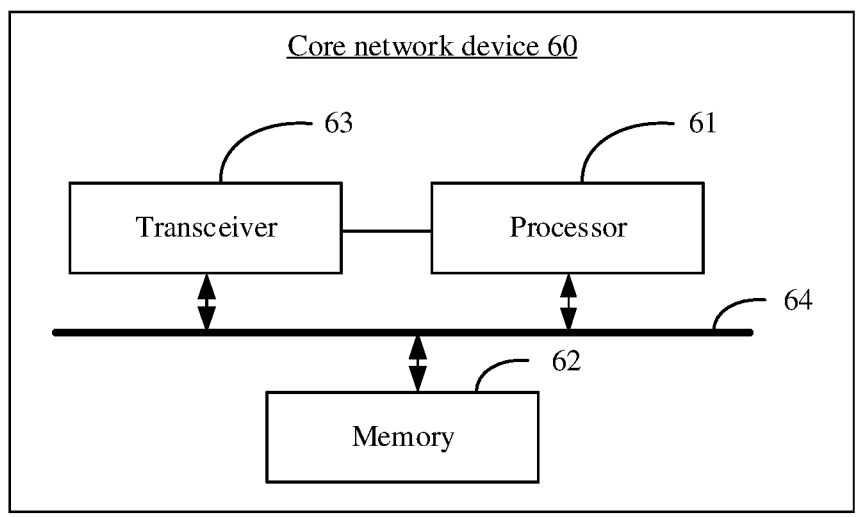
FIG. 24 is a schematic block diagram of a structure of a core network device according to an embodiment of this application.

FIG. 24 is a schematic block diagram of a structure of a core network device according to an embodiment of this application. As shown in FIG. 24, a core network device 60 provided in this embodiment of this application may be configured to perform the actions or the steps of the core network device in the embodiments shown in FIG. 14 to FIG. 18, and may be further configured to perform the actions or the steps of the modules of the apparatus in the embodiment shown in FIG. 21. The core network device 60 specifically includes a processor 61, a memory 62, and a transceiver 63. The transceiver 63 may be connected to an antenna.

The memory 62 is configured to store a computer program.

The processor 61 is configured to execute the computer program stored in the memory 62, to implement the processing action of the core network device in the embodiments shown in FIG. 4 to FIG. 18, or the processing action of each module of the apparatus in the embodiment shown in FIG. 21. Details are not described again.

The transceiver 63 is configured to perform the receiving action or the sending action of the core network device in the embodiments shown in FIG. 4 to FIG. 18, or the receiving action or the sending action of each module of the apparatus in the embodiment shown in FIG. 21. Details are not described again.

Optionally, the core network device may further include a bus 64. The processor 61, the memory 62, and the transceiver 63 may be connected to each other by using the bus 64. The bus 64 may be a PCI bus, an EISA bus, or the like. The bus 64 may be classified into an address bus, a data bus, a control bus, and the like. For ease of representation, only one thick line is used to represent the bus in FIG. 24, but this does not mean that there is only one bus or only one type of bus.

In embodiments of this application, the foregoing embodiments may be mutually referenced. Same or similar steps and nouns are not described again.

Alternatively, some or all of the foregoing modules may alternatively be embedded in a chip by using an integrated circuit. The foregoing modules may be separately implemented, or may be integrated together. The foregoing modules may be configured as one or more integrated circuits for implementing the foregoing methods, for example, one or more ASICs, one or more DSPs, or one or more FPGAs.

Figure 25:
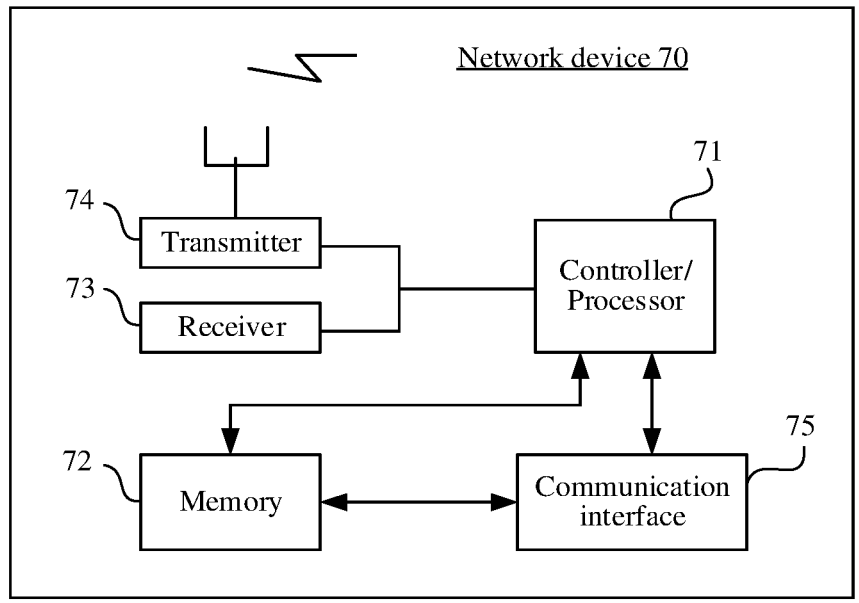
FIG. 25 is a schematic diagram of a structure of another network device according to an embodiment of this application.

FIG. 25 is a schematic diagram of a structure of another network device according to an embodiment of this application. As shown in FIG. 25, a network device 70 provided in this embodiment of this application may be configured to perform the actions or the steps of the network device in the embodiments shown in FIG. 4 to FIG. 18, and may be further configured to perform the actions or the steps of the modules of the apparatus in the embodiment shown in FIG. 19. The network device 70 specifically includes a processor 71, a memory 72, a receiver 73, and a transmitter 74.

The memory 72 is configured to store a computer program.

The processor 71 is configured to execute the computer program stored in the memory 72, to implement the processing action of the network device in the embodiments shown in FIG. 4 to FIG. 18, or the processing action of each module of the apparatus in the embodiment shown in FIG. 19. Details are not described again.

The receiver 73 is configured to perform the receiving action of the network device in the embodiments shown in FIG. 4 to FIG. 18, or the receiving action of each module of the apparatus in the embodiment shown in FIG. 19. Details are not described again.

The transmitter 74 is configured to perform the sending action of the network device in the embodiments shown in FIG. 4 to FIG. 18, or the sending action of each module of the apparatus in the embodiment shown in FIG. 19. Details are not described again.

The processor 71 may also be a controller, and is represented as a "controller/processor 71" in FIG. 25. The receiver 73 and the transmitter 74 are configured to: support the network device 70 in transmitting and receiving information to and from the terminal device and the core network device in the foregoing embodiments, and support the network device 70 in performing radio communication with another network device. Optionally, the processor 71 performs various functions used for communicating with the terminal device and the core network device.

In addition, the network device 70 may further include a communication interface 75. The communication interface 75 is configured to support the network device in communicating with another network entity.

The processor 71 may be, for example, a CPU, or may be configured as one or more integrated circuits for implementing the foregoing methods, for example, one or more application-specific integrated circuits, one or more digital signal processors, or one or more field programmable gate arrays. The memory 72 may be a memory, or may be a collective name of a plurality of storage elements.

Figure 26:
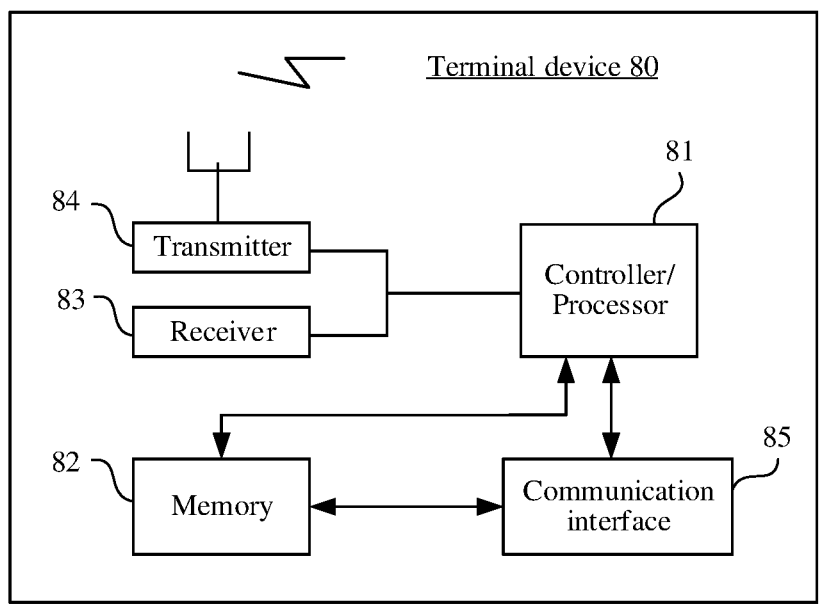
FIG. 26 is a schematic diagram of a structure of another terminal device according to an embodiment of this application.

FIG. 26 is a schematic diagram of a structure of another terminal device according to an embodiment of this application. As shown in FIG. 26, a terminal device 80 provided in this embodiment of this application may be configured to perform the actions or the steps of the terminal device in the embodiments shown in FIG. 4 to FIG. 18, and may be further configured to perform the actions or the steps of the modules of the apparatus in the embodiment shown in FIG. 20. The terminal device 80 specifically includes a processor 81, a memory 82, a receiver 83, and a transmitter 84.

The memory 82 is configured to store a computer program.

The processor 81 is configured to execute the computer program stored in the memory 82, to implement the processing action of the terminal device in the embodiments shown in FIG. 4 to FIG. 18, or the processing action of each module of the apparatus in the embodiment shown in FIG. 20. Details are not described again.

The receiver 83 is configured to perform the receiving action of the terminal device in the embodiments shown in FIG. 4 to FIG. 18, or the receiving action of each module of the apparatus in the embodiment shown in FIG. 20. Details are not described again.

The transmitter 84 is configured to perform the sending action of the terminal device in the embodiments shown in FIG. 4 to FIG. 18, or the sending action of each module of the apparatus in the embodiment shown in FIG. 20. Details are not described again.

The processor 81 may also be a controller, and is represented as a "controller/processor 81" in FIG. 26. The receiver 83 and the transmitter 84 are configured to: support the terminal device 80 in transmitting and receiving information to and from the network device and the core network device in the foregoing embodiments, and support the terminal device 80 in performing radio communication with another terminal device. Optionally, the processor 81 performs various functions used for communicating with the network device and the core network device.

In addition, the terminal device 80 may further include a communication interface 85. The communication interface 85 is configured to support the terminal device in communicating with another network entity.

The processor 81 may be, for example, a CPU, or may be configured as one or more integrated circuits for implementing the foregoing methods, for example, one or more application-specific integrated circuits, one or more digital signal processors, or one or more field programmable gate arrays. The memory 82 may be a memory, or may be a collective name of a plurality of storage elements.

Figure 27:
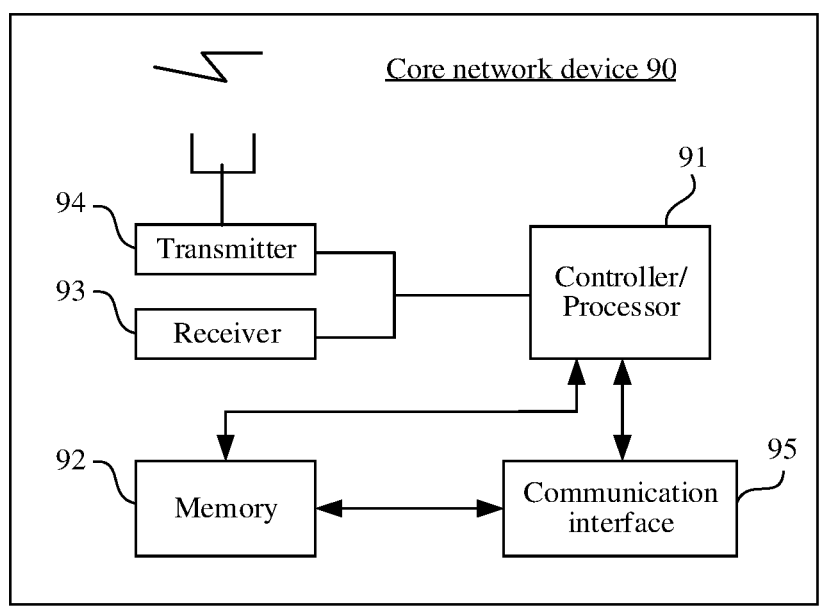
FIG. 27 is a schematic diagram of a structure of another core network device according to an embodiment of this application.

FIG. 27 is a schematic diagram of a structure of another core network device according to an embodiment of this application. As shown in FIG. 27, a core network device 90 provided in this embodiment of this application may be configured to perform the actions or the steps of the core network device in the embodiments shown in FIG. 4 to FIG. 18, and may be further configured to perform the actions or the steps of the modules of the apparatus in the embodiment shown in FIG. 21. The core network device 90 specifically includes a processor 91, a memory 92, a receiver 93, and a transmitter 94.

The memory 92 is configured to store a computer program.

The processor 91 is configured to execute the computer program stored in the memory 92, to implement the processing action of the core network device in the embodiments shown in FIG. 4 to FIG. 18, or the processing action of each module of the apparatus in the embodiment shown in FIG. 21. Details are not described again.

The receiver 93 is configured to perform the receiving action of the core network device in the embodiments shown in FIG. 4 to FIG. 18, or the receiving action of each module of the apparatus in the embodiment shown in FIG. 21. Details are not described again.

The transmitter 94 is configured to perform the sending action of the core network device in the embodiments shown in FIG. 4 to FIG. 18, or the sending action of each module of the apparatus in the embodiment shown in FIG. 21. Details are not described again.

The processor 91 may also be a controller, and is represented as a "controller/processor 91" in FIG. 27. The receiver 93 and the transmitter 94 are configured to: support the core network device 90 in transmitting and receiving information to and from the terminal device and the network device in the foregoing embodiments, and support the core network device 90 in performing radio communication with another core network device. Optionally, the processor 91 performs various functions used for communicating with the terminal device and the network device.

In addition, the core network device 90 may further include a communication interface 95. The communication interface 95 is configured to support the core network device in communicating with another network entity.

The processor 91 may be, for example, a CPU, or may be configured as one or more integrated circuits for implementing the foregoing methods, for example, one or more application-specific integrated circuits, one or more digital signal processors, or one or more field programmable gate arrays. The memory 92 may be a memory, or may be a collective name of a plurality of storage elements.

An embodiment of this application provides a communication system. The communication system includes the network device provided in FIG. 22, the terminal device provided in FIG. 23, and the core network device provided in FIG. 24.

An embodiment of this application provides a communication system. The communication system includes the network device provided in FIG. 25, the terminal device provided in FIG. 26, and the core network device provided in FIG. 27.

An embodiment of this application further provides a computer-readable storage medium, including computer code. When the computer code is run on a computer, the computer is enabled to perform the method provided in any implementation corresponding to FIG. 4 to FIG. 18.

An embodiment of this application further provides a computer program product, including program code. When a computer runs the computer program product, the program code performs the method provided in any implementation corresponding to FIG. 4 to FIG. 18.

This application further provides a chip, including a processor. The processor is configured to invoke and run a computer program stored in a memory, to perform a corresponding operation and/or procedure performed by a network device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

This application further provides a chip, including a processor. The processor is configured to invoke and run a computer program stored in a memory, to perform a corresponding operation and/or procedure performed by a terminal device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

This application further provides a chip, including a processor. The processor is configured to invoke and run a computer program stored in a memory, to perform a corresponding operation and/or procedure performed by a core network device in the communication method in embodiments of this application. Optionally, the chip further includes the memory. The memory is connected to the processor through a circuit or a wire. The processor is configured to read and execute the computer program in the memory. Optionally, the chip further includes a communication interface, and the processor is connected to the communication interface. The communication interface is configured to receive data and/or information that is to be processed. The processor obtains the data and/or the information from the communication interface, and processes the data and/or the information. The communication interface may be an input/output interface.

All or some of the foregoing embodiments may be implemented by using software, hardware, firmware, or any combination thereof. When software is used for implementation, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (Solid-State Drive, SSD)), or the like.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose computer or a dedicated computer.

What is claimed is:

1. A communication method, applied to a network device, the communication method comprising:
   receiving capability information, wherein the capability information is used to indicate a bandwidth part supported by a terminal device, wherein the capability information indicates whether the terminal device supports receiving paging on an independent multicast bandwidth part that is free from overlapping with an initial bandwidth part in frequency domain or an extended initial bandwidth part that overlaps with the initial bandwidth part in frequency domain; and
   sending a first paging message on a target bandwidth part based on the capability information.

2. The communication method according to claim 1, further comprising:
   receiving a second paging message from a core network device,
   wherein
   the second paging message comprises identification information of the terminal device, and
   there is a mapping relationship between the identification information of the terminal device and the capability information.

3. The communication method according to claim 2, wherein the identification information of the terminal device comprises at least one of a terminal device identifier, a group identifier corresponding to the terminal device, or a service identifier corresponding to the terminal device.

4. The communication method according to claim 2, wherein the second paging message comprises the capability information.

5. The communication method according to claim 1, further comprising:
   in response to the terminal device supporting a first bandwidth part, determining that the target bandwidth part is the first bandwidth part; or
   in response to the terminal device not supporting the first bandwidth part, and the terminal device is in a radio resource control (RRC) idle mode or an RRC inactive mode, determining that the target bandwidth part is an initial bandwidth part; or
   in response to the terminal device not supporting the first bandwidth part, and the terminal device is in an RRC connected mode, determining that the target bandwidth part is an active bandwidth part.

6. The communication method according to claim 5, wherein at least one of
   a frequency domain width of the first bandwidth part is greater than a frequency domain width of the initial bandwidth part,
   a frequency domain position of the first bandwidth part is different from a frequency domain position of the initial bandwidth part, or
   a subcarrier spacing of the first bandwidth part is different from a subcarrier spacing of the initial bandwidth part.

7. The communication method according to claim 1, further comprising:
   determining the target bandwidth part based on the capability information; and
   sending an indication to the terminal device, wherein the indication indicates information about the target bandwidth part.

8. The communication method according to claim 2, wherein the capability information is received from the terminal device or the core network device.

9. The communication method according to claim 8, wherein the capability information is from the terminal device, and
   the communication method further comprises:
   sending the capability information to the core network device.

10. The communication method according to claim 1, wherein before receiving the capability information, the communication method further comprises:
    sending a capability request message to the terminal device, wherein the capability request message is used to request the terminal device to report the supported bandwidth part.

11. The communication method according to claim 2, wherein the second paging message comprises at least one of a paging discontinuous reception (DRX) configuration, a message type indication, a paging priority, a tracking area identity (TAI) list used for paging, or paging attempt quantity information.

12. The communication method according to claim 1, further comprising:

in response to a preset state condition is met, performing at least one of:
  sending a capability request message to the terminal device, wherein the capability request message is used to request the terminal device to report the supported bandwidth part; or
  sending the first paging message on at least one available bandwidth part, wherein the available bandwidth part is a bandwidth part for which a paging resource is configured.

13. The communication method according to claim 12, wherein the preset state condition comprises at least one of:
  a quantity of times of sending the first paging message is greater than a first threshold;
  the first paging message fails to be sent; or
  no response information is received from the terminal device within a first duration after the first paging message is sent.

14. A communication method, applied to a terminal device, the communication method, comprising:
  determining capability information, wherein the capability information is used to indicate a bandwidth part supported by the terminal device, wherein the capability information indicates whether the terminal device supports receiving paging on an independent multicast bandwidth part that is free from overlapping with an initial bandwidth part in frequency domain or an extended initial bandwidth part that overlaps with the initial bandwidth part in frequency domain; and
  receiving a first paging message on a target bandwidth part based on the capability information.

15. The communication method according to claim 14, further comprising:
  sending the capability information to a network device or a core network device.

16. The communication method according to claim 14, further comprising:
  receiving a capability request message, wherein the capability request message is used to request to report the supported bandwidth part.

17. The communication method according to claim 14, further comprising:
  in response to the terminal device supporting a first bandwidth part, determining that the target bandwidth part is the first bandwidth part; or
  in response to the terminal device not supporting the first bandwidth part, and the terminal device is in an RRC idle mode or an RRC inactive mode, determining that the target bandwidth part is an initial bandwidth part; or
  in response to the terminal device not supporting the first bandwidth part, and the terminal device is in an RRC connected mode, determining that the target bandwidth part is an active bandwidth part.

18. The communication method according to claim 17, wherein at least one of
  a frequency domain width of the first bandwidth part is greater than a frequency domain width of the initial bandwidth part,
  a frequency domain position of the first bandwidth part is different from a frequency domain position of the initial bandwidth part, or
  a subcarrier spacing of the first bandwidth part is different from a subcarrier spacing of the initial bandwidth part.

19. A communication method, applied to a core network device, the communication method, comprising:
  receiving capability information, wherein the capability information is used to indicate a bandwidth part supported by a terminal device, wherein the capability information indicates whether the terminal device supports receiving paging on an independent multicast bandwidth part that is free from overlapping with an initial bandwidth part in frequency domain or an extended initial bandwidth part that overlaps with the initial bandwidth part in frequency domain; and
  sending the capability information to a network device.

20. The communication method according to claim 19, further comprising:
  sending a second paging message to the network device, wherein
    the second paging message comprises identification information of the terminal device,
    the identification information of the terminal device is used to indicate a paged terminal device, and
    there is a mapping relationship between the identification information of the terminal device and the capability information.

* * * * *